(12) United States Patent  (10) Patent No.: US 8,160,847 B2
Solomon  (45) Date of Patent: Apr. 17, 2012

(54) HYBRID MULTI-LAYER ARTIFICIAL IMMUNE SYSTEM

(76) Inventor: Neal Solomon, Oakland, CA (US)

( * ) Notice: Subject to any disclaimer, the term of this patent is extended or adjusted under 35 U.S.C. 154(b) by 713 days.

(21) Appl. No.: 12/217,621

(22) Filed: Jul. 7, 2008

(65) Prior Publication Data

US 2009/0089035 A1  Apr. 2, 2009

Related U.S. Application Data

(60) Provisional application No. 60/958,466, filed on Jul. 7, 2007.

(51) Int. Cl.
*G06G 7/56* (2006.01)
*G06G 7/48* (2006.01)
*G06G 7/62* (2006.01)
*G06F 17/50* (2006.01)
*G01N 33/48* (2006.01)
*G01N 31/00* (2006.01)

(52) U.S. Cl. .................... 703/5; 703/4; 703/13; 702/19; 702/22

(58) Field of Classification Search .................... None
See application file for complete search history.

(56) References Cited

U.S. PATENT DOCUMENTS

| | | | | |
|---|---|---|---|---|
| 5,440,723 A | * | 8/1995 | Arnold et al. | 714/2 |
| 5,765,028 A | * | 6/1998 | Gladden | 706/25 |
| 5,842,002 A | * | 11/1998 | Schnurer et al. | 703/21 |
| 5,907,834 A | * | 5/1999 | Kephart et al. | 706/20 |
| 2002/0091940 A1 | * | 7/2002 | Welborn et al. | 713/201 |
| 2004/0162638 A1 | * | 8/2004 | Solomon | 700/247 |

OTHER PUBLICATIONS

Proteins, 1999. Macmillan Dictionary of Toxicology, 4 pages, retrieved online on Feb. 20, 2011 <<http://www.credoreference.com/entry/mactox/proteins>>.*

Pappalardo et al. Modeling and simulation of cancer immunoprevention vaccine. Bioinformatics, vol. 21, 2005, pp. 2891-2897.*

Toda et al. Herpes simplex virus and an in situ cancer vaccine for the induction of specific anti-tumor immunity. Human Gene Therapy, vol. 10, 1999, pp. 385-393.*

Bagley et al. Modeling adaptive biological systems. BioSystems, vol. 23, 1989, pp. 113-138.*

* cited by examiner

*Primary Examiner* — Russell S Negin

(57) ABSTRACT

The hybrid artificial immune system consists of three main layers, including a solution application layer that interacts with the environment, a solution generation layer that solves combinatorial optimization problems and a modeling layer that analyzes problems and presents solution scenarios. The system solves evolutionary multi-objective optimization problems in network computing, robotics, artificial neural networks, protein network modeling, evolutionary systems and evolutionary hardware.

16 Claims, 61 Drawing Sheets

FIG. 7
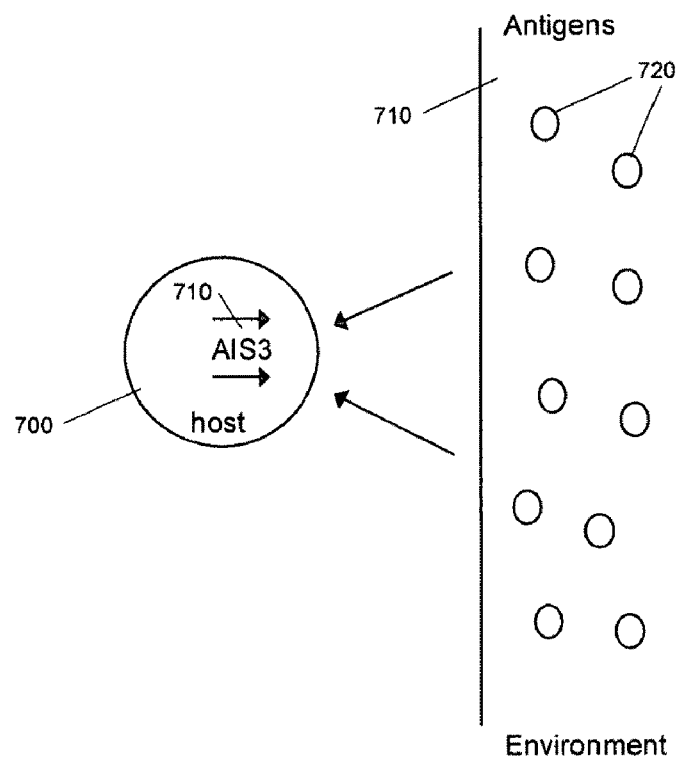
FIG. 8-A
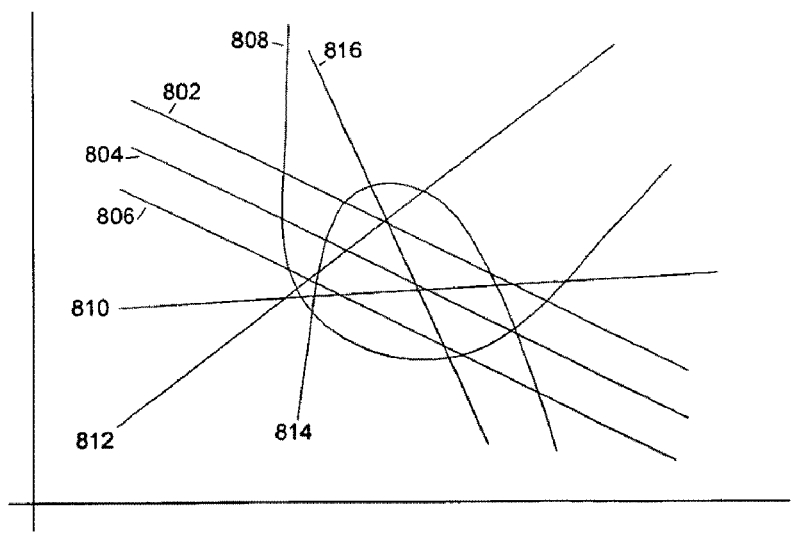

FIG. 8-B
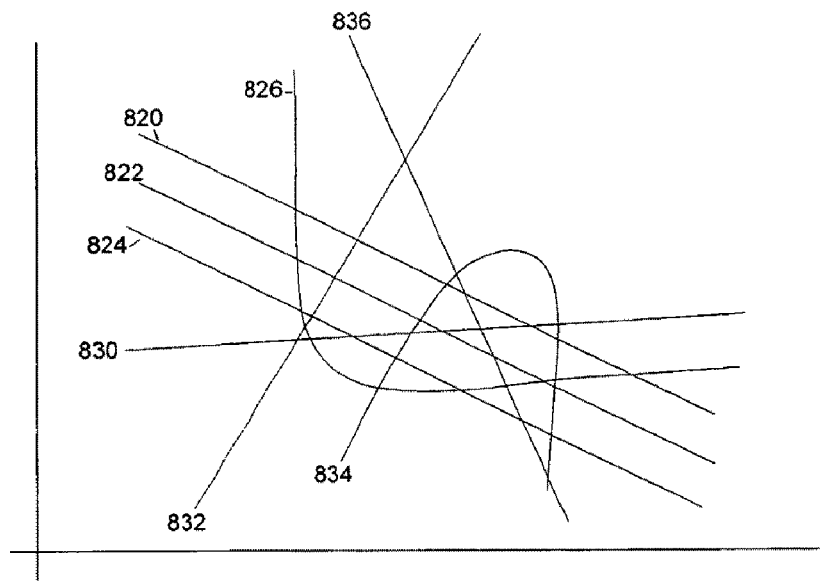
FIG. 8-C
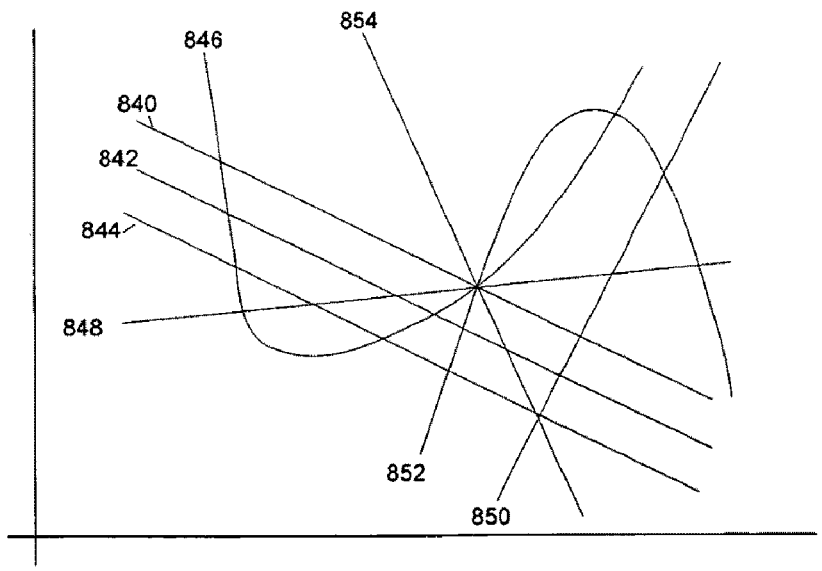

FIG. 38
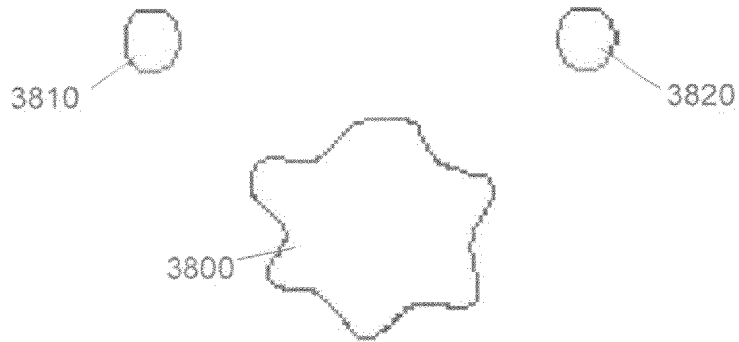
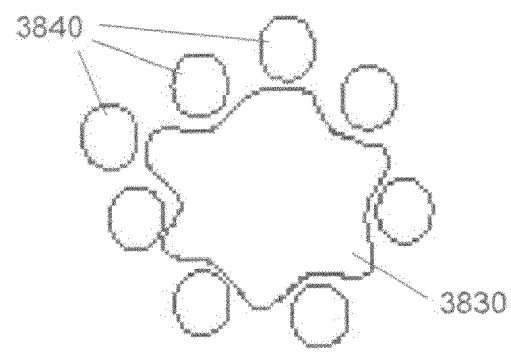
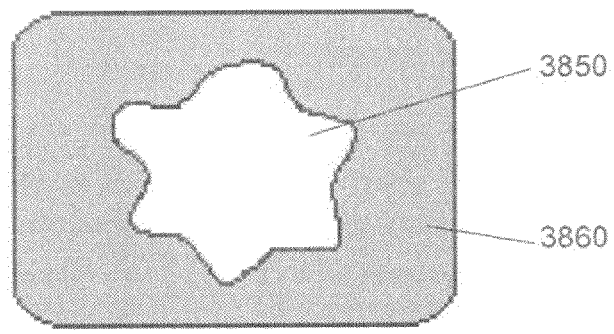

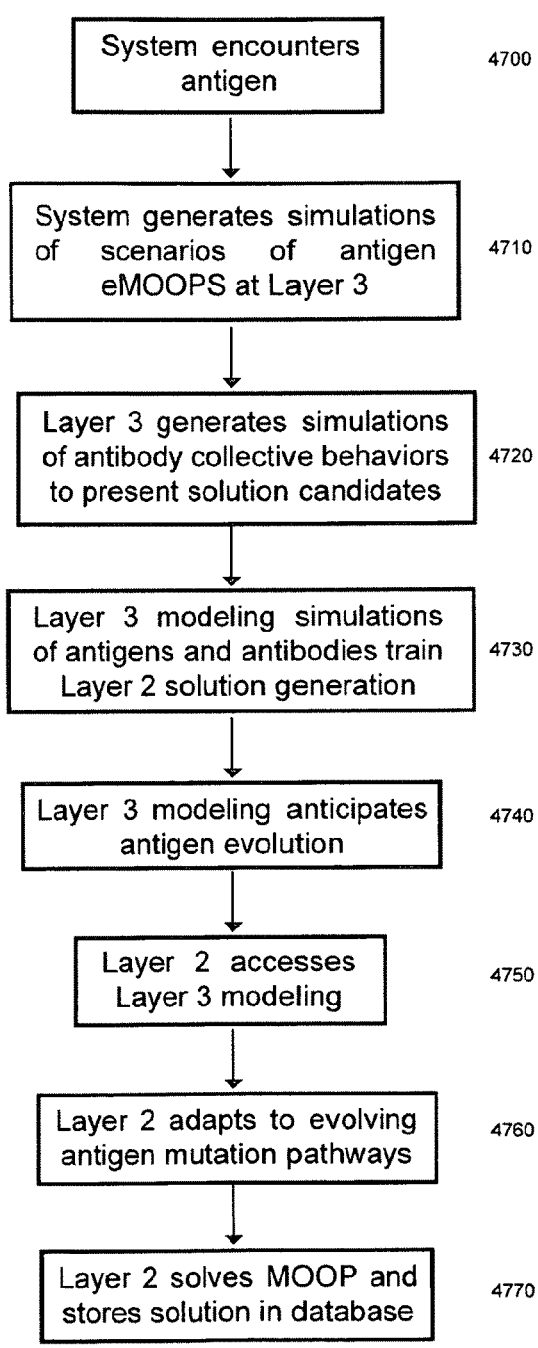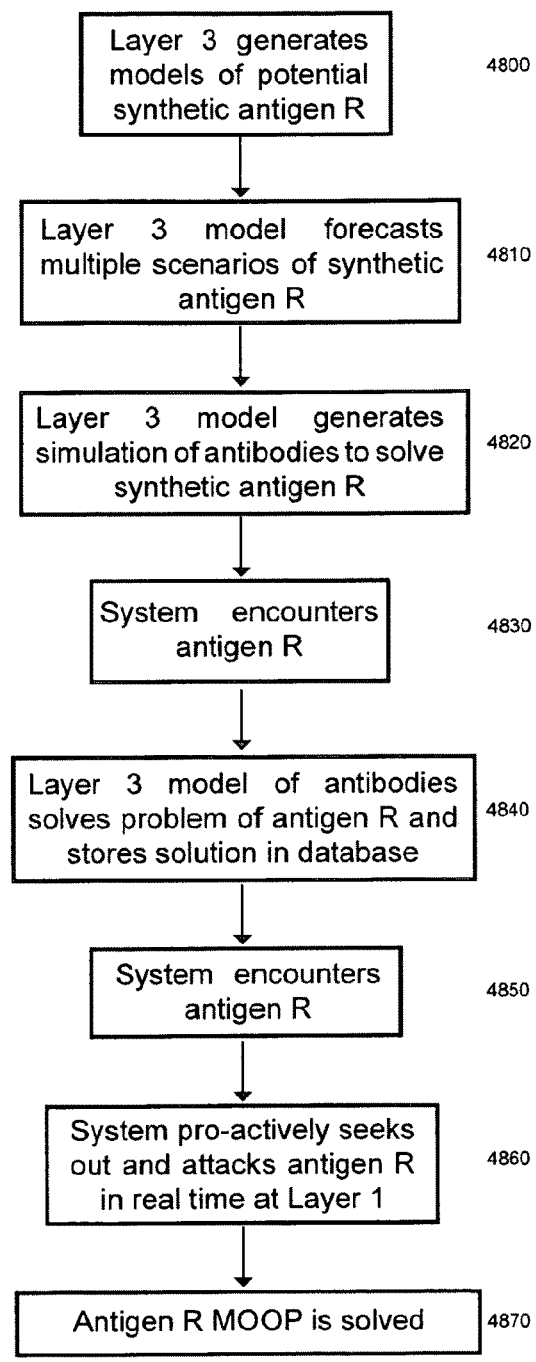

```
┌─────────────────────────┐
│ System models artificial│
│ virus    hypermutation  │ 5200
│    direction vectors    │
└─────────────────────────┘
```

| 5210 | 5230 | 5250 |
|---|---|---|
| - Virus vector is slow<br>- Virus environment is cold | - Virus vector is normal<br>- Virus environment is average | - Virus vector is rapid<br>- Virus environment is hot |
| ↓ | ↓ | ↓ |
| Virus development is slow | Virus development is normal | Virus development rate is very rapid |
| 5220 | 5240 | 5260 |

Library of artificial viruses: organized by category, phase and environmental condition AI53   E-A-NN   environment eMOOPs

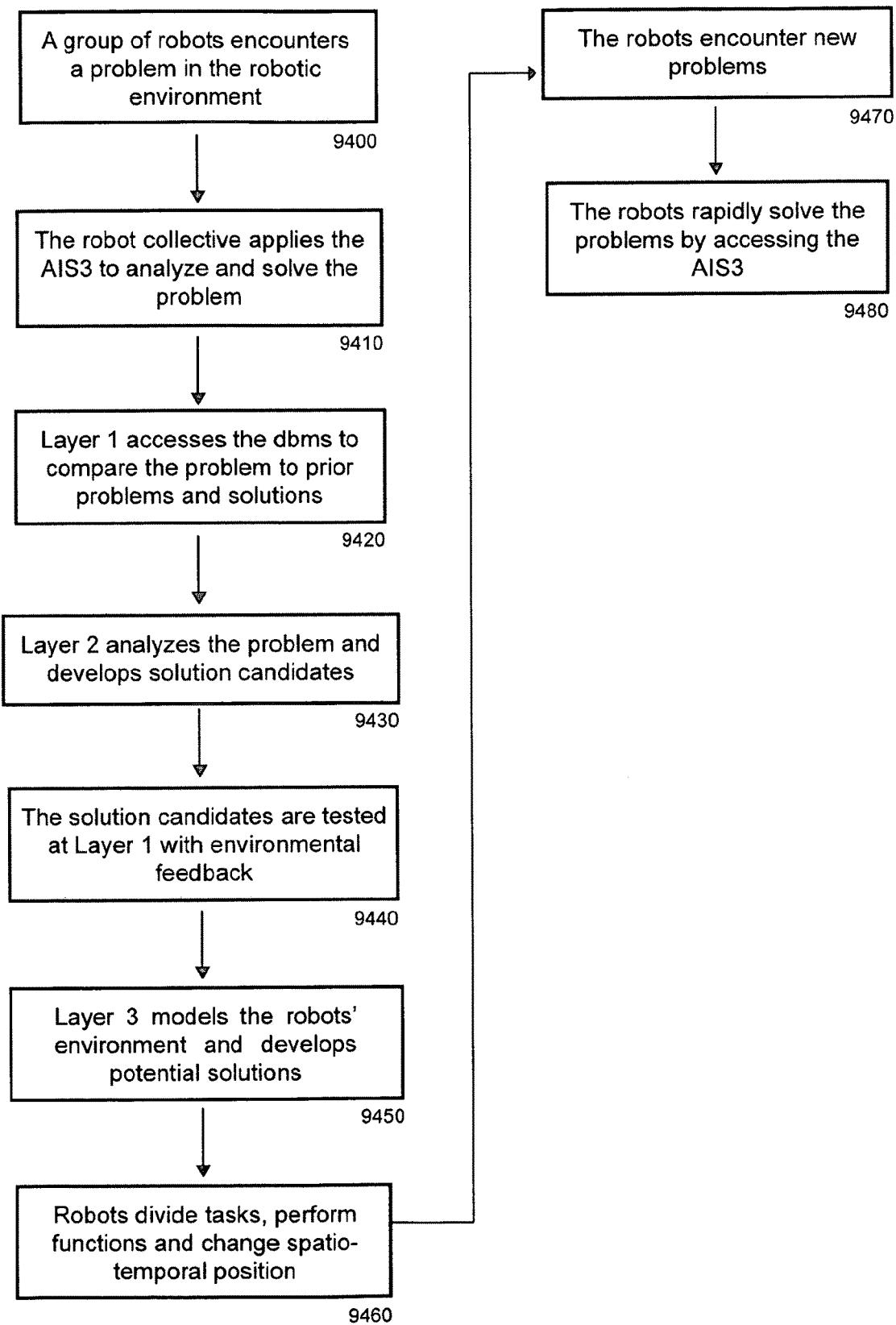

HYBRID MULTI-LAYER ARTIFICIAL IMMUNE SYSTEM

CROSS-REFERENCES TO RELATED APPLICATIONS

The present application claims the benefit of priority under 35 U.S.C. §119 from U.S. Provisional Patent Application Ser. No. 60/958,466, filed on Jul. 7, 2007, the disclosures of which are hereby incorporated by reference in their entirety for all purposes.

FIELD OF THE INVENTION

The invention is in the field of bio-inspired computing. The present system deals with immunocomputing and artificial immunology. The invention involves the field of metaheuristics, used to solve combinatorial optimization problems, particularly evolving multi-objective optimization problems. The system is applied to network computing, evolutionary systems and collective behaviors, including collective robotics, evolvable hardware, artificial neural networks and protein network modeling.

BACKGROUND

Artificial immune systems (AISs) are computational systems that emulate the operation of the biological human immune system (HIS). AISs are in the computational problem-solving class referred to as metaheuristics. Metaheuristics categories are grouped into local search techniques, swarm intelligence, genetic algorithms and AIS. Each of these metaheuristics models is used to solve optimization problems.

The traditional AIS mimics the HIS. In the HIS, there are two main immune system subsystems. The first layer is the humoral immune system in which collectives of antibodies perform specific functions to identify and attack invading antigens. The second layer is the adaptive immune system, which identifies a new (previously unknown) antigen, develops a geometrically complementary model in order to defeat it and passes on this knowledge to the humoral immune system in the form of memory or immunity. As a known antigen attacks the host, the humoral immune system draws on the previous experience and then detects and attacks the new antigen by cloning antibodies. The HIS uses differentiated antibodies, including B cells, NK cells and T cells (memory, suppressor and killer T cells).

There are limits to the HIS. First, since it is manifest in a distributed network, it is limited to local search, with no potential for strategic planning. Its knowledge base is restricted to past experiences. Second, its response time is restricted. If an unusually aggressive antigen attacks the host, the HIS may not be prepared to ward off the intruder before the host is defeated. Third, it takes time to pass on the immunity from the adaptive immune system to the humoral immune system in the form of memory. Fourth, the HIS is easily confused. For instance, it may attack itself, a phenomenon that is manifested as an auto-immune disease. Similarly, it may overreact and manifest as an allergy. Fifth, as the host gets weaker, the immune response mechanism is suppressed, which is hardly reliable. Sixth, the HIS's high threshold for identifying and attacking an antigen may result in a reaction that is too late to be effective. Finally, it is possible to infiltrate the HIS and disable it.

The traditional AIS, drawn from the HIS to solve complex problems, abstracts the concepts of the HIS for application to computational environments. In the AIS, the artificial humoral immune system is structured as a distributed network in which information is passed to self-interested autonomous members of the collective. This layer is primarily reactive, so that antibodies are propagated on-demand in order to attack known antigens.

As the artificial adaptive immune system encounters a new antigen, it emulates the HIS in order to create a customized solution to a problem and then passes this solution to the artificial humoral immune system. The adaptive process involves learning new ways to solve problems posed by new antigens. In combination, the two layers of the traditional AIS develop a coherent system to solve optimization problems.

The AIS model provides novel approaches to solve multi-objective optimization problems. Other metaheuristic models have problem-solving limits. The local search, swarm intelligence and genetic algorithm models are limited to past experience; the AIS model, however, moves beyond the reaction-centric limits of past information constraints in problem solving. With the exception of the traditional genetic algorithm metaheuristic, all of the metaheuristic models use memory in order to learn and evolve new solutions.

Memory is used differently in each main metaheuristic model. With local search methods, memory is limited to the present analysis. With swarm intelligence methods, memory is passed between members in real time.

In the AIS, memory is passed unidirectionally from the adaptive immune system layer, which learns to solve the problem, to the humoral immune system layer, which applies the solution at the appropriate moment. Over time, the AIS maintains libraries of antigen and antibody pairings. In this way, the AIS memory, in its abstract form of immunity, is passed from the adaptive immune system layer to the humoral immune system layer. One of the challenges that the present system solves with a hybrid multilayer AIS is how to provide global information to local search optimization problems.

Learning is performed by the traditional AIS primarily in the adaptive immune system layer. An experimentation process solves the problem presented by each new antigen. Future encounters with the same antigen produce a catalytic result by triggering a cascade effect of antigens at the humoral system layer. As the antigen is further encountered, immunity is further fortified. With each new encounter of the antigen, there are fewer time lags within the linear immunity process. Moreover, as the system is optimized, it is able to solve evolving, increasingly complex problems. The information from the custom solutions generated by the adaptive immune system layer effectively restructures the humoral immune system layer by requiring less cascade reaction in the performance of the same antigen reaction function.

The traditional AIS solves problems by identifying, tracking and attacking antigens. While it can attack a known antigen, and develop a defense against a new antigen, it remains to be seen how it may anticipate a potential antigen. An AIS can solve problems that emerge from the HIS. For example, in an AIS, specific memory functions, such as the allergic overreaction or an auto-immune dysfunction, may be blocked or suppressed.

As in the HIS, there are ways to assist the traditional AIS. First, a vaccine provides a small dose of a specific antigen to allow the adaptive immune system layer to build immunity. Second, an artificial antibiotic helps the AIS to attack a specific antigen. Both models fortify the immune system defense mechanism.

Local search, swarm intelligence and genetic algorithms are useful for solving bi-objective and multi-objective optimization problems. However, because of its ability to create custom solutions to new problems and pass them on as memory for future solutions to the same problems, the general AIS may be used for evolutionary multi-objective optimization problems (eMOOPs) as well. In particular, solutions to eMOOPs are needed in complex computational combinatorial problems that involve changing and uncertain environments. In some cases, the trade-offs required in the family of solutions to eMOOPs involve temporality and shifting biases. Such cases typically consist of an interactive process in which a computational system is interacting with an indeterminate environment.

The present system provides important solutions in several categories of applications that involve eMOOPs. In particular, the present system is used for network computing, artificial neural networks, protein network modeling and evolutionary systems that involve collective behavior.

U.S. Pat. No. 5,440,723 (Arnold patent) addresses the "automatic immune system for computers and computer networks." However, this patent, which anticipates the major developments in autonomic computing in distributed network environments, is focused only on defeating an "undesirable software entity such as a computer virus." Similarly, U.S. Pat. No. 7,093,239 (van der Made patent) follows the Arnold patent in focusing on "detecting unwanted code in a computer system." Consequently, the Arnold and van der Made patents seek only to emulate the performance of the HIS in identifying and attacking viruses in the network computing environment. These first automated anti-virus computer developments provide the groundwork for the present invention.

The novelties of the present invention, however, allow it to surpass the focus on network security. The present invention uses the AIS as a major category of metaheuristic to solve combinatorial problems, particularly complex eMOOPs, in a range of important network environments. The specificity of applications is detailed in this disclosure.

SUMMARY

The present invention consists of three layers: (1) humoral layer (Layer 1), (2) adaptive layer (layer 2) and (3) anticipatory layer (Layer 3). While the present system discloses numerous novel methods for Layers 1 and 2, the third layer is totally novel in this artificial immune system (AIS3). Layer 3 provides modeling and future predictions to the overall system. Taken together, these three layers present specific dynamics that have numerous advantages and applications that appreciably advance the state of the art of metaheuristics in solving eMOOPs.

In Layer 1, a known antigen triggers the cloning of antibodies to produce cascade effects in which antibodies are recruited in real time to attack the antigen. Different types of antibodies in the collective are coordinated via the use of global information that increases the efficiency of their operations. Various methods are employed to accelerate the time lags of the traditional linear immunity process.

In Layer 2, the encountering of new antigens compels antibodies to create a complementary mold to defend against the antigens. This information is then provided in real time to apply at Layer 1. Layer 2 solves the immediate problem (antigens) and stores the solution in memory to pass on the Layer 1.

Layers 1 and 2 provide information to Layer 3. At Layer 3, pathogens are modeled and analyzed. Antigen mutation vectors, the cooperation of antigens, the environment and the behavior of the AIS itself, are modeled with multiple variables. Various modeling scenarios of potential antigens are presented. The co-evolution between antigens and the environment is also modeled. The AIS3 itself is modeled in order to optimize its performance in real time, particularly in relation to evolving antigens.

Layer 3 provides key insights to the operation of Layers 1 and 2. By anticipating potential antigen behaviors and mutations as well as antibody solutions, the present system is able to dramatically accelerate the problem-solving component of Layer 2 and the implementation of the solution at Layer 1. Layer 3 modeling also provides information to Layers 1 and 2 about re-organization processes so as to optimize their performance.

eMOOPs Problem Solving

The traditional AIS solves combinatorial optimization problems. However, these multi-objective optimization problems are generally static. These multi-objective optimization problems (MOOPs) rarely involve changing environmental criteria. The adaptive immune subsystem addresses a present problem in its current form and seeks to solve the problem in real time. The main way for the traditional AIS to solve a problem more rapidly is to increase the rate of the cycles through the distributed network rather than to modify the problem-solving characteristics of its algorithms.

The biological HIS solves problems by using a local search approach in a distributed system. The adaptive immune subsystem solves problems in real time by matching the antibody collective to the antigen geometrical configuration. The HIS then passes this information to the humoral immune subsystem. When the system identifies a dangerous, recognizable antigen that is distinguished from the host, it triggers a cascade effect of cloning antibodies by accessing the memory of the prior antigen that was battled by the adaptive subsystem.

The AIS3 has several advantages in problem solving over these earlier models. First, the AIS3 solves evolutionary MOOPs (eMOOPs). Because the present system has a modeling layer, it is able to assess, and anticipate, evolutionary problems. The AIS3 uses modeling to produce various scenarios in probabilistic solutions with a range of horizons. This modeling aspect is critical in order to understand and analyze transforming combinatorial optimization problems. With the AIS3, predictions about antigen performance are able to accelerate the performance of the eMOOP's solutions at Layers 1 and 2. Not only are the problems evolutionary, but the solutions are dynamic as well.

While traditional AIS approaches, and metaheuristics in general, use local or neighborhood search space, the present system develops a new concept of search, namely, the notion of space-time search. This notion more accurately reflects the temporal and evolutionary characteristics of the dynamic problems. Temporal dynamics generally distinguish MOOPs from eMOOPs. Specifically, the notion of space-time search reflects the extensible geometrical transformation of configurations of objects over time.

One way to represent eMOOPs is to analyze the combinatorial geometry involved in joining specific protein elements to create different protein types. In another example, the unique transformations of chemical structures are represented as combinations of atoms in different stable states. In still another example, the unique combination of sub-atomic elements that comprise atoms will transform at key episodes from one stable state to another. In all of these cases of combinations of changing physical properties, eMOOPs involve the extension of elements using combinatorial geometry in space-time.

The main way to emulate the eMOOPs is by using animation modeling processes. The search for solutions to eMOOPs requires a limited mathematical search within constraints over time. The challenge to solving eMOOPs is to realize not only that the problems are evolving, but also to realize that the constraints within which solutions are found also change.

Assessing and testing combinations of solution options for eMOOPs using evolving multiple constraints is the challenge of the AIS3. In general, solutions to combinatorial problems require production of a family of options. Furthermore, because the eMOOPs' solutions transform in time, the range of options constantly changes as well.

One of the solution option constraints involves time itself. The system has time limits within which a problem must be solved. While the system is evolving solutions, the antigen itself is continuing to evolve in order to evade the system. If the system does not solve a problem involving an antigen within time constraints, the antigen will overwhelm the system and it will crash. Thus, to solve problems within time constraints, it is important to establish an allocation of resources.

The problem-solving process itself proceeds in stages in the AIS3. After the initial problem is solved as an outline, a deeper solution is provided in a second phase, while a yet more detailed solution is provided in a later phase of the solution development process. The problem-solving process involves updating and feedback through the whole system in order to improve the results of earlier solution attempts.

In particular, the criteria for solutions change over time as the circumstances of the problem change. The criteria for the priorities of the selection process changes as the conditions of the problem change. The set of solution options changes as the trade-offs of two or more constraints change.

One of the advantages of the present system is the use of global information in a distributed system to access and map local search space over time. The analogy from metaheuristics is adaptive memory programming (AMP) used in local search techniques. In AMP, an accumulation of knowledge is accessed as the metaheuristic proceeds over time. After an initial solution is offered to solve an optimization problem, the search process proceeds to accumulate information that is useful to supplement the solution until a more robust and adequate solution is developed.

The present system uses Layer 3 to develop sophisticated models of problems from information supplied by the actual empirical experiences of Layers 1 and 2 in order to develop a systematic set of solutions to eMOOPs. By using global information that is accumulated in memory and that is accessible in the distributed system, the present system provides a novel set of techniques to solve eMOOPs. The accumulation of information in memory provides a way for the system to learn.

Because information in the system is updated asymmetrically and accessed by antibodies at Layers 1, 2 and 3, the system develops a novel way to provide social learning. Though data are input and accessed locally, they are generally only temporally local, because the information that is accumulated is global. This information also includes data sets on transformative problem solving in a dynamic environment. Furthermore, these solutions are modeled using animation simulations. In using these simulations, the sets of solutions that reveal the trade-offs of multiple constraints are represented as multiple scenarios.

There are several categories of constraints that, in combination, characterize MOOPs and eMOOPs.

For MOOPs, these constraint categories include:
Space (geometric extension and change-of-state space)
Memory types (central memory, distributed memory and associative memory)
Database architecture (central database, active database and distributed databases)
Search types (local search, neighborhood search and global search)
Learning types (accumulated learning and social learning)
Data analysis (pattern analysis and distributed data analysis)
Distributed nodes (scalability and size of network)
Resource constraints (computational resource constraints, memory resource constraints, logic and analytical resource constraints and communication resource constraints)
Resource optimization (efficiency, minimal resources need to solve problem)

For eMOOPs, these constraint categories include:
Temporality (space-time and evolutionary processes)
Change of state (rate of change, periodicity of change, equilibrium and disequilibrium)
Game theory modeling (temporal simulations and discontinuous change)
Collective behavior (relations with neighbors and relations between autonomous entities)
Social learning (collective relationships between autonomous agents in learning)
Environmental feedback (symmetric, asymmetric and causes of environmental stimulus)
Endogenous feedback (endogenous stimuli and reaction timing)
Data analysis (evolutionary data analysis)
Restructuring modalities (deterministic, indeterministic and relations of structure and function)
Resource optimization (peak and off peak, routing optimization and scheduling optimization)
Restructuring conditions (trigger transformation conditions, quality of weights and threshold conditions)

ADVANTAGES OF THE INVENTION

The present system has a host of useful advantages. The invention advances the use of "memory" in distributed systems. Rather than limiting a distributed system to local memory, the present system provides several levels of actual memory use.

Due to its use of an enhanced memory system, the present system is also strategic. The AIS3 is viewed as a sort of "cognitive" system in its interaction with the environment. Specifically, the present system provides a novel model for social learning with the aim of solving complex optimization problems.

The AIS3 system dramatically accelerates the problem-solving mechanisms of this type of metaheuristic. By adding an artificial layer to the traditional AIS model that anticipates the actions of possible antigens, the present system provides a more rapid reaction to solve problems. In particular, Level 3 is useful in identifying, and optimizing, resource constraints. Consequently, the AIS3 model limits the overreaction as well as the misdirection inherent in traditional AIS models.

The present system is also more flexible than earlier AIS models because it anticipates antigen scenarios. Thus, it is useful in a far broader range of applications than traditional models.

The present system is able to evolve solutions by integrating aspects of all three layers interactively. This ability provides maximum efficiency to problem-solving capabilities. The interaction of active and analytical (modeling) problem-solving functions provides further performance enhancements. The AIS3 system allows the application of the learning process to complex evolving systems.

DETAILED DESCRIPTION OF THE INVENTION

(A) AIS3 Layer 1

As in the traditional AIS, Layer 1 is the site for performance of actions of antibodies to solve the main problem of defending against antigens. Layer 1 is the active layer that uses the analyses performed at other layers and passed on to Layer 1 in the form of memory of past solutions. Layer 1 interacts with the environment to apply previously developed solutions. In addition, since it is actively interacting with its environment, Layer 1 provides the site for active experimentation of proposed solutions from other layers to test if a proposed solution actually works. The information that is obtained on active solutions used at Layer 1 is then passed on to the other layers in the AIS3 so that they may update their databases and develop new solutions.

(1) Swarm Intelligence in Distributed Collective of Autonomous Agents: Layer 1 as Active Layer and Interactive with Environment Swarm intelligence is a form of metaheuristic that involves the sharing of information between multiple independent agents in order to solve a problem. Ant colony optimization (ACO) uses external pheromones so that individual ants can communicate within the collective to accomplish a task such as foraging for food. Similarly, particle swarm optimization (PSO) is a metaheuristic which emulates a swarm of insects by shifting the leader of a collective whose members interact with their neighbors to obtain and share information to solve problems.

Layer 1 of the AIS3 uses a form of swarm intelligence called stochastic diffusion search (SDS) in which the members of the collective communicate with each other directly. In this case, the autonomous agents are specialist antibodies that work together in a division of labor by making multiple passes through the system. The specialist antibodies have specific functions such as the ability to perform an operation or to activate other specialist antibodies. Applying SDS to the collective of specialist antibodies allows antibodies to communicate directly with other specialist antibodies as they are processed through the distributed network.

The autonomous antibodies at Layer 1 only have specific information relating to their particular functions and the ability to interoperate with other specific antibodies. This communication system, by employing the SDS metaheuristic model, allows direct, but limited, exchange of information. In the context of an HIS, antibodies are proteins that interact in the distributed immune system network by providing signals and seeking the appropriate binding fit to solve problems such as defending the host from antigens.

Layer 1 works by organizing several phases of operation. In an initial position, the antibodies patrol the distributed network to identify malicious antigens. Once identified, antigens are attacked by different types of cooperating antibodies. In most cases, the antigen is known and solutions are easily applied. In those cases in which the host identifies new antigens for which past solutions are not available, the challenge of finding new solutions is passed to Layer 2.

By employing the model of collective behavior, the AIS3 Layer 1 simultaneously cooperates (by using the SDS metaheuristic for direct communication between specialists) and interacts with its environment to apply solutions to problems that have largely been already encountered. In some cases, new solutions to new problems are also tested at Layer 1 as well.

(2) Different Levels of Completeness of Cascade Effects for Computational Efficiency and Resource Optimization in Dynamic Environment Level 1 implements a cascade effect of generating and coordinating a number of specialist antibodies in order to solve the problem of attacking a known antigen. This cascade process is a key method of organizing collectives of autonomous agents using a form of swarm intelligence. The information that the individual antibodies have is limited to access to a neighborhood region of antibodies. However, given the fact that the antibodies are in the distributed network in a constant state of motion, they are constantly interacting with a range of specialist antibodies and using the SDS metaheuristic to obtain and share information with other specialist antibodies.

The cascade effect of Layer 1 uses the clonal selection process in which antibodies are generated from other antibodies on-demand. Once a specific threshold is met, such as the identification of a known antigen, information is passed to specific antigens which then generate other antibodies in order to apply the solution of attacking the antigens. To conserve resources, the antibodies perform cascades in stages of escalation, when specific thresholds are met, in the form of cascade escalation scenarios.

Once the solution has been applied and the antigens are reduced, the antibodies that were generated to apply the solution are removed and the system gradually moves to an equilibrium position.

(3) Social Learning: Network Collaboration in Distributed System, Both within Layer 1 and Between Layers The organization of the collective of antibodies in the AIS3 distributed system represents a form of social learning. Specifically, teams of specialized antibodies work together to share information and perform specific functions such as assessment of a problem (identification of a malicious antigen), application of a solution, confirmation of successful solution application and return to ordinary equilibrium state with minimum resource burdens. The teams of antibodies work together by using a division of labor and coexist in a heterogeneous distributed system in which they compete with other antibodies to achieve a particular goal.

In order to rise to a social dimension, antibodies in the collective perform functions such as analysis, specific operation activation, interaction with other antibodies and interaction with the environment. By interacting with their environment, the antibodies perform a form of experimentation process with feedback that triggers a particular function once a threshold of action is satisfied.

The best way to achieve social learning in the network is for antibodies to train together to achieve a specific objective, such as defeating a known antigen. Once known antigens are detected, specialized antibodies activate a cascade process in order to apply known solutions to overwhelm the antigens. Evidence from past experiences with similar known antigens is used to rapidly train the antibodies.

Layer 1 conducts trial runs to defeat the antigens. The AIS3 applies the known solutions to the antigens and obtains initial environmental feedback. If the solutions work, the antigens are defeated and the Layer 1 antibodies recede to the initial equilibrium state. On the other hand, if the solutions do not work, a process of interaction with the antigens proceeds. In this case, Layers 1, 2 and 3 work together to generate solutions to defeat the antigens. The new, or supplemental, solutions are applied, and the system then obtains feedback from the antigens to ascertain the effectiveness of the proposed solutions.

This process is a form of social learning because it incorporates aspects of information exchange, environmental interaction and feedback and solution revision; all of these aspects involve the self-organization of multiple agents in a distributed network. Once a solution is tested and confirmed, the Layer 1 antibodies return to the initial equilibrium state in order to conserve resources.

(4) Danger Theory Application to AIS: Key Threshold of Behavior as Specified Before Action and Requirement of Antigen Threat Assessment One of the key elements of AISs is the identification of a distinction between self and non-self by antibodies. If an antibody cannot make this distinction, it may attack the host after confusing the host with an invader. Similarly, an AIS's antibodies need to identify invading antigens, which are non-self.

Danger theory is applied to AISs when invaders that stress or kill cells induce signals which hence allow their identification as dangerous. Establishment of criteria to activate the AIS3 is critical for optimal operation. The AIS cannot be deceived by endogenously derived signals when it must be activated by inputs from exogenously derived signals generated by hostile antigens.

The AIS3 is activated by satisfaction of specific thresholds which are clarified before inducing an action. While the self/non-self distinction is important, it is also important to develop a coherent method to activate antibody behaviors after a threshold is satisfied in order to attack hostile antigens. The specific threshold is used initially to identify the hostile antigens and then to test known solutions at Layer 1. This threshold limit must be set at a high level before the initiation of an attack by aggressive antibodies that will drain valuable system resources. After obtaining feedback from the network about the progress of the applied solutions, the system will either modify its use of antibodies or will limit its response and return to the initial equilibrium state.

Danger theory is not applied to all cases in the same way. For instance, there are degrees of hostility of antigens as well as degrees of hostility of responding antibodies. The response to some mild antigens will be mild in order to conserve scarce computational resources, while the response to some aggressive antigens will be correspondingly aggressive and escalating. In nature, not all host bodies are in the same condition; weaker hosts will not be able to fend off aggressive antigens as rapidly as stronger hosts. Similarly, the efficiency criteria of computational economics require that degrees of danger be identified so that resources may be allocated proportionately. As more information becomes known about a particularly hostile antigen, the AIS3 will allocate more capabilities to solve the problems. A relatively benign antigen, on the other hand, will not require intensive computational resources.

In time, the AIS3 will evolve a stochastic model to assess the relative danger from the initial contact with an antigen. After first running through the database library of known antigens, Layer 1 produces antibodies to match the antigen, proceeds to apply known solutions and obtains feedback to assess the relative effectiveness of the solutions. The evolutionary development of this process produces an outcome that assesses danger from the viewpoint of statistical relevance, with the most statistically probable assessment and outcome generated from Layer 1 experience. New experiences add to the database library and continue to expand and modify future probabilities.

In another embodiment of the system, exogenous data provides information to the AIS3 in order to develop an assessment of the conditions for specific antigens and their prospective solutions. Multiple external environmental variables are assessed in terms of providing the conditions for antigens to survive. Danger theory assesses these conditions and the system adjusts the thresholds of activation of antibodies accordingly. These external conditions may be the key determining factors that inform the AIS3 of the nature of the antigen threat for which Layer 1 must prepare and attune its activation threshold.

Layer 1 possesses both the antigen identification function, which employs danger theory, and the active and interactive functions of applying and assessing solutions.

(5) Greedy Antibodies in Exogenous Ecosystem: Competition of Individual Antibodies in Cooperative System that Distinguishes Between Self/Other to Solve Problems The main unit of operation in the AIS3 is the antibody, employed by the system in collectives. The antibodies compete among themselves, yet, collectively, work together cooperatively as well. In the AIS3 ecosystem, each individual antibody is autonomous and "greedy", that is, self-interested.

In natural biological immune systems, antibodies are "trained" at the first level of the humoral immune system such that they will "mature" in the host so as to learn to distinguish between foreign invaders. As observed above, it is crucial for antibodies to recognize the self/other distinction—also referred to as major histocompatibility complex (MHC) in the HIS—in order to detect the level of danger of antigens and to activate collectives of antigens against intrusions.

In the AIS3, groups of specialized antibodies work together collectively in order to perform specific functions. Specific teams of antibodies will coordinate an attack on specific antigens. Once activated, the antibodies collaborate and cooperate in order to attack the antigens, yet each antibody is an autonomous entity. The competition between the antibodies is coordinated by the specialized functions of each antibody type. When the most aggressive antibodies are generated once a key threshold of activation has been satisfied, they are applied to solve the most difficult problem of attacking intransigent antigens. By working together in a specialized way, the various types of antibodies perform their collective functions to maximize system benefits.

One way to set the priorities of the various antibodies to achieve common system goals that benefit the whole system is to offer rewards and penalties. In particular, antibodies in the system have an aversion to penalties. In the biological HIS, the most aggressive antibodies are only summoned contingent upon a high activation threshold, because their generation has a high cost of resource consumption; when they are used, the host's temperature rises because their system is taxed by the antigen infection. Similarly, in the case of the AIS3, the identification of hostile antigens requires the development of a series of steps to attack them by calling upon the various types of antibodies in successive attempts.

The system thus maintains equilibrium between both system elements: (1) the self/other distinction to generate self-interested autonomous antibodies on-demand that will not attack the host but will rather identify and attack antigens and (2) cooperation between autonomous specialized antibodies to efficiently perform the tasks of attacking antigens with minimal resource expenditures.

(B) AIS3 Layer 2

Layer 2 addresses real-time problem solving. The problems that are not solved at Layer 1 are passed on to Layer 2. Specifically, problems presented by new antigens are solved at Layer 2.

In the HIS, the adaptive immune system solves problems by developing specialized antibodies that "complement" the geometric shape of the new antigen. The new solutions are then passed on to Layer 1 so that subsequently identified antigens are attacked by using these new solutions. Layer 2 is referenced to as the adaptive immune system because it constructs a unique solution to a new antigen by adapting to the antigen itself. Once the solution is passed on to Layer 1, immunity to the new antigen is established. In the traditional AIS, Layer 2 solves a new problem with a new solution and passes on the solution to Layer 1 for future encounters in the form of a simple memory.

In the AIS3, Layer 2 addresses a class of complex optimization problems called evolutionary multi-objective optimization problems (eMOOPs). These problems are not generally solved at Layer 1 and require novel and creative solutions. Layer 2 therefore constantly evaluates and solves critical combinatorial problems at the frontiers of the system's ability to solve problems.

Layer 2 works with Layer 1 because proposed solutions to new problems are tested at Layer 1; Layer 2 therefore receives information on the efficacy of its solutions from Layer 1. In addition, Layer 2 works with Layer 3 to assist in the modeling of solutions to problems. Whereas the traditional AIS ultimately solves problems within constraints, the AIS3 provides methods for accelerating the generation and application of solutions as well as more complex solutions to more complex eMOOPs than the traditional AIS. Layer 3, for example, assists Layer 2 in the early detection of antigens.

The evolutionary character of the AIS3 and the environment that generates the antigen problems provides a robust challenge for Layer 2 to create novel solution candidates for novel eMOOPs. The existential challenge for solving problems in real time falls to Layer 2, which is on the front line in the battle with novel antigens. Once Layer 1 applies solutions to hitherto-known antigens, the main challenges of the most difficult battles with new antigens would have been over because the initial solutions were discovered at Layer 2.

Layer 2 uses a range of processes to solve eMOOPs, including surveillance, diagnostics, experimentation, geometrical combinatorial optimization, solution generation, solution testing, training of antibodies with antibiotics and passing the solutions to Layer 1 in the form of highly developed memory.

(6) Layer 2 Devises Mechanism to Adjust Ais to Antigen Hypermutation Sequences

Layer 2 develops mechanisms to adapt to new antigens. In some ways, the characterization of the role of Layer 2 is to fight a war between the host's immune system and constantly changing antigens. In order to defeat the host, the antigens engage in complex evolutionary processes in which they mutate their protein structures. Newly mutated antigen protein structures will confuse Layer 1 of the immune system which relies on pre-defined solutions.

In order to defeat the rapid mutation-generated changes in the antigens, Layer 2 of the AIS3 adjusts its range of antibody mutations. It accomplishes this goal by combining new mutations of antibodies. After it creates new combinations of antibodies, it compares the combined mutations to the newly discovered and mutated antigens to assess the level of success in solving the problem of defeating the antigens. Layer 2 then adjusts its rate and degree of antibody mutation to match the evolution of the antigens until it meets its goal of defeating the antigens.

(7) Evolution of Layer 2 Memory Mechanisms: Libraries of Problem Solutions as Genealogical Record Layer 2 uses a memory mechanism to collect, access and transmit information to and from other layers in the AIS3. In the HIS, memory from the adaptive immune system is stored as immunity to an antigen, after a solution to defeat a newly discovered antigen is found by developing a geometrically complementary combination of antibody proteins. The unique geometrical combination of antibody proteins is then remembered and accessed by the humoral immune system when the same antigens are discovered so as to better prepare a rapid response to a hostile invader. In traditional AISs, the memory mechanism emulates the HIS by creating a distributed network with autonomous agents interacting with local search processes.

Rather than being limited to local search protocols, the AIS3 system, contrastively, uses global information in local search. This novel advancement of the art provides a range of advantages. Particularly, the geometric combination of antibody proteins and the experimentation process used to discover each unique configuration are stored in a central memory that is accessible to all three layers. Information from any layer can be stored and accessed by any of the other layers at any time. This process of memory storage and access dramatically accelerates response times by providing a storage library of past experiences with solving complex problems. Use of this memory system allows an accumulation of experience that facilitates better preparation of solutions for successive rounds of problem solving.

With use of the present memory system, relevant past generations of problem solving are drawn upon and analyzed for solving present problems.

(8) Artificial Antibiotic Fortifies and Directs AIS3 Antibody Response

As in an HIS, antibiotics are applied to help the immune system create antibodies to fight a particular antigen. In the AIS3, antibiotics fortify different specialist antibody types by activating the generation of a specific antibody. By activating specific antibodies, the system rapidly generates an antibody response to a particular antigen. In effect an artificial antibiotic stimulates a system-wide surge by activating particular catalytic antibodies on-demand. Use of the artificial antibiotic "tests" the immune system to produce a desired effect. The antibiotic also fortifies a strained immune system by activating specific elements at key times without taxing the whole system. An antibiotic may be applied at Layers 1 and 2 to stimulate antibody production.

(9) Artificial Predators in Ecosystem to Proliferate or Restrict Antigens

The conditions of the environment in which antigens proliferate are critical to their existence. In biological systems, ideal conditions for the proliferation of specific pathogens, such as bacteria, include optimal temperature, water and food source. In the AIS environment, antigens have optimal conditions that determine their robustness. If these conditions are altered, the antigens will be weakened or destroyed.

In biological systems, equilibrium of conditions maintains the survival of antigens according to ecosystem dynamics. Removal of one variable results in a species developing in a different direction and rate. For instance, if a natural predator is removed, the species will proliferate, while if a predator is enhanced, the species will die off.

In an AIS, the artificial ecosystem produces similar situations, with an equilibrium between specific species in the food chain. Removal of a predator for one hostile species will allow the species to proliferate; enhance a predator and the species will weaken. Similarly, if the conditions for a hostile antigen are changed, it is possible to change its progress. Increasing the stress on the antigen by raising or lowering the temperature, for instance, weakens the species by placing it outside its optimal condition for survival.

Ecological dynamics are important to the AIS3 because the environment in which the antigens proliferate determines the conditions of success or failure. By modifying these conditions, including exogenous conditions (temperature, water and food) and endogenous conditions (hostile predators), the rate of change of the artificial evolutionary processes is modified and the effects on antigens change.

Understanding ecosystem dynamics is critical for Layer 2 to apply its solutions to antigens because these exogenous dynamics determine the conditions for antigen structures and behaviors.

(10) Methods of Discovery: Constant Experimentation of New Pathways of Problem Solution Based on Experience In order for Layer 2 to solve complex problems, it must experiment to find new solutions. In general, the first step is to compare the current problem to experience. The AIS3 accesses the central database library in order to discover both prior solutions and the methods used to solve earlier problems.

Layer 2 then assesses the problem itself. By analyzing the antigen, the AIS3 evaluates data sets of the current problem by comparing the problem to earlier problems in the database library of problems and prior attempted solutions.

Layer 2 uses an experimentation process to generate solutions to eMOOPs. The solutions are tested, and ranked, with the successful solutions preserved and stored in memory. As the solutions are tested by applying solution candidates to the antigens, feedback on the effectiveness of the solutions is provided. The system then evolves improved solutions until the eMOOPs are adequately solved.

(11) Collective Teaching Processes to Pass on Global Information to Future Generations The present system transmits information globally in order for individual antibodies to access information on-demand. Solutions to problems are forwarded to the central database and then accessed by antibodies as they make passes through the distributed system. Not only does the system provide social learning processes to collectives of antibodies about solutions to specific experiences, but antibodies teach other antibodies directly about specific experiences. In particular, antibodies that solve specific problems pass on the information to teach future generations of antibodies. Use of information from past generations of problem solving makes attempts to solve new problems more successful.

While social learning is performed in the AIS3 as trial and error with multiple antibodies seeking to solve problems, social training is a directed approach in which the solutions that are detected by the successful antibodies are passed on to other, future, antibodies. Specifically, solutions from Layer 2 are passed on to teach antibodies at Layer 1 for future problem solving.

In another embodiment of the present system, the system uses distributed databases to store and retrieve information about past experiences. This model is particularly useful in a distributed network in which no one node is dominant or centralized. In this case, the antibodies are constantly moving through the system and accessing the next available node as they make their rounds. Information is passed on to the first available node, which then interacts with and updates all the other nodes in the system.

(12) Geometric Typologies of Evolutionary Mapping Processes: Antibodies Make Geometrically Complementary Replica of Antigen In the HIS, antibodies in the adaptive immune system identify a new antigen and cluster on its surface in order to create a mold of its unique configuration. This process identifies the binding sites that allow the antigen to proliferate; by suppressing the binding sites, like fitting a key in a lock, the antibodies defeat the antigen and thereby solve the problem that the hostile invader imposes on the host.

Traditional AISs generally emulate this model of antibody collectives working together in the adaptive immune system to fit into the antigen in order to create a unique solution to attack the antigen. The limits of the traditional AIS to local search methods of obtaining and sharing information, however, severely constrain the timing of the creation of solutions to the problem of the antigen. As in the HIS, if the problems for the host are not solved in time, the host will die (system crash).

In the AIS3, geometrical combinatorial optimization techniques are applied to problem solving. After first identifying the antigen as a new type of hostile invader, by comparing it with antigens with which the system has had experience and discovering that the present antigen does not conform to previous experiences, Layer 2 will begin the process of analyzing the antigen. A collective of antibodies spreads around the surface of the artificial antigen in order to assess the unique topological characteristics of the antigen. The antibody collective assesses the antigen as a geometrical pattern-matching problem. Once it identifies the unique contours of the new antigen, the antibody collective re-combines in order to generate specific geometric topological solutions over time.

In Layer 2, the antibodies recruit other antibodies to make a geometric "mold" of the antigen. The antibody mold is geometrically complementary to the antigen. In effect, the antibodies generate a replica of the antigen. This geometric information is then analyzed and the complementary mold is used to defeat the antigen as quickly as possible with as few resources as possible.

To defeat the antigen, the AIS3 proceeds on two fronts. First, at Layer 2, the system uses its complementary mold to produce antibodies that penetrate the antigen and disable its hostile capabilities. Second, at Layer 1, the system tags the antigen and produces a cascade effect that attacks and engulfs the antigen until it is defeated.

(13) Reverse-Engineering Process to Pick Out Optimal Antigen Pathway

Antigens are continually evolving. The challenge of the AIS3 is to identify the evolutionary vectors of antigen development and to generate antibody solutions in order to defeat the antigen within time and resource constraints. The evolutionary change in the environment that generates the antigens' developmental pathway vectors provides the context for the AIS3 to produce solutions to defeat the antigens. The challenge of the present system is to identify ways to develop and track successful evolutionary pathways of antibodies that will defeat the evolving antigens.

The AIS3 produces an analysis of the antigens at Layer 2. This analysis is based on initial interactions between the system's antibodies and the antigens. The antigens are reverse-engineered in the antibody analysis by comparing the initial analysis of the antigens with prior experiences with similar antigens. This comparison between different stages and types of antigens provides useful information about the evolution of the antigens. The possible pathways of antigen evolution are then analyzed, and this information is used to develop solutions to defeat the new antigen. Once a new solution is applied and is successful in defeating a new antigen, the data are recorded in memory for a future episode with a newer strain of antigen.

(14) Efficient Genetic Algorithms to Test Mutation Pathways of Antigens

Artificial antigens evolve in distinctive but predictable sequential patterns. These evolutionary processes use the main mechanism of genetic mutation in order to survive by defeating prospective host defenses. The genetic mutations of antigens produce specific pathways of evolution, the vectors of which may be tracked. In addition, the rate of antigen mutation is assessed.

Use of genetic algorithms (GA) is a valuable way to model the mutations and pathway vectors (and development rates) of antigen evolutionary processes. Genetic algorithms are computational entities that combine specific genes to create a generation of solutions to fitness problems. The solutions are compared to the environment, and the most successful solutions are retained and combined in unique ways in order to generate better solutions for many generations until the problems are solved.

Narrowing the range of the antigen evolutionary pathway vectors by using efficient GA processes makes it is possible to assess the limits of antigen evolutionary processes and to test these processes against AIS3 solutions. Once an antigen evolutionary pathway is assessed and tested, it is possible to recommend a solution to defeat the antigen.

A similar procedure is used to develop the mutation pathway vectors of antibodies in the AIS3. After assessing the antigen mutation vectors and rates, the AIS3 analyzes and constructs antibody mutation processes in order to match and defeat the antigens. This model of mutations in antigens and antibodies accommodates a complex view of the transformation problems and evolution processes required to solve problems.

The solution of an antibody (or antibody collective) for the problem of an antigen requires finding the appropriate fit with the antigen's environment. An antigen can be examined on its own in the context of an environment unrelated to a particular host. The matching of a solution to an evolutionary problem is performed by obtaining feedback on the solution candidate from the environment. If a solution works, it is recorded in memory and used again.

In general, the antigen mutation vectors are narrower with antigens that are known and that are addressed at Layer 1, while the antigen mutation vectors are wider (and wilder) with new antigens that are addressed at Layer 2.

(C) AIS3 Layer 3

Layer 3 has several main modeling aspects. First, information about actual experiences is taken from Layers 1 and 2 in order to produce model forecasts of both evolving antigen problems and antibody solutions. Second, external data are used to model the environment regarding possible antigen development. Third, possible antibody solutions are modeled to be tested at Layers 1 and 2. Fourth, specific antigen evolutionary pathway vectors are analyzed and modeled in order to prepare Layer 2 to produce solutions. Finally, antibody mutation development vectors are modeled for use at Layer 2 in order to solve novel evolutionary problems.

The system uses game theoretic modeling to describe and analyze the opposition between antigens from the external environment and antibodies from the host.

The invention uses a memory system to update and access information about its progress in solving complex evolutionary problems. Layer 3 passes on recommendations discovered in its modeling and analyses to Layers 1 and 2, which data are accumulated in order to solve future complex problems.

(15) Information from Actual Experience of Layers 1 and 2 Used for Forecasting The solutions that are applied at Layer 1 are accumulated in memory from prior experiences at solving antigen problems at Layer 2. Layer 1 solves problems that have already been encountered by using known solutions that are accessed from memory. However, Layer 1 is also the site for testing solutions from Layer 2. Layer 1 applies both known solutions stored in memory as well as new candidates for solutions generated at Layer 2.

The feedback results from solutions generated at Layers 1 and 2 provide raw data for modeling at Layer 3. In particular, the approaches and algorithms used to solve problems at Layers 1 and 2 are accessed in the analysis of new and potential problems at Layer 3. This data reflect past experience at solving problems, the successes of which are useful in order to develop new solutions to complex problems.

(16) Game Theoretic Modeling of Possible Solutions to Test at Layers 1 and 2

Layer 3 of the AIS3 produces model simulations of antibodies and antigens in order to produce solutions to eMOOPs. Modeling the antigens makes the problems easier to analyze in order to develop and assess possible solution candidates. Via modeling of the antibody collectives, complex solutions are developed that will solve complex problems.

The model simulations operate by narrowing the range of each problem's parameters. The model tracks the evolutionary mutation pathway vectors of the antigens and continually refocuses these parameters. The modeling process is able to manipulate variables in the antigen evolution process in order to assess the most efficient ways to attack the antigen and save the host.

In most cases, the problem is time sensitive. That is, there are time constraints that must be overcome to keep the hostile antigen from winning the battle against the AIS3 and harming the host. Activation of the modeling process at Layer 3 indicates that Layers 1 and 2 could not easily solve the problem. Consequently, Layer 3 is used in those cases in which the problems are difficult and require new tools. In particular, Layer 3 is activated in cases in which there is high volatility of an environmental change that stimulates antigens and creates a state of crisis within the host. This disequilibrium between the host and the antigen is highlighted by large changes in the state of the environment in which the antigen is active.

Candidate solutions to eMOOPs are tested at Layer 1. If a solution (antibody collective configuration) kills an antigen and thus solves a problem, then the system gradually achieves equilibrium by applying it. Another result of a proposed solution may be to only harm or slow the development of the antigen, thereby achieving another (manageable) equilibrium state. If the solution candidates are not successful at solving problems, then this information is supplied back to the database and the modeling layer will continue to analyze the problem and supply more solution candidates. This testing process continues until the effective solution is identified and applied.

Candidate solutions to complex novel problems are also modeled at Layer 3 and applied at Layer 2. Layer 2 solves new problems, the solutions for which are not available from accessing a database of prior solutions. However, Layer 3 has the advantages of simulating the solutions and applying the solution candidates at Layer 1. These simulations track the performance of Layer 2 and provide potential solutions that are not limited to Layer 2's real-time interactions between antibody collectives and antigens.

By analyzing past experiences, Layer 3 provides simulations of possible solutions that are applied and tested at Layers 1 and 2.

(17) Modeling Forecast Horizons and Probabilities of Horizons with Scenarios

Whereas Layer 1 focuses on applying solutions derived in the past and Layer 2 focuses on the ever-present challenge of developing rapid solutions to existing antigens, Layer 3 focuses on solving future potential problems. Layer 3 develops models that simulate future horizons. These forecasts are developed by analyzing the present challenges and generating potential solutions in the form of scenarios. The horizons of each potential scenario are limited by the quality and timeliness of information and the degree of development of the antigens, the environment and the host's immune system. In general, the near-term forecasts provide a greater probabilistic likelihood of success than longer-term forecasts. Forecasts are continuously updated with new information so as to increase the likelihood of success in the short run.

The application of simulations in Layer 3 to solve complex eMOOPs indicates the anticipatory aspect of the AIS3. Layer 3 models numerous variables in the antibodies, the environment, the antigens and the hybrid artificial immune system in order to develop a way to anticipate behaviors and to efficiently arrive at solutions to complex problems.

(18) Anticipating Events in Immunological Process to Optimize Efficient Strategy for Applying Solutions Simulations of antigen evolutionary processes and antibody collective development provide forecasting tools in the form of probabilistic scenarios of behaviors. These models predict antigen behaviors. The modeling simulations also provide valuable data to recommend efficient strategies for antibody collectives to apply solutions to novel problems. In effect, Layer 3 modeling is used to train the synthetic adaptive immune system, particularly at Layer 2. By providing modeling tools to anticipate events, Layer 2 is increasingly able to rapidly adapt to the changing antigen mutation pathway vectors.

While it is recognized that co-evolutionary processes occur between synthetic antigens and the synthetic antibodies in the modeling process, the system provides concrete ways for the antibodies to prepare for solving problems.

Layer 3's anticipatory capabilities allow the system to be pro-active. The system models not only synthetic antigens but also potential antigens that prepare the AIS3 to produce synthetic antibodies. After the anticipated antigens are identified and stored in memory, the AIS3 pro-actively seeks out and attacks the antigens in real time. This approach provides a dramatically more rapid response advantage relative to traditional AISs and the biological HIS. In these approaches, the adaptive immune system must resolve the challenge of new problems in real time, whereby the most intractable problems might destroy the host. In the present invention, a library of potential synthetic antigens and their solutions is accessed when a new antigen is immediately identified and the problem efficiently solved, thereby conserving valuable resources.

(19) Environmental Modeling System: Environmental Change and Rapid Matching of Antibody Mutations to Antigen Evolution for Host Survival Modeling the environment is preparatory to modeling the antigens and the AIS. The environment contains the conditions for the survival of antigens. Understanding the antigens' ecosystem involves not just determining the conditions for survival but also incorporating the awareness that antigens interact with other species. Remove an antigen's predators and the antigen flourishes; similarly, restrict the antigen's food source and the antigen is stressed. It is within this delicate balance that data about environmental conditions reveal the optimal circumstances for antigen survival.

In addition to the need to model the environmental conditions in order to understand antigens, the model also simulates relations between the antigens. Multiple antigens interact, compete, cooperate and collaborate in order to survive. Inter-antigen dynamics are modeled by the present system in order to demonstrate an accurate representation of exogenous behaviors. Synthetic antigen ecosystem networks are modeled in the present invention. Multi-antigen modeling is necessary in order for a host to prepare to defend against multiple simultaneous antigen infections.

The present system provides antigen surveillance. Evidence is used to track antigens external to the host AIS3. This remote antigen tracking evidence is used to develop the antigen model so as to assess possible threats to the host.

The environment is modeled in particular to assess rapid changes in equilibrium. Crisis periods tend to produce a spike in antigens. For instance, if a sudden temperature change rapidly escalates the number and intensity of antigens, the host AIS3 must be prepared to respond. The trends in the exogenous environment are carefully monitored by Layer 3. The analysis of these trends is used by the modeling system to predict the trajectories of the antigens. By anticipating the direction of the development of the antigens, the AIS3 is able to better to prepare responses and to solve the evolving problems.

The modeling of the external environment and the antigens is useful in order to rapidly evolve synthetic antibodies and to match these possible solutions to the actual problems encountered by the antigens. By anticipating the trajectories of the antigens, the AIS3 is able to optimize the most effective solutions to guide the development of antibodies.

(20) Co-Evolutionary Modeling: Co-Adaptation of Immune System Processes and Environment It is difficult to understand the AIS modeling process without understanding the antigen and environment modeling processes. This insight reveals that antigens and antibodies co-adapt. The antibodies must solve problems of antigen evolution because the price of not solving the problem may be the death of the host. Yet, in order to survive in a host, the antigens continually mutate, staying one step ahead of the antibodies' evolution rate.

In a deterministic environment within equilibrium, the conditions for antigen adaptation are stable within the constraints of definable parameters. However, in an indeterministic environment, the AIS3 models the exogenous system within a narrow range of future possible scenarios and forecasts the behaviors of antigens. Antigens develop at different rates and in different evolutionary directions based on the environmental conditions and mutation pathway vector variability.

Antibodies in the host AIS3 will counter the evolution of the antigens. Their evolutionary developments mirror and exceed the mutation pathway vectors of the antigens. This co-evolutionary game is modeled like a constant war between rival tribes.

(21) Virus Modeling

In biological systems antigens consist of both bacteria and viruses. The class of viruses presents an interesting case for the modeling of antigens in the present system because of their complexity.

Viruses are modeled in the present system by simulations that track their mutation pathway vector trajectories and rate changes. Because viruses are geometrically extensible entities, combinatorial optimization and evolutionary computation techniques are applied to analyze their evolutionary mutation combinations as they are mapped out over time.

In particular, the hypermutation rates of synthetic viruses are analyzed in the present system. Hybrid genetic algorithms are applied to analyze the mutation pathway vectors and rates. In the modeling process, artificial viruses are evolved by manipulating the mutation variables. In addition, viruses supply signals to the AIS3 in order to detect particular hypermutation direction vectors and rates.

The present system establishes a typology of synthetic antigens. By keeping an inventory of artificial viruses, the system is far more likely to solve problems rapidly because it has a frame of reference to assess new antigens. The system maintains not only a catalogue of synthetic antigen structures but also a library of solutions to past antigen problems that are solved by antibody collectives. By maintaining easily accessible inventories of both problems and solutions, the system is better prepared to solve future problems as they are encountered. The present system also develops active models of the viruses, beyond their mere structures, in order to assess the probable trajectories of their evolutionary potentialities. This complex modeling library is important for solving real and potential problems.

While game theoretic modeling is typically used to simulate specific competitive events between teams of agents, the present system also uses modeling to simulate the cooperation and collaboration of collectives. On the antigen side, the present system models the cooperation of teams of antigens. In some cases, antigens engage in symbiotic relationships to increase the probability of survival in hostile environments.

On the antibody side, teams of specialized antibodies work together and collaborate to defeat the antigens as efficiently as possible. Particularly because they have different specialists and different levels of action, groups of antibodies compete among themselves by supplying incentives and penalties in order to increase the effectiveness of their collective mission. In this way, competitive individual autonomous agents will cooperate in a global system.

The present system uses modeling to simulate the experimentation process of viruses' evolutionary strategies. The system tracks the evolutionary trajectories of the viruses and anticipates specific vectors. In some cases, the simulation will not disclose the virus strategy or will actively conceal the strategy in order to prepare an effective antibody response.

Modeling simulations are used to test possible solutions to problems. By adjusting the variables in semi-random ways, the model tests feedback in uncertain environments.

Once a virus is identified and modeled, the system passes on the recognition of these possible trajectories and forecast scenarios to Layers 1 and 2. Once Layer 1 is activated, a cascade of antibodies envelops and destroys the antigen. The present system also helps Layer 2 better prepare for defeating novel antigens.

(22) Tag Targeted Antigen to Slow Evolutionary Rate

In another embodiment of the present system, a targeted antigen is tagged by the AIS3. The aim of the tagging process is to slow the evolutionary rate so that the system may develop a defense to the antigen.

In the biological HIS, the humoral immune system will tag an antigen in order to attract a collective of antibodies to the antigen for its envelopment and destruction.

The present system, however, tags antigens primarily to track their development and to inform the modeling system about their evolution. By actively modulating the antigen development rate, the antigens may be not only studied but also controlled. In fact, the present system will run tests on the antigen by tracking its performance.

(23) Artificial Vaccines

The design, development and application of artificial vaccines are useful features of the present system. By reverse engineering the artificial synthetic viruses, for example, it is possible to extract information that is useful in creating an artificial vaccine. The vaccine is constructed of unique combinations of geometric elements of the virus.

The vaccine is input into the AIS3 in order to better prepare Layer 1 and Layer 2 to perform. This is similar to training the system and leaving the system on a higher state of alertness. Vaccines behave as artificial boosters to highlight specific antibody features on demand. Use of vaccines fortifies specific elements of the AIS3. The use of vaccines is particularly applicable when Layer 3 recognizes and expects a future attack from an antigen; applying the vaccine just-in-time prepares Layers 1 and 2 to respond to the actual presentation of the expected antigen.

Modeling is used to reverse engineer a vaccine by simulating an artificial virus. The resulting vaccine is used to stimulate the AIS3 to activate specific antibody functions. The main aim of creating and applying a vaccine is to trigger the immune system operations, primarily at Layer 1. By educating Layer 1, the system accelerates a response to a real antigen threat and thereby optimizes the system.

(D) Dynamics of Layers 1, 2 and 3

While Layer 1 represents the cascade effects of antibody collectives in the humoral immune system and Layer 2 represents the problem-solving and learning process of the adaptive immune system, Layer 3 represents the anticipatory process of the modeling system. The three layers are interactive and dynamic. Layer 1 deals with applying past solutions and testing new solutions, Layer 2 deals with solving new problems in real time and Layer 3 deals with solving potential problems and developing future scenarios of problems and responses. Each of the layers represents a different line of defense against antigens and solves increasingly complex problems.

The three layers are coordinated. Information generated at Layers 1 and 2 is input into the models of Layer 3. The problems that are solved at Layers 2 and 3 are stored in memory and are accessed for future problem solving at Layers 1, 2 and 3. Each successive layer is used to solve increasingly harder problems, with information obtained from these solutions available to share in future problem-solving encounters.

(24) Asynchronously Training Each Layer

Since each layer operates independently, each layer is trained separately. Layer 1 is trained by the experience of Layer 2 at solving new problems, the solutions of which are passed on as immunity (memory). Layers 1 and 2 are also trained by the theoretical calculations of Layer 3, which anticipates and solves potential problems. Layer 3 is informed by data from Layers 1 and 2.

Though the three layers work together, the timing of each layer's training is independent and asynchronous from the others, with data entering all three layers at different times and different activation thresholds pertaining to each layer. Further, the different layers demand different kinds of training. At Layer 1, the training is limited to routine responses that are triggered by specific events. Although the training at Layer 2 draws on experiences from Layer 1 and analyses from Layer 3, the training is completely original each time problem solving is attempted. Finally, at Layer 3, the training is based on the conditions in the environment; with complex environmental conditions of multiple aggressive antigen hyper-mutation vectors, Layer 3 will model a range of solution option simulations much like a traffic controller.

Overall, the AIS3 layers cooperate to achieve a mission within time constraints by sharing information and acting in sequence to solve problems.

(25) Combining Forecasting Scenarios and Memory

Memory is used to share information. Memories from past experience or analytical models are stored in a central database or in distributed databases for access by all three layers. This accumulation of information in a common memory provides the system with competitive advantages. In another embodiment, each layer will also have its own memory functions in order to accelerate its performance.

Layer 1 accesses the problem solving of Layer 2 in the form of immunity. By emulating Layer 2's experiences with creating precise solutions to then-new antigens, Layer 1 draws on this memory when encountering a similar antigen. Similarly, Layer 3's analyses and forecasts are used by Layer 1 to implement concrete solutions to projected problems and by Layer 2 to accelerate the performance of problem solving by including forecast scenarios.

The AIS3 model unifies the three layers (using the temporal analogy of past, present and future) to solve eMOOPs rapidly within resource constraints.

(26) Learning from Most Recent Experience: Improving on Next Generation Solutions with Projected Problem Solving One of the advantages of the present system is that there are several opportunities to solve problems. If the first layer cannot solve the problem, there are other fail-safes that will attempt to solve the problem. One advantage of this model is that there is improvement at each layer as the system increases its problem solving resolution and adds new tools to meet the challenge. Escalation from one layer to the next also has another benefit: new solutions are provided with fresh evidence of recent successes.

The most recent experience of problem solving is also the most recent information provided in memory, with the highest quality of information, and is thus the first data accessed when seeking to solve a similar problem. Particularly since antigen mutation vectors are generally narrow, deviation from one set of solutions will not vary appreciably. As similar antigens are discovered, memory is accessed to provide similar solutions. This memory-transfer function is typical in passing information from Layer 2 to Layer 1.

However, a totally new kind of antigen will require a new sort of solution unrelated to past solutions. In these cases, memory of past eMOOPs and problem solving are of little guidance except for the abstracted qualities that allow a new problem and solution to be inferred from elements of the past. For these new problems, improving on next generation solutions with projected problem solving is critical. Layers 2 and 3 work together to analyze the problem, to generate solution candidates and to test the candidates.

(27) Pre-Immunity of Forecast Modeling Passed from Layer 3 to Layers 1 and 2

Layer 3 performs modeling simulations on novel or potential problems in order to generate novel solutions. Once an initial set of solutions is generated at Layer 3, solution candidates are presented to Layer 2 for testing through actual interaction with an antigen. Specifically, Layer 3 shows how an attack is expected. Layer 3 evaluates the timing of a possible attack by an antigen by modeling the antigen mutation pathway vectors and consequently provides a critical method to help the system plan.

Analyses from Layer 3 are also provided to Layer 1 for immediate implementation of the plan to action. Though Layers 2 and 3 will work together to analyze and test new solutions, the solutions are implemented for full-scale application at Layer 1. Immunity (solution memory) is then passed from Layers 2 and 3 to Layer 1. Analyses of possible antigens and antigen solutions are passed from Layer 3 as a sort of "pre-immunity" by providing information that may be used in actual battles with antigens at Layers 1 and 2.

(28) Training Layers 1 and 2 with Modeling from Layer 3

In addition to providing memory between the layers, Layers 1 and 2 are trained with information provided from modeling analyses at Layer 3. Analytical information alone is not sufficient to solve eMOOPs. Interaction between the AIS3 components, particularly at Layers 1 and 2, and the antigens (and the environment) is necessary in order to discover successful solutions. This trial and error process is indispensable and provides critical experience to the overall system. In general, Layer 1 is the operational and active reactionary layer, though Layer 2 is also reactionary.

Information from all the layers usefully assists in the training of Layers 1 and 2 in their actual interaction with antigens. However, the purely analytical data sets provided by modeling simulations at Layer 3 are particularly useful for assisting Layers 1 and 2 in their actual operations. As the experiences of Layers 1 and 2 are carried out, Layers 2 and 3 provide information on novel solutions to complex problems that are used to train the first two Layers, with information from Layer 2 training Layer 1 and information from Layer 3 training Layers 1 and 2.

This training process builds immunity as successful solutions are provided to solve eMOOPs. This immunity is passed on to Layers 1 and 2 for future action. The information is also passed on to Layer 3 in order to supply data for future model simulations.

(29) Triggers of Layer 1 as Stimulated by Layers 2 and 3

Since Layer 1 is an active operational layer that directly interacts with the environment to solve problems presented by antigens, it is important to determine the conditions that trigger activities. Layer 1's cascade effects are stimulated by the satisfaction of specific constraints, such as the identification of a hostile antigen. However, Layer 1 can be activated by Layers 2 and 3 as well. For example, Layer 2's (problem solving) experience in combating a specific novel antigen is passed on to Layer 1 for activation when encountering a similar antigen. In this case, a pre-set trigger is constructed from Layer 2's experience in order to stimulate specific Layer 1 actions when a known antigen is encountered.

Layer 3 develops pre-set criteria that automatically trigger a Layer 1 cascade reaction when the conditions are satisfied by the identification of specifications that were developed in the modeling of a potential antigen. This triggering mechanism provides the AIS3 with a head start in combating a potential threat. In this case, the multi-scenario forecast of an antigen is made by modeling simulations to identify the target window of probable activation. This information is then passed on to Layer 1 so that when possible variables are identified that fit the profile of a hostile new antigen, the cascade process will be initiated. If the problem is not solved at Layer 1, it is passed on to Layer 2. The information from both of these layers about the actual attempted solutions and environmental feedback from antigen interactions with the layers is then provided to Layer 3 for further analysis and solution development. This pro-active modeling at Layer 3 is used to better prepare the activities of Layer 1.

(30) Bucket Brigade Sequence: Layer 3 Activates Layer 2 and Layer 2 Activates Layer 1

The modeling functions at Layer 3 provide information to Layer 2 and stimulate specific activities in Layer 2 to solve eMOOPs. Similarly, information from Layer 2 is provided, through memory, to stimulate specific functions at Layer 1. These relationships emulate the bucket brigade model in which one process relies on another, which relies on yet another. In this case, the successive layers are not necessary for the previous layer, but provide important analytical tools for successively more difficult problem solving.

In some cases, the anticipatory functions of Layer 3 will activate the adaptive functions of Layer 2; likewise, the adaptive functions of Layer 2 will stimulate the interactive functions of Layer 1.

However, the reverse is also true. When a problem is encountered, Layer 1 is initially activated. If the problem cannot be solved at this layer, it is passed on to Layer 2 for solution. If the problem cannot be solved at Layer 2, it is passed on to the Layer 3 for analysis and recommended solutions. If the problem cannot be solved by any of the layers within time constraints, the host dies. Alternatively, the AIS may develop a strategy to fight an antigen to a draw. This goal creates a new equilibrium. Consequently, the AIS3 must evolve and adapt in order to solve these complex problems because the problems themselves are evolutionary and adaptive.

(31) Horizon of Simulated Projections Limited by Information from Experience of Layers 1 and 2

While Layer 3 does provide valuable analyses to Layers 1 and 2 in order to assist them in solving problems, the information provided to Layer 3 by Layers 1 and 2 is important as well. The raw data that are provided to Layer 3 are critical in establishing accurate assessments and solutions in the form of simulated projections. The information from the actual experiences of Layers 1 and 2 is the source of the analyses at Layer 3. The model simulations are limited by the quality of the data. In particular, the horizon of simulated projections is limited by these data. The parameters of the simulations are restricted by the actual data provided by prior experience.

Though Layers 1 and 2 provide information to Layer 3, Layer 3 goes beyond this in constructing novel simulation scenarios of potential antigens. This is important because the traditional AIS is particularly susceptible to aggressive new antigens which it has not previously encountered. Nevertheless, information about antigens supplied from Layers 1 and 2 are still a starting point in the modeling analyses.

(32) Access Library (Memory) from any of Three Layers

Information from actual encounters with familiar or new antigens at Layers 1 and 2 is input into a central memory. This data are accessed and used by all of the layers in order to identify prior experiences of problem solving from previous encounters with antigens.

In a distributed system, one way to perform this memory function is to provide multiple sweeps through the system, each of which yields new information to record and access. For instance, the detection of a particular type of antibody, which was generated in the Layer 1 cascade process, implies that the cascade process is in motion at a particular time. In this approach, memory is provided in a local search environment, much like a commuter in a car that can only see those cars around it as they are stuck in traffic, in the present system.

The availability of global memory in a local search, on the other hand, requires architecture of central memory that is accessible in a distributed environment. This is provided in the current system by duplicating and accumulating the new memories at specific junctions as the antibodies reach specific points in the system while passing through it multiple times. In effect, whole databases are copied and updated with most recent information and then passed on to the antibodies as they repeatedly pass through the system. This model allows global memory in a local search process and increases the amount of information that each layer of the system possesses in real time. In a further embodiment, by limiting the data sets to immediately useful information, the amount of data is minimized and the antibodies can travel with lighter data storage loads.

(33) Parallel Operations of Layers 1 and 2 and Layers 2 and 3

Layers 1 and 2 emulate aspects of the biological HIS. The humoral immune system and the adaptive immune system solve problems with past and novel antigens respectively. These two layers work in tandem and execute problem-solving functions by interacting with the environment to defeat evolving problems.

In the AIS3, Layers 2 and 3 also work in tandem. In these layers, novel evolutionary problems are solved initially at Layer 2. However, Layer 3 generates multiple simulation scenarios regarding potential antigen development that aid in the solution-testing process at Layer 2.

The operations of all three layers function simultaneously. The information from all three layers is passed between the layers in order to optimize their tasks. To facilitate these simultaneous operations, the layers are sequenced with multi-layer queuing that allows the information from one layer to be synchronized with the actions at another layer.

This parallel and simultaneous functionality between the layers is particularly important in order to solve multiple problems presented by multiple antigens.

(34) Multi-Plasticity Dynamics

In the traditional AIS there are double plasticity aspects that activate a restructuration of the system once a threshold of behavior is satisfied. These plasticity aspects affect the architectural and the parametric adaptation components. For example, once a familiar antigen is identified by the host, the humoral immune system will restructure its configuration by launching a cascade effect. Once the threat has passed, the system will restructure its configuration by returning to a steady state of equilibrium that limits the number and types of antibodies patrolling the system.

In the AIS3 multiple plasticity dynamics affect the structure and operations of the system. The third layer provides additional plasticity dynamics because of the temporal aspects of solving eMOOPs within time constraints. Layer 3 stimulates an alteration of the whole architecture in order to accommodate an additional layer of adaptability to complex evolving problems. Layer 3 enhances the ability of antibodies to be created on-demand to modify the configuration of the overall system and thereby solve specific problems.

If the initial position is one of parametric plasticity (defined as an adjustable process that affects the overall system to change its parameters while simultaneously performing an operation in order to advance its effectiveness), then the addition of the modeling layer adds the potential to modify the structure and function of the overall system through analytical recommendations. In effect, the system learns through the execution of its various active, interactive and analytical elements, and then transforms its structure to optimize its primary problem-solving functions.

In a further embodiment of the system, the analytical features of the modeling layer provide simulations about not only the AIS3 but also the environment and the antigens themselves, which simultaneously evolve, restructure and co-adapt to the AIS3. The exogenous ecosystem transforms its structure as it adapts. The co-evolutionary aspects of the constant restructuring of the AIS3 and the environment containing the antigens produce a new type of complex plasticity. It is critical to understand the environmental plasticity conditions or the AIS3 will not be able to reshape itself in order to solve the most complex eMOOPs. The AIS3 must match and surpass its rivals.

(35) Hybrid Genetic Algorithms Applied to Train AIS Layers and to Guide Virus Mutation Pathway Vector Simulations Virus mutation pathway vectors are simulated at Layer 3. Hybrid genetic algorithms are used to calculate the probable future scenarios of mutation vectors. These algorithms assess the most efficient pathway for mutation development. By employing these computational techniques, the system produces rapid solutions to complex problems. These evolutionary computation techniques apply to analysis of all antigens.

Once the antigens are analyzed, scenarios of possible pathway trajectories are produced, and solutions are generated, the analytic information is provided to Layers 1 and 2 for use in actual experiments with antigen interaction.

Layer 3 models the antibody collective responses by using hybrid genetic algorithms to design (a) customized mutation pathway vectors and (b) specific geometric combinations that will be successful in defeating the antigens. These evolutionary computation-informed analyses are critical for successfully solving the eMOOPs in real time. The hybrid genetic algorithms are used to train the AIS3 for application primarily at Layers 1 and 2.

(36) Conservation of Resources: Computational Economics in the AIS3

Computational economics seeks to develop the conservation of computational resources. The most efficient use of computational resources provide the most competitive solution.

The present system faces a temporal constraint. If the AIS3 cannot solve a problem within time constraints, the antigen(s) will overwhelm the system. At the same time, the system needs to escalate its problem-solving functions in order to preserve scarce resources. This efficiency is integrated into the biological HIS since the first level of defense is organized to resolve most problems by drawing on immunity memory; more complex problems are resolved in the more sophisticated adaptive immune system, which is rarely activated after its initial training.

A key goal of the present system is to obtain satisfactory solutions to present problems within the computational constraints. To do so, Layer 1 is activated when a familiar antigen is encountered. Multiple attempts to solve the problem are then resolved by activating the other layers over time.

Despite the need to preserve efficiency of resources, in another embodiment of the present system, it is necessary to build some redundancy into the system. Without some redundancy, a particular malicious antigen may overwhelm the system. However, with the ability to provide sufficient resources for a multi-antigen attack, the system increases the chances of survival appreciably.

Artificial Neural Networks

A-NN is a class of artificial intelligence that emulates the operation of biological neural networks. In biological systems, clusters of neurons are trained to perform a function and evolve a solution to new sets of problems based on this training. In the course of solving new problems, the neurons reorganize, thereby creating an adaptive process. The AIS3 metaheuristic is applicable to several aspects of A-NNs. It will assist in the calculating and training of connection weights in an A-NN. It is also useful in the A-NN applications of pattern recognition, anomaly detection, data mining and search and digital image classification and alignment.

(i) Calculating Connection Weights

One of the main methods of solving problems with A-NNs is to engage in a process of learning which involves the restructuring of connection weights between neurons. The effect of the change of neuron connection weights is adaptation to a changing environment and facilitation of a learning process.

One way to calculate connection weights is to use the AIS3 model. The AIS3 assesses the parameters of the environmental problem and adjusts the connection weights accordingly by producing an initial solution at Layer 2 and modeling the problem at Layer 3. Tentative solutions are tested at Layer 1 and then improved with feedback from Layers 2 and 3. The AIS3 is involved with modeling the connection weights between neurons.

(ii) Training Connection Weights

A-NN training of neuron connection weights is performed by the AIS3. The learning process used in the AIS3 provides global information in a local search space thereby enabling the optimization of the training of connection weights. Memory is continually updated and shared by the layers of the AIS3 which is useful to the learning process in the A-NN. In particular, the present system is useful for A-NNs that engage in solving problems in an evolving environment.

(iii) Pattern Recognition

Pattern recognition is a major A-NN application category. The AIS3 is useful in optimizing the A-NN for pattern recognition as it addresses an evolving set of criteria by employing a modeling capability.

(iv) Anomaly Detection

While A-NN is applied to anomaly detection, the AIS3 optimizes the application by solving eMOOPs in real time. Anomalies are recognized more rapidly, and are even anticipated, by the AIS3-enhanced A-NN.

(v) Data Mining and Search

The AIS3 metaheuristic is applied to the A-NN application of data mining and data search. Data sets are analyzed by the enhanced A-NN since patterns are more rapidly recognized using AIS3 modeling processes.

(vi) Digital Image Classification and Alignment

A-NNs are applied to digital imaging for image classification and alignment. In image classification, A-NNs restructure to optimize the organization, and reorganization, of image data sets. In image alignment, digital sensors are optimized by A-NNs. In both cases, the A-NNs are improved by application of the AIS3 metaheuristic. Particularly in evolutionary environments with rapid change of multiple constraints, the AIS3 is designed to enhance the A-NN performance of image classification and alignment challenges.

Protein Network Modeling

The present system is applied to protein network modeling. The main categories of protein structure prediction, protein regulatory network modeling, functional protein modeling and artificial synthetic biology are all simulated using the AIS3 metaheuristic.

(i) Protein Structure Prediction

In order to assess protein behavior, protein structures must be predicted within specific conditions. This complex combinatorial optimization problem is a major challenge to computational modeling. The AIS3 metaheuristic is a useful tool in solving protein structure prediction problems. The AIS3 solves these eMOOPs by using both Layers 2 and 3 to model and test the protein structure problems and to offer optimization solutions within constraints.

(iii) Protein Regulatory Network Modeling Protein regulatory networks are complex systems through which proteins perform useful biological functions. Identifying these networking operations is a major challenge of biological sciences. The AIS3 is useful in testing the protein regulatory network pathways. After first using the experimentation procedures of the AIS3 at Layers 1 and 2, the protein regulatory networks are modeled at Layer 3. The model is continually improved upon as more information is obtained and tested.

(iv) Artificial Synthetic Biology

Synthetic biology is an outgrowth of recombinant DNA procedures in which genes are added or removed to achieve a desired man-made effect. Artificial synthetic biology uses man-made proteins to substitute for organic DNA and proteins in the construction of novel life forms. The design, testing and evolution of these artificial synthetic life forms are guided by metaheuristics. The AIS3 is a useful application to artificial synthetic biology because it organizes, reorganizes and optimizes the artificial protein combinations to achieve a particular outcome. By constantly testing the artificial organism with Layers 1 and 2 of the AIS3, the system optimizes interactions with an evolving environment. The artificial synthetic organism is modeled at Layer 3 and is able to learn by applying elements of the AIS3 multilayer interactions.

Network Computing Applications

The AIS3 metaheuristic is applied to network computing applications. These applications include transformative databases, spatio-temporal object relational distributed databases, enterprise systems, autonomic computing, network security, collective behavior of software agents, communication system optimization and distributed network scheduling and routing optimization.

(i) Transformative Databases

Transformative databases are active data storage structures that periodically reorganize their contents in order to optimize efficiency. Transformative databases are useful in network environments in which there are massive data sets and high performance requirements. The databases actively analyze their data sets, categorize and re-categorize the data and restructure the database periodically as a housekeeping function to maximize efficient throughput.

The AIS3 is useful in application to the transformative database in order to actively anticipate data components in restructuration processes. Data sets from the database are analyzed by the AIS3 and specific categories of data objects are reorganized. The process is carried out by software agents that act autonomously in collectives.

(ii) Spatio-Temporal Object Relational (STOR) Distributed Databases

STOR databases are organized in a distributed network to coordinate functions in data collection and search. The AIS3 activates the reorganization process of the data sets in the distributed databases by solving eMOOPs in real time. Before they store spatio-temporal data sets, the STOR databases are dynamic. The reorganization of data sets in these dynamic databases produces a plasticity effect in the distributed network structure that is activated by the AIS3 as it solves evolutionary combinatorial optimization problems.

(iii) Enterprise Systems

Enterprise systems are complex hardware and software configurations that support the functions of businesses. Typically divided into functional subparts of human resources, accountings, manufacturing and so on, enterprise systems use databases to organize and connect data from various business units. The AIS3 metaheuristic allows the software to automate functions more readily. In fact, in some ways, enterprises are analogous to organisms in an ecosystem (supply chain) in that they can be viewed as a host where the AIS3 resides and in which it protects. The AIS3 identifies and solves eMOOPs in enterprise systems by using collectives of software agents that self-organize.

(iv) Autonomic Computing

Designed to automate computer networks by emulating the autonomic functions of the human nervous system, autonomic computing is enhanced by the application of the AIS3. The self-regulating components of the autonomic computing system are optimized by the generation of solutions to eMOOPs using the AIS3. When complex problems arise, the AIS3 modeling layer simulates the problem and generates various solution options that are applied in Layers 1 and 2. Once feedback is obtained on the initial results of the solutions, the modeling layer further provides solution options for implementation. Particularly because the autonomic computing environment is dynamic, it is well suited for the AIS3.

(v) Network Security

The classical application of the traditional AIS is to network security. The idea of emulating the HIS to defend against computer viruses is a compelling application of AISs. In particular, the network environment for the defense against computer viruses (malicious program code) is an appropriate application for the AIS3 as well. The present system goes far beyond traditional AISs by providing sophisticated mechanisms for the anticipation, acceleration and achievement of computer network security goals within resource constraints.

(vi) Software Agent Collective Behavior

Self-organized software agent collectives present a type of computational behavior to which the AIS3 is applicable. Software agents cooperate, collaborate and compete in order to perform specific functions automatically. The AIS3 is useful in facilitating the social learning mechanisms that are needed to carry out these processes.

Software agent collectives are applicable to transformative databases, autonomic computing and enterprise systems.

(vii) Communication System Optimization

Communication systems are improved by the use of the AIS3. Communication systems are optimized by the efficient use of network resources. At peak times in particular, the system requires continuous reorganization to efficiently maximize its resources. The AIS3 usefully optimizes the redistribution of resources in this communication system. As the load is rebalanced in communication networks, the system restructures using plasticity effects. Specific nodes may be added or removed at different times in order to minimize system burdens. The AIS3 metaheuristic continually optimizes this process.

(viii) Distributed Network Scheduling and Routing Optimization

The present system is useful in solving scheduling and routing optimization problems in a distributed network. The AIS3 uses its multilayer modeling mechanism to actively solve eMOOPs involving scheduling and routing. It continuously analyzes and solves multiple problems simultaneously, with constantly updated solutions using the latest information, yet within resource constraints. Application of the AIS3 to scheduling and routing optimization problems is a major advance to the state of the art.

Evolutionary Systems

Evolutionary systems are classified into the categories of robotics, nanotechnology and programmable logic devices. Each of these represents a form of evolutionary hardware that may change its structure to perform a function. The three main classes of evolvable hardware are the field programmable gate array (FPGA), the nanorobotics collective and collective robotics.

(i) FPGAs

The FPGA is an integrated circuit with logic gates that reorganize its structure from one application specific integrated circuit (ASIC) position to another ASIC position. Since ASICs generally solve problems faster than microprocessors, FPGAs share benefits of ASICs (speed) and microprocessors (flexibility). FPGAs can be deterministic (preprogrammed functions) or indeterministic (continuously reprogrammable) or can possess limited evolutionary capability. FPGAs can be programmed to rapidly solve complex problems. They are useful in time-sensitive applications such as digital signal processing or embedded controllers.

The AIS3 is useful in assisting the FPGA in its programmable function because the FPGA is interacting with an uncertain environment. As problems with the environment are encountered, the AIS3 Layers 1 and 2 generate and test solutions. At Layer 3, new solutions to complex optimization problems are analyzed and modeled and then tested at Layers 1 and 2. The FPGA represents an ideal application of the AIS3 because it interacts with its environment, receives feedback from the environment, restructures its configuration and continues in this feedback loop until it performs its function.

In another embodiment, the system is also applied to networks of asynchronous FPGAs. Much as it applies to network computing and to A-NNs, the AIS3 provides a mechanism to learn in an adaptive reconfigurable network environment which provides feedback. The AIS3 uses its unique memory configuration in which it accesses global information with local search processes to update its learning functions so as to adapt to the environment. The FPGA network continuously restructures until it satisfies its goals. In the context of a communications network, this FPGA evolvable hardware network manifests complex plasticity effects and benefits.

(ii) Robotics

Hybrid robotic systems comprised of central and behavior-based control systems use the AIS3 model. These complex systems optimize the feedback mechanisms from environmental inputs and the central control features of robotic manipulation. The AIS3 metaheuristic is useful in order for the robotic control systems to learn because optimization problems are constantly evolving in the robotic environment as the robot navigates its spatial domain to achieve its goals within resource constraints.

Robots are evolvable in some applications. For example, in the context of manufacturing, robots will design and produce a unique part in real time by employing fused deposition technology. The present system is useful in order to help solve problems that facilitate this complex goal.

(iii) Collective Robotics

CR also uses hybrid control systems for optimal functionality. As the various robotic units interact with their environment, they receive feedback from their uncertain spatial domain. The distributed robotic network coordinates actions between the units in the system much as antibodies coordinate behavior within their own collective. This collective behavior is well organized by using the AIS3. Since the AIS3 emulates the organization of antibody networks to solve complex eMOOPs, CR networks are an ideal application of this novel metaheuristic. Problems are solved within the first two layers in the ordinary course of environmental interaction. However, the modeling layer is particularly useful in order to accelerate the processes of the first two layers. In addition, since CR systems are time sensitive because they interact with the environment in real time, the AIS3 is well suited to solve CR eMOOPs in real time.

(iv) Collective Nanorobotics

The ability to produce electronics at increasingly smaller scales makes possible the development of nano- and microrobotics. Nanorobots are really only useful, however, if they are aggregated into collectives for specific functionality. These nanorobotic collective applications include electronics functions and biological functions. In either case, the AIS3 is a useful metaheuristic to assist the nanorobotic collectives in completing their goals in complex environments.

In the case of electronics, microrobotic collectives operate within computer devices to complete a specific function. Similarly, nano-scale robotic collectives operate in electronics devices so as to optimize their mechatronic operations. In general, these are deterministic systems.

Nanorobots are also applied to biological applications. In this indeterministic application category, the nanorobotic collectives are used to emulate proteins in order to perform operations of dysfunctional organic proteins. The present system is useful in organizing these bio-focused nanorobotic collectives. Because they are organized in a distributed network, the nanorobots use the mechanism of the AIS3 to learn, adapt and reconfigure their collective behavior. In one embodiment, the nanorobotic collectives use the AIS3 to fortify and optimize the HIS so as to prevent disease. In order to perform these functions, the nanorobotic collectives use collective behavior of software agents that also employ the AIS3.

Nanorobotic collectives, whether in electronic or biological systems, also engage in reorganization processes by using the AIS3. These reaggregation processes allow the nanorobots to create evolvable hardware configurations. The AIS3 metaheuristic facilitates the learning mechanisms that render the nanorobotic collective evolvable hardware reaggregation processes useful, because it provides a way for the system to reorganize in the context of environmental change.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.) the terms (including a reference to a "means") used to describe such elements are intended to correspond, unless otherwise indicated, to any element that performs the specified function of the described element (i.e., that is functionally equivalent), even though not structurally equivalent to the disclosed structure that performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

DESCRIPTION OF THE DRAWINGS

FIG. 7 is a schematic diagram showing the interaction of the AIS3 with antigens in an environment.

FIG. 8 is a set of three charts illustrating evolving multi-objective optimization problems in the context of specifying a set of changing constraints over three phases.

FIG. 38 is a schematic diagram showing the three phases of fitting antibodies to a complementary mold of an evolving antigen.

FIG. 47 is a flow chart showing the process of solving an antigen problem by using the problem solving capabilities of layers 2 and 3.

FIG. 48 is a flow chart showing the process of using layer 3 to solve an optimization problem.

FIG. 51 is a schematic drawing showing several virus mutation vector scenarios.

FIG. 52 is flow chart showing artificial virus hypermutation vector modeling scenarios.

Figure 1:
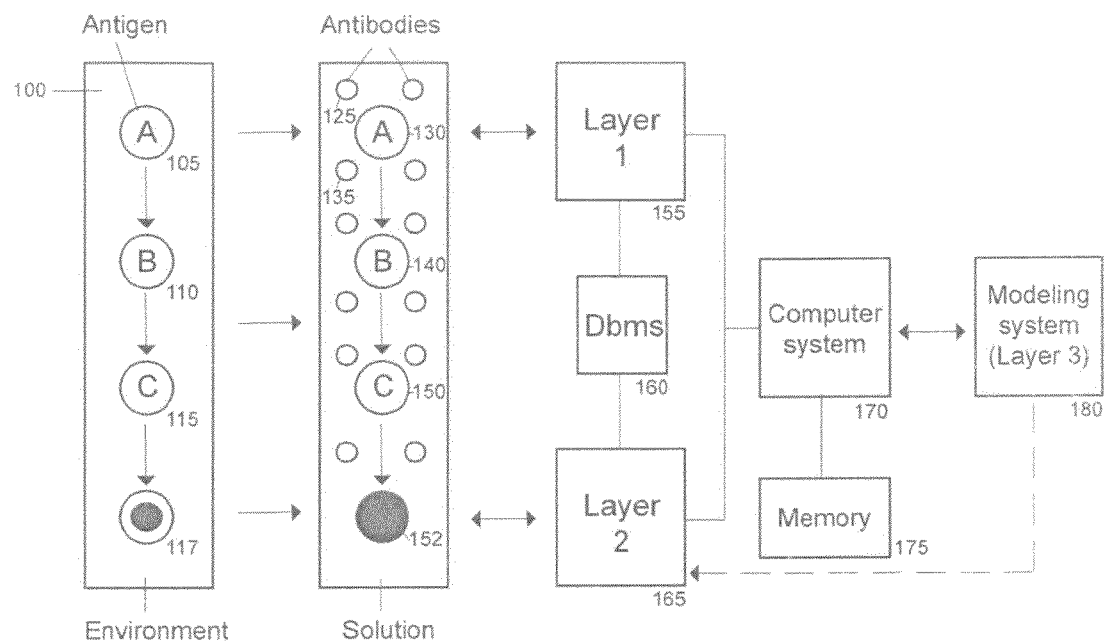
FIG. 1 is a schematic drawing showing the hybrid multi-layer artificial immune system (AIS3) structure.
Figure 2:
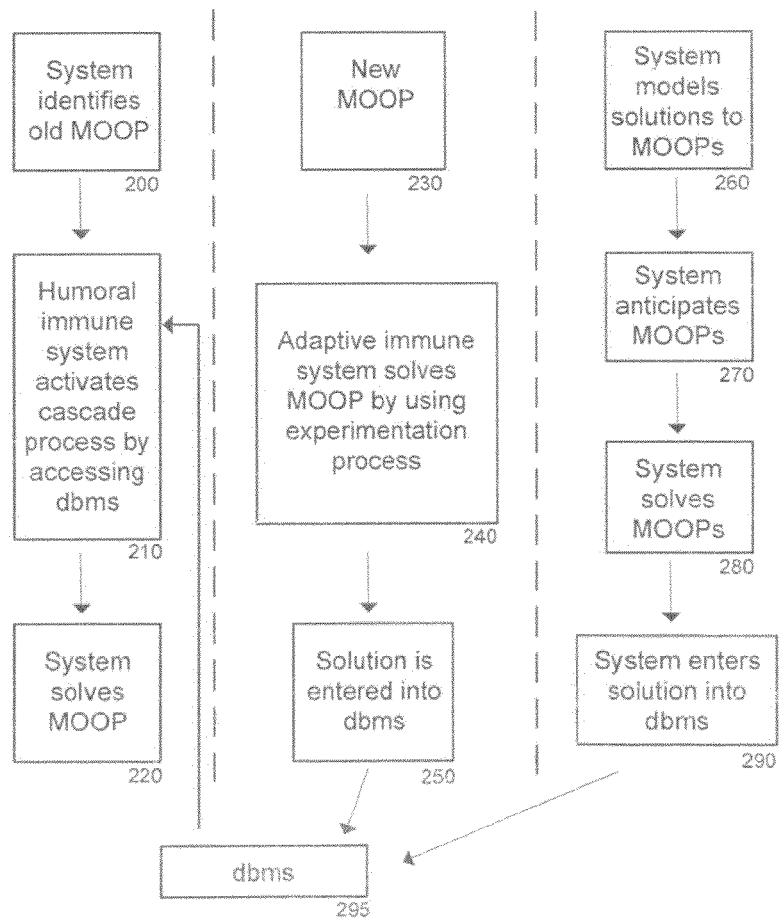
FIG. 2 is a flow chart describing the functional dynamics of the AIS3.

The three layer functionality of the AIS3 is described in FIG. 2. In the humoral immune subsystem of layer 1, the system identifies a previously encountered antigen (200) and activates the cascade process to produce antibodies to defeat the antigen (i.e., solve the optimization problem) by accessing the dbms (210 and 295) and ultimately solves the problem (220). In the adaptive immune subsystem of layer 2, the system identifies a new antigen (230) and solves the MOOP by using an experimental process (240). The solution is then stored in the dbms (250) for later access by layer 1. At layer 3, the system models solutions to MOOPs (260), anticipates MOOPs (270) and solves MOOPs (280), which solutions are then stored in the dbms (290) for later access by layer 1.

Figure 3:
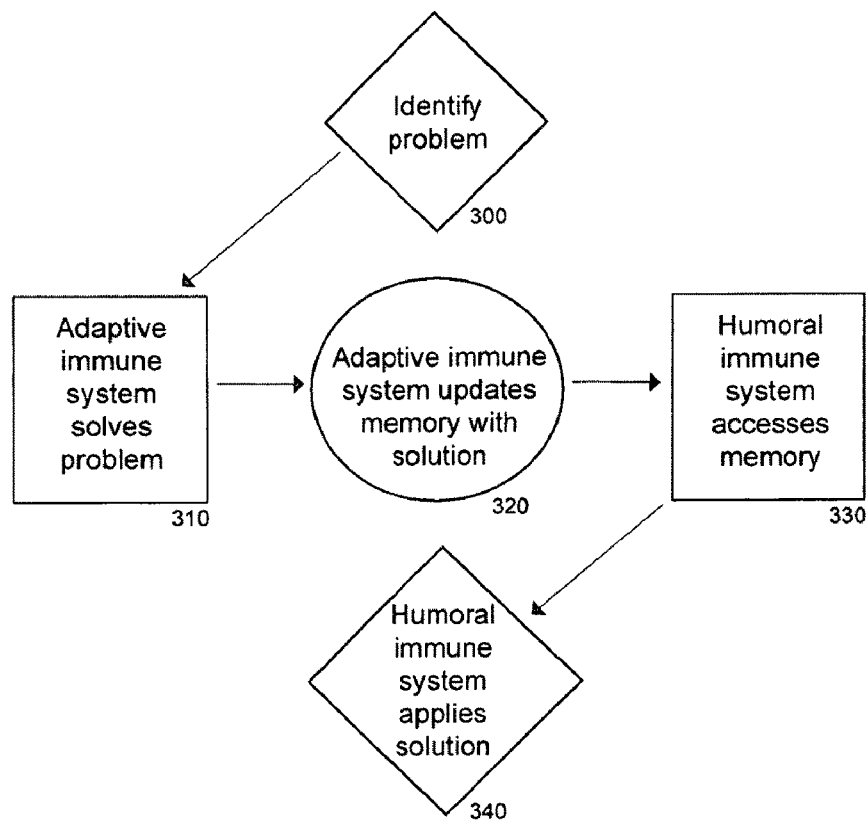
FIG. 3 is a flow chart showing how the adaptive immune system solves a problem that is applied by the humoral immune system.

FIG. 3 shows the process of solving a problem at layer 2 and applying the solution at layer 1. Once a problem is identified (300), the adaptive immune system solves the problem (310) and updates memory with the solution (320). The humoral immune system accesses the memory (330) and applies the solution (340).

Figure 4:
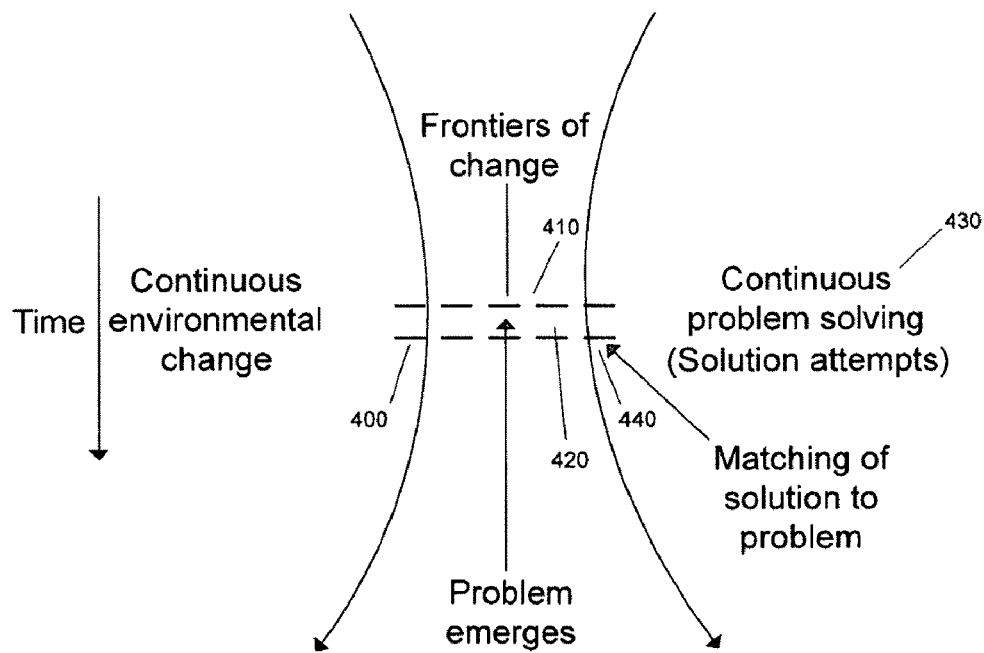
FIG. 4 is a schematic diagram illustrating the problem solving of a dynamic problem by a metaheuristic over time.

The AIS3 metaheuristic is particularly well suited to solving evolutionary optimization problems because it is adaptive. FIG. 4 shows the problem solving process of a dynamic problem over time. While the problem emerges (420), the frontiers of change (410) evolve as the environment changes (400). The system continually seeks to solve evolutionary problems (430), makes multiple solution attempts and matches the solution to the problem (440).

Figure 5:
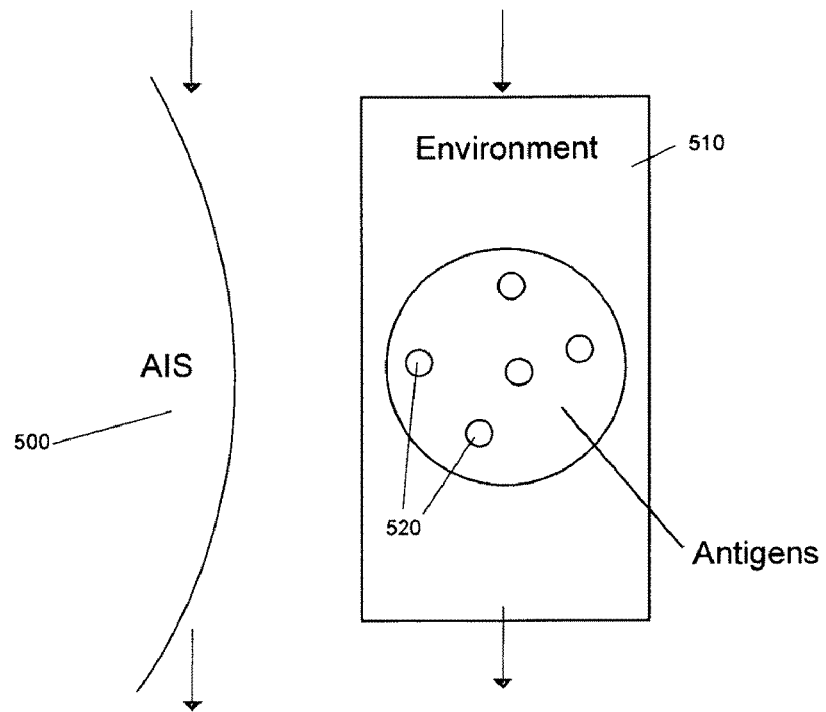
FIG. 5 is a schematic diagram showing the AIS interacting with an environment which contains evolving antigens.

The AIS3 solves problems of antigens in an environmental context. FIG. 5 shows the environment (510) in which the antigens (520) interoperate. Both the environment and the interacting AIS3 (500) evolve in time.

Figure 6:
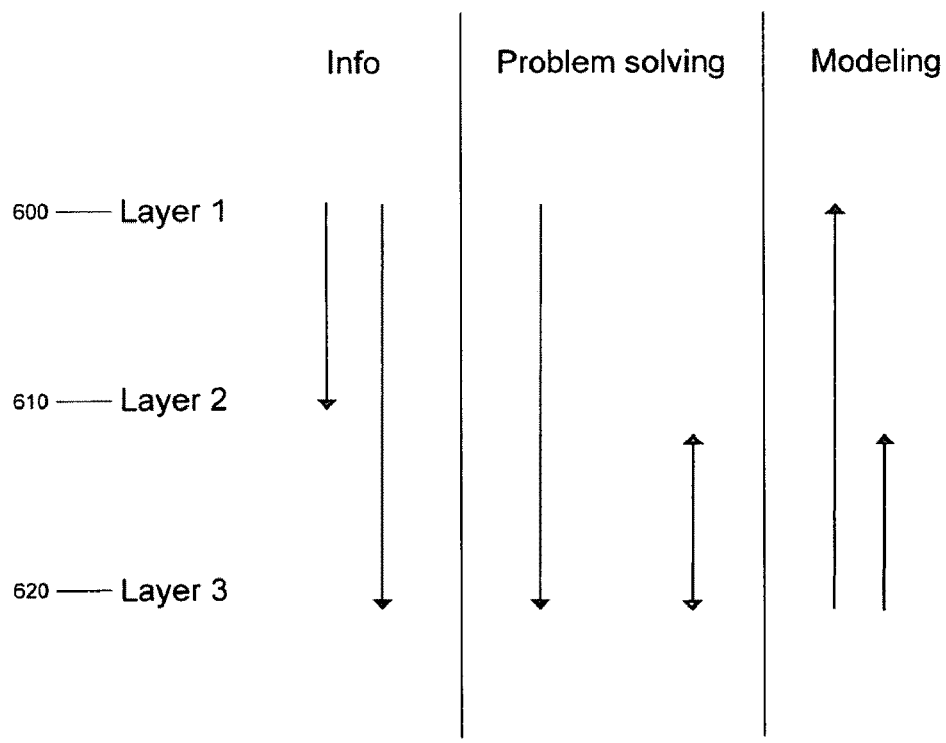
FIG. 6 is a chart showing the interaction of the three layers of the AIS3 to solve and model problems.

The chart in FIG. 6 shows the interaction of the three layers with information, problem solving and modeling aspects. Layer 1 provides information to both layers 2 and 3. Layer 1 also provides information to layer 3 for problem solving, while layers 2 and 3 provide problem solving analyses to each other. Layer 3 provides modeling analyses to both layers 2 and 3 for application to solve a MOOP.

FIG. 7 shows the interaction of antigens with the AIS3. The antigens (720) are in an environment (710) and interact with the AIS3 (705) in a host (700) computer system.

FIG. 8 shows three phases of an eMOOP with changing constraints over time. The three parallel lines in phases A, B and C (802, 804 and 806, 820, 822 and 824, and 840, 842 and 844) and the intersecting line (810, 830 and 848) remain constant while the intersecting lines (816, 836 and 854 and 812, 832 and 850) and the parabolic curves (808, 826 and 846 and 814, 834 and 852) change positions in different phases of the process. These lines and curves indicate constraint categories with frontiers of change, illustrating evolutionary dynamics of multi-attribute optimization problems over time. Each antigen evolves over time and exhibits multiple attributes that are described by eMOOPs and solved by the AIS3. In other embodiments, the constraint categories are modeled in 3D and 4D dynamics. Priorities between constraints are constantly adjusted over time.

Figure 9:
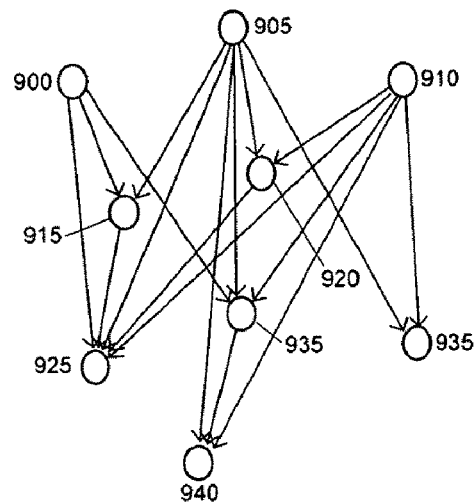
FIG. 9 is a schematic diagram showing a forward cascade process with artificial antibodies.
Figure 10:
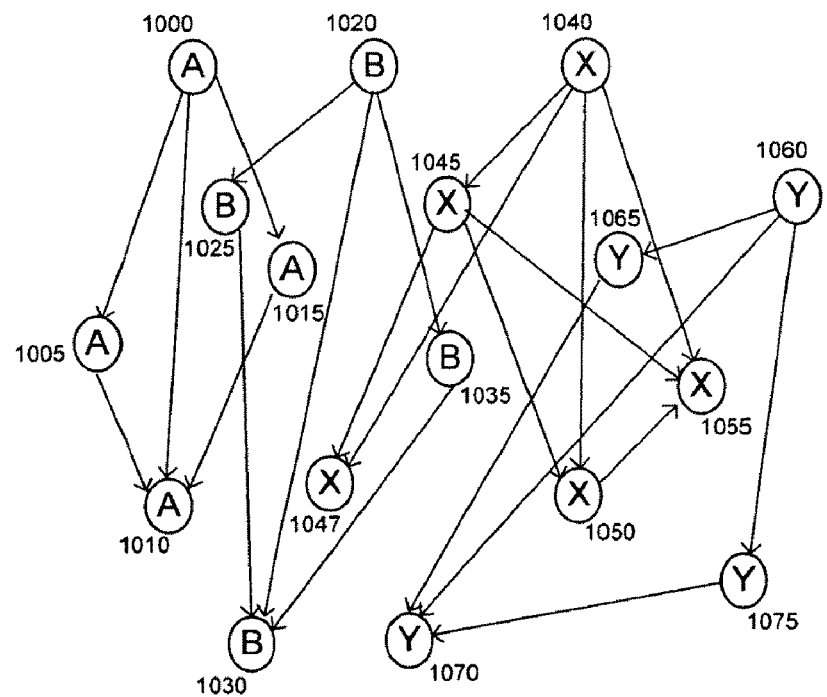
FIG. 10 is a schematic diagram showing a specialized stochastic diffusion search (SDS) process for a forward cascade involving artificial antibodies.

FIGS. 9 and 10 show the forward cascade process with artificial antibodies. In FIG. 9, the antibodies (900, 905 and 910) at the leading edge of the group transmit information forward in their local area. 900 transmits information to 915, 925 and 930. 905 transmits information to 915, 920, 930 and 940. 910 transmits information to 920, 925, 930, 935 and 940. FIG. 10 shows the use of the stochastic diffusion search (SDS) metaheuristic for a forward cascade involving artificial antibodies. The antibody types (A, B, X and Y) at the leading edge (1000, 1020, 1040 and 1060) transmit information forward to antibodies of the same type (A to A, B to B, etc.). The ability for antibody types to transmit information to specialized antibodies allows for the systematic performance of the division of labor for maximum efficiency.

Figure 11:
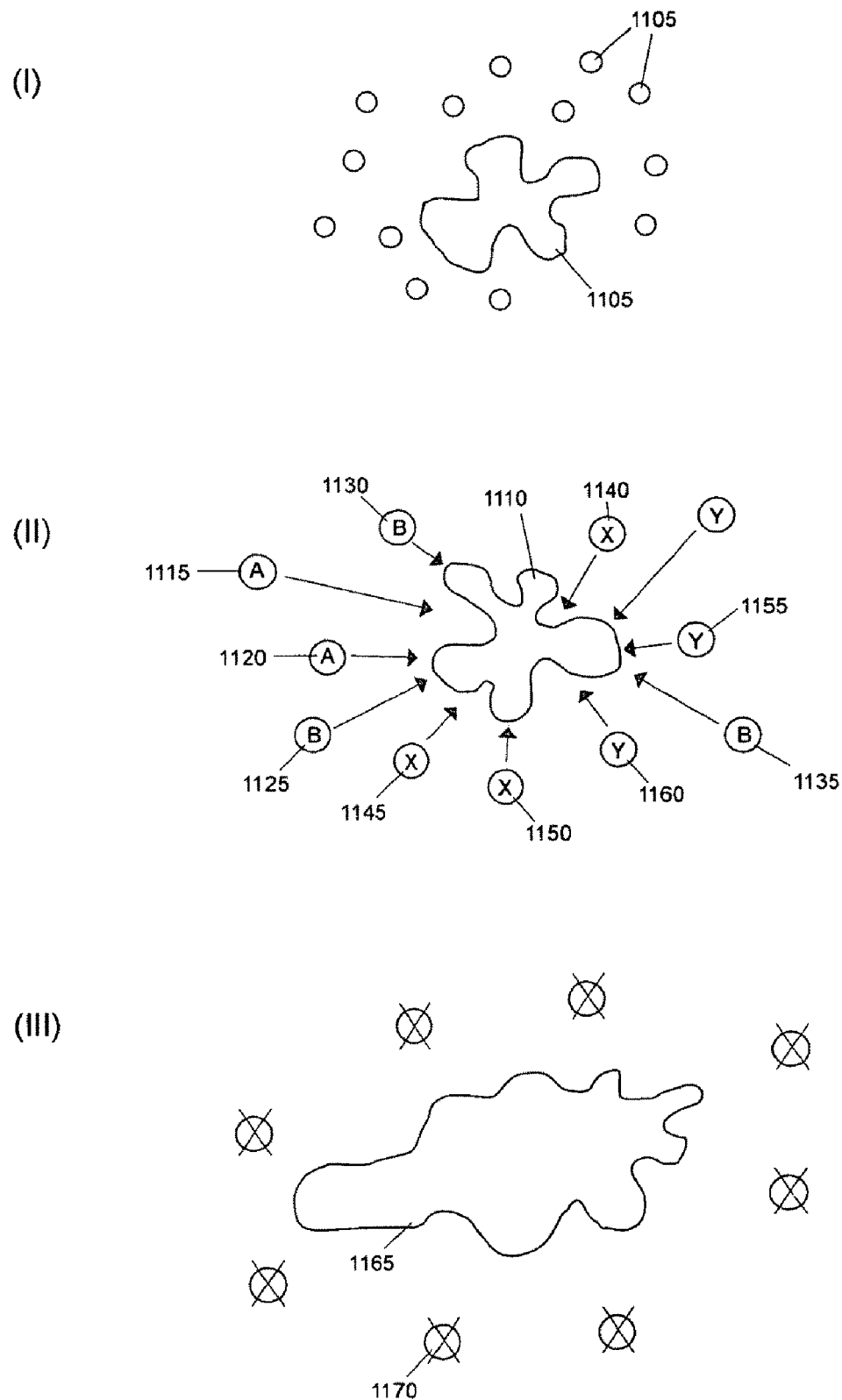
FIG. 11 is a set of three schematic diagrams showing the three phases of a collection of antibodies interacting with an antigen in which the initial solutions at layer one fail and the problem is transmitted to layer two of the AIS3.

In FIG. 11, the three phases of an antibody collective are shown interacting with an antigen. At phase one, the initial solution attempt by the antibodies (1100) against the antigen (1105) fail. The system than transmits the problem to layer 2. At phase two of the figure, the antibodies (1115 to 1160) are shown to be classified into different types (A, B, X and Y) that work together to solve the problem (1110). Once the problem is solved at phase two, the antibodies (1170) are dissolved at phase three.

Figure 12:
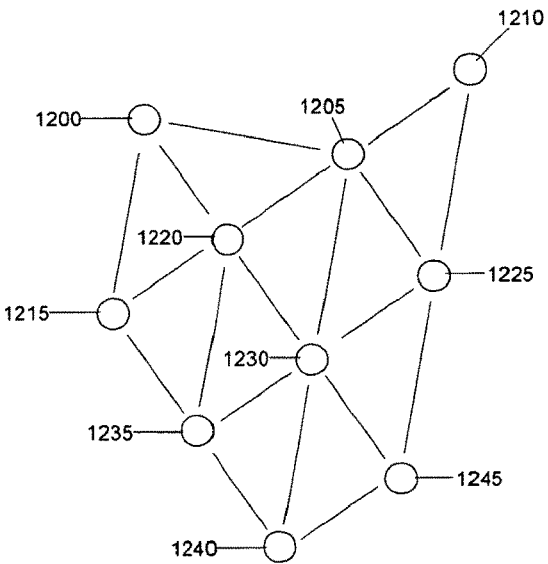
FIG. 12 is a schematic diagram showing the local connection between a collection of antibodies.

The antibodies interact with each other by local networking connections. FIG. 12 shows the local network contacts between antigens. Each antibody is connected to its nearest neighbors.

Figure 13:
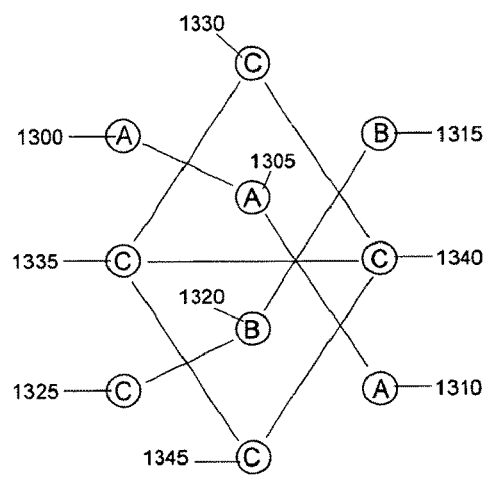
FIG. 13 is a schematic diagram showing the specialized neighborhood connection between a collection of antibodies.
Figure 14:
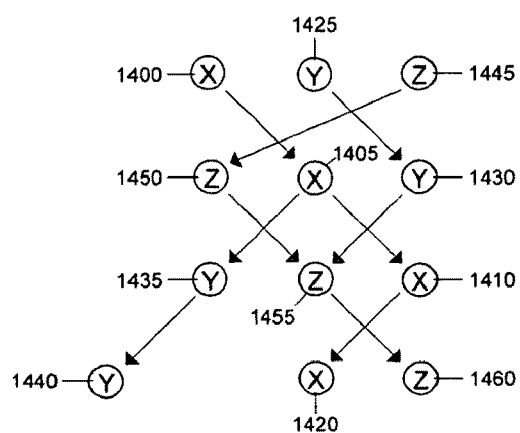
FIG. 14 is a schematic diagram showing the clonal selection within the antibody generation process of a cascade of antibodies at layer 1.

The specialized network interactions of the neighborhood connections are described in FIG. 13. The "A" antibodies are connected to each other (1300, 1305 and 1310), the "B" antibodies are connected to each other (1315, 1320 and 1325) and the "C" antibodies are connected in a diamond configuration. The local network connection, the specialized antibodies and the SDS metaheuristic are combined to produce clonal antibodies as illustrated in FIG. 14. In this model, the specialized antibodies are generated in consecutive order and communicate directly with other specialized antibodies of the same type. The X antibody (1400) produces the X antibodies in order at 1405, 1410 and 1420. The Y antibody (1425) produces the Y antibodies at 1430, 1435 and 1440. Finally, the Z antibody (1445) produces the X antibodies at 1450, 1455 and 1460.

Figure 15:
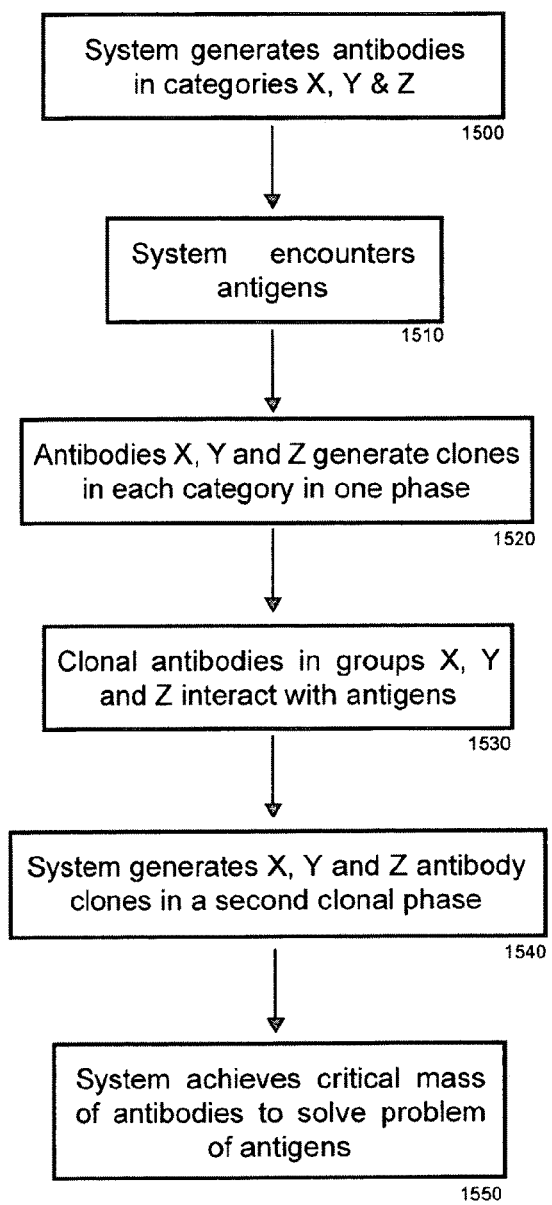
FIG. 15 is a flow chart describing the process of antibody collective cascade generation.

The antibody collective cascade generation process is described in the flow chart in FIG. 15. The system initially generates antibodies in the categories X, Y and Z (1500). The system then encounters antigens (1510) and the antibodies X, Y and Z generate clones in each category in the next phase (1520). The clonal antibodies in groups X, Y and Z interact with antigens (1530) and the system generates new X, Y and Z antibody clones in a second phase (1540). The system achieves a critical mass of antibodies to solve the problem of the antigens (1550).

Figure 16:
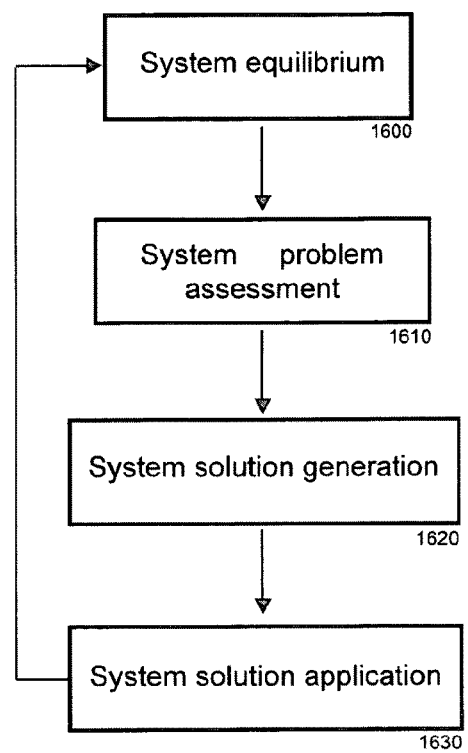
FIG. 16 is a flow chart showing the generation and application of solutions at layer 1.

FIG. 16 shows the generation and application of a solution at layer 1. After the system is in equilibrium (1600), the system assesses the problem (1610), generates a solution (1620) by accessing a database of known solutions to known problems and applies a solution (1630). The system then returns to equilibrium.

Figure 17:
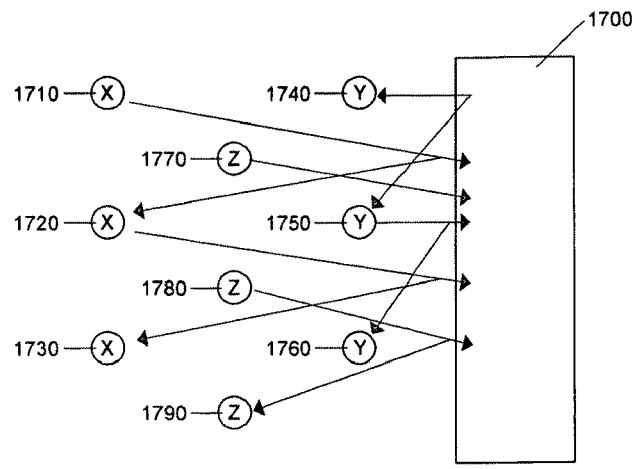
FIG. 17 is a schematic diagram showing the interaction of specialized antibodies with the environment in which the antibodies obtain feedback from, and experiment with, the environment.

FIG. 17 shows the interaction of specialized antibodies with the environment in which the antibodies obtain feedback from, and experiment with, the environment. Antibody X (1710) initially interacts with the environment (1700) and moves to position 1720. It interacts again with the environment and then moves to position 1730. Antibody Y moves from position 1740, interacts with the environment and moves to positions 1750 and 1760 in sequential order while interacting with the environment. Antibody Z experiences the same interactive sequence with the environment (1770-1790).

Figure 18:
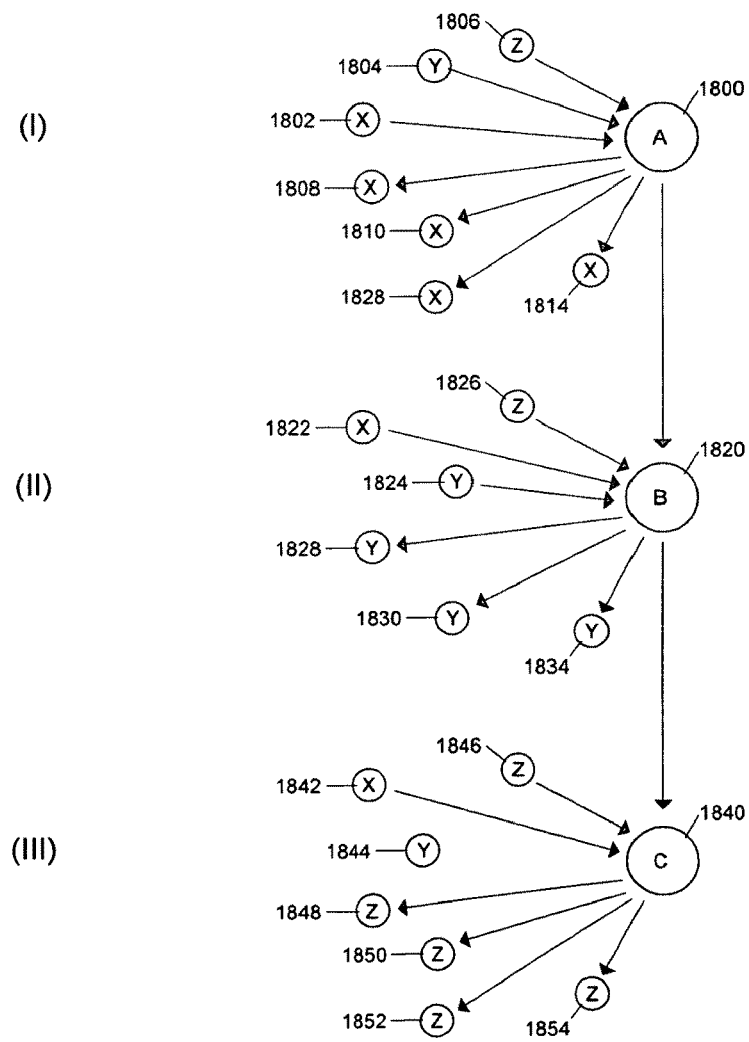
FIG. 18 is a set of three schematic diagrams showing the evolution of an antigen and the multiple phases of interacting antibodies.

FIG. 18 shows the interaction between the antibodies and the environment over three phases. In the first phase, antibodies X, Y and Z (1802, 1804 and 1806) proceed to access the environment, while the X antibodies (1808-1824) receive feedback from the antigen at phase A. At phase two, the antibodies X, Y and Z receive feedback of antibodies Y (1828-1832) to the antigen at phase B 1820). Finally, at phase three, the antibodies X, Y and Z receive feedback of antibodies Z (1848-1854) to the antigen at phase C (1840).

Figure 19:
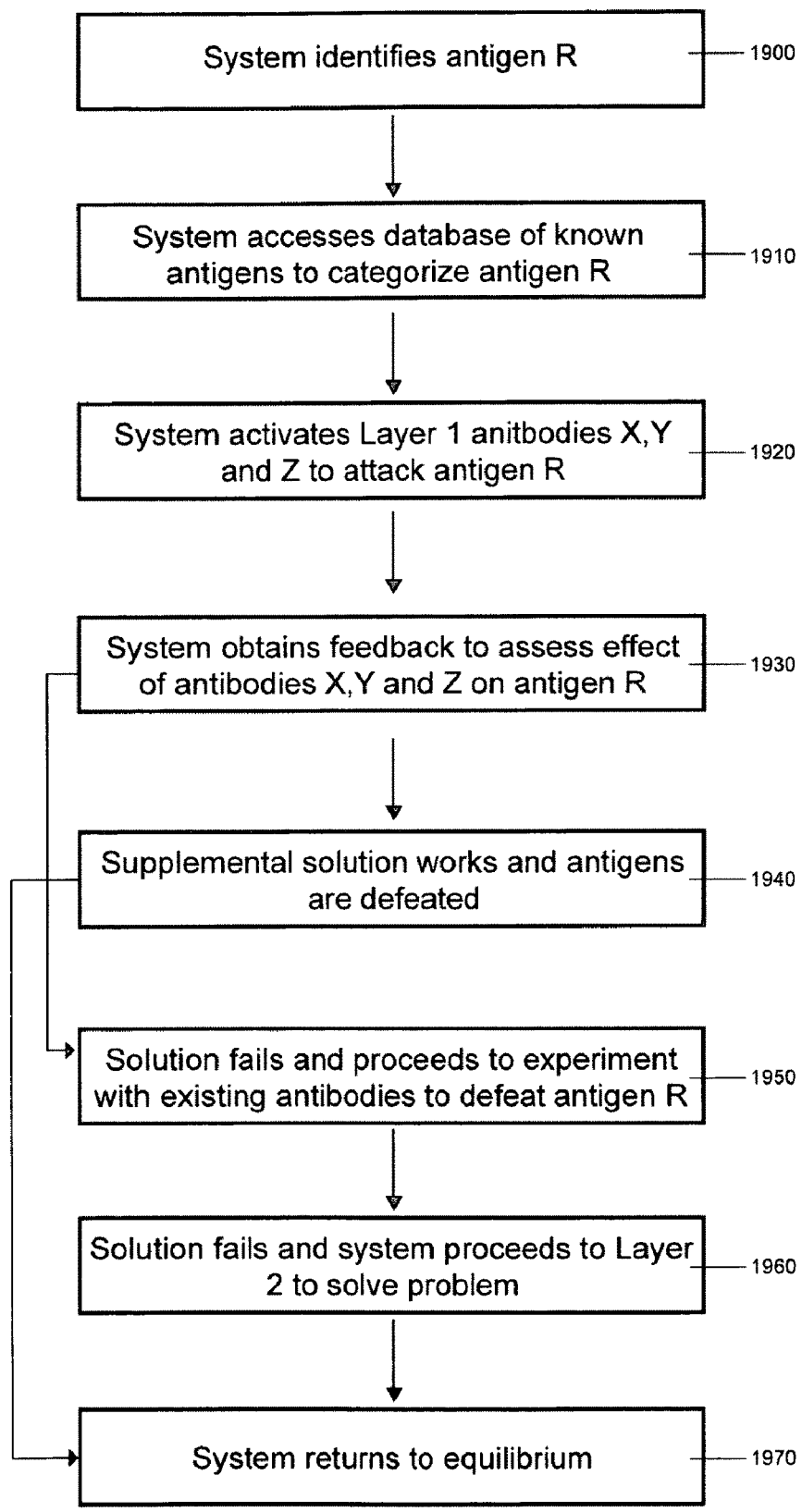
FIG. 19 is a flow chart describing the generation and experimentation of antibodies to attack an antigen.

FIG. 19 shows the process of generating and experimenting with antibodies to attack an antigen. After the system identifies antigen R (1900), the system accesses the database of known antigens to categorize antigen R (1910). The system activates layer 1 antibodies X, Y and Z to attack the antigen R (1920) and obtains feedback to assess the effect of the antibodies on antigen R (1930). Either the supplemental solution works and the antigen is defeated (1940) or the solution fails and the system proceeds to experiment with existing antibodies to defeat antigen R (1950). If the solution works, the system returns to equilibrium (1970). If the solution fails, the system proceeds to layer 2 to solve the problem (1960).

Figure 20:
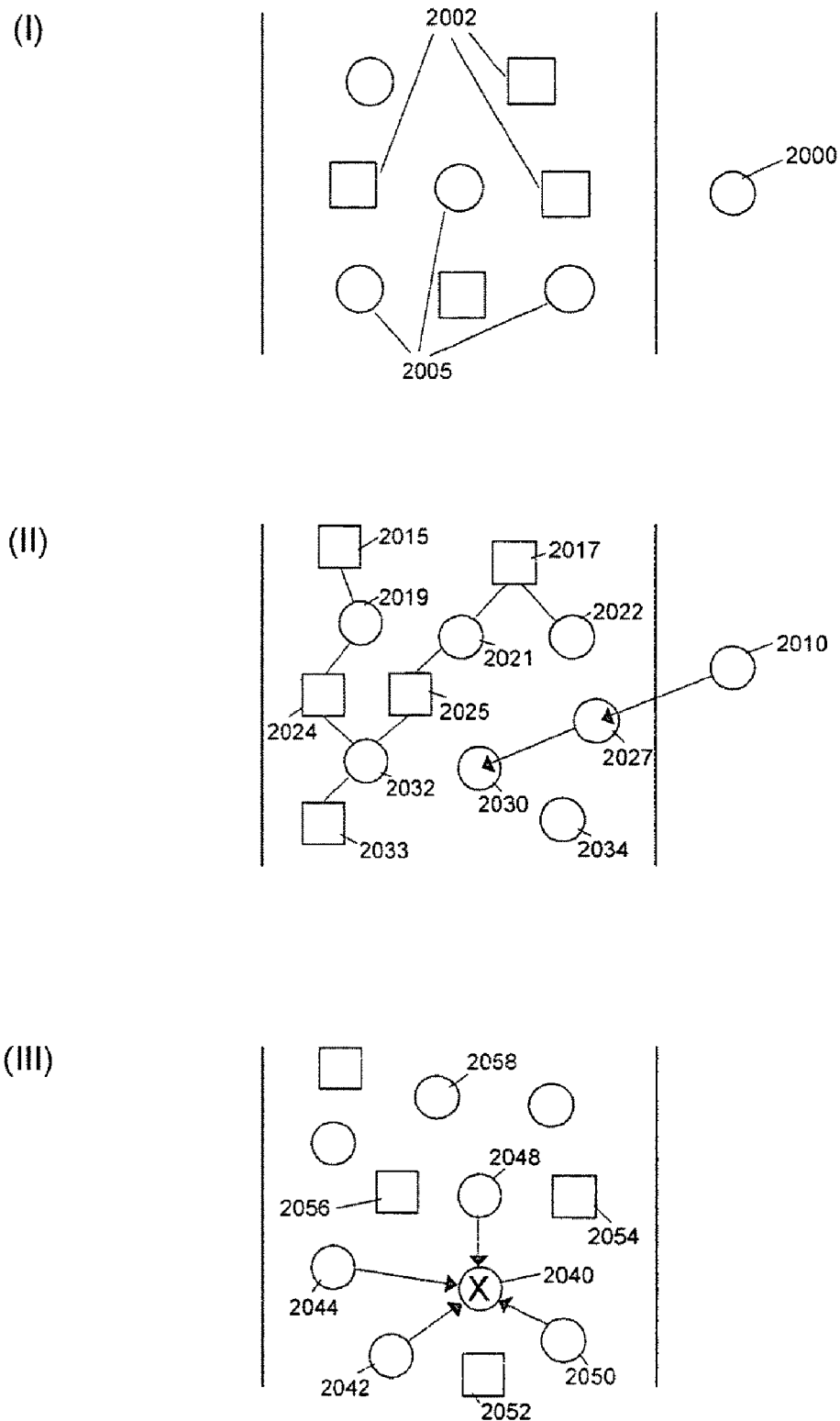
FIG. 20 is a set of three schematic diagrams showing the application of danger theory which differentiates self from dangerous objects such as antigens.

The AIS3 uses danger theory to distinguish itself from foreign objects such as antigens. FIG. 20 shows three phases in which the AIS3 uses danger theory to differentiate itself from dangerous objects. In phase I, the antibodies, shown here in two types (2002 and 2005), at layer 1 are separated in the system from the antigen (2000), which lies outside the system. However, in phase II, the antibodies encounter the antigen which moves from position 2010 to position 2027 to position 2030. The antibodies interact with each other using local search. The antibodies distinguish each main antibody type and categorize the other antibodies as antibodies. While realizing the similarities of the antibodies, the antibodies distinguish between the foreign antigen. At phase III, the antibodies clearly identify, target and attack the antigen (2040) as a hostile invader. By using the principles of identity and difference, the AIS3 clearly identifies that antigens are foreign to the system and proceeds to attack them.

In another embodiment of the system, the antigen identification process is accelerated by implementing the anticipation mechanisms of layer 3. The identification of antigens then occurs as the system anticipates specific antigen types entering the system in particular patterns for increasingly rapid identification threshold activation. Preliminary conditions for antigen generation modeled at layer 3, such as a change in an antigen's environment, will trigger the activation threshold.

Figure 21:
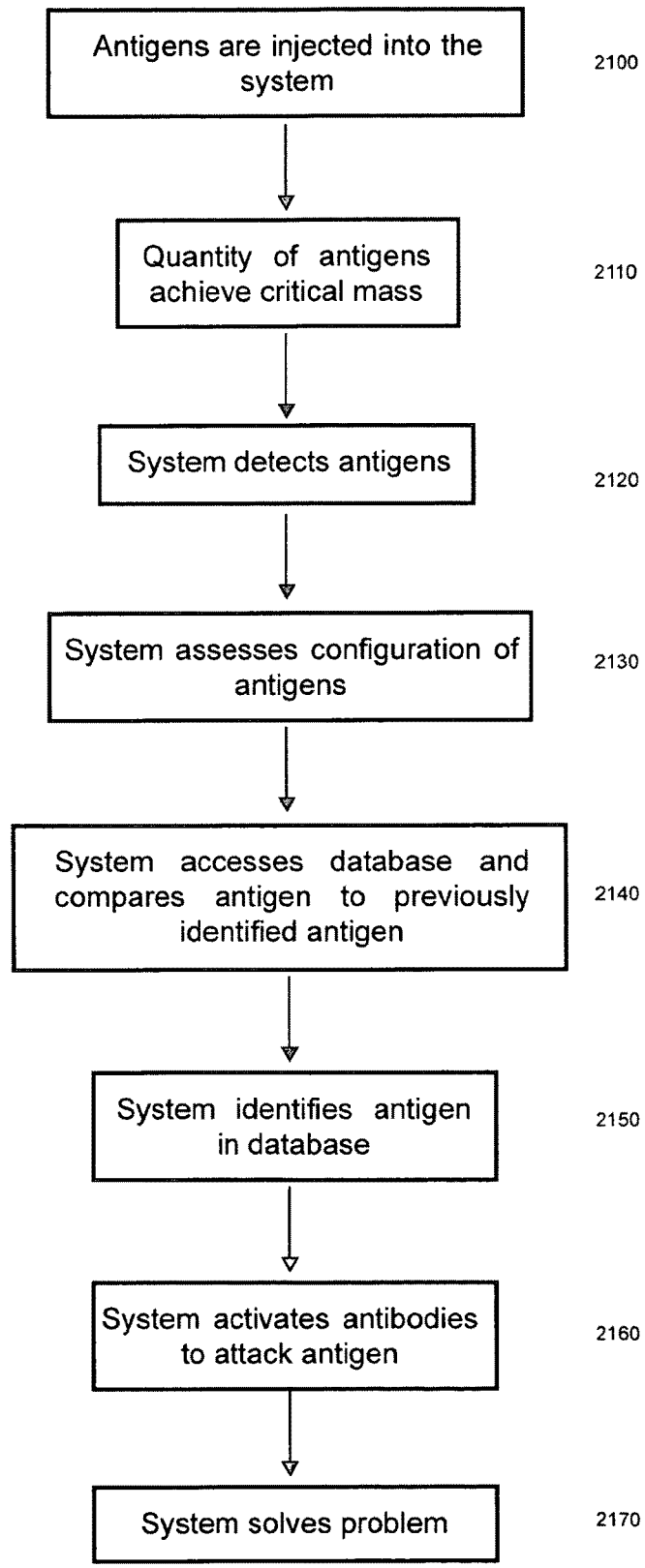
FIG. 21 is a flow chart showing the system generating solutions to antigen problems.

FIG. 21 shows how the system generates solutions to antigen problems. After antigens are injected into the system (2100), the quantity of antigens achieves a critical mass (2110) and the system detects the antigens (2120). The system then assesses the configuration of the antigen (2130), accesses a database and compares the antigen to previously identified antigens (2140). The system identifies an antigen in the database (2150) and activates antibodies to attack the antigen (2160). This process solves the problem (2170) and the system returns to equilibrium.

Figure 22:
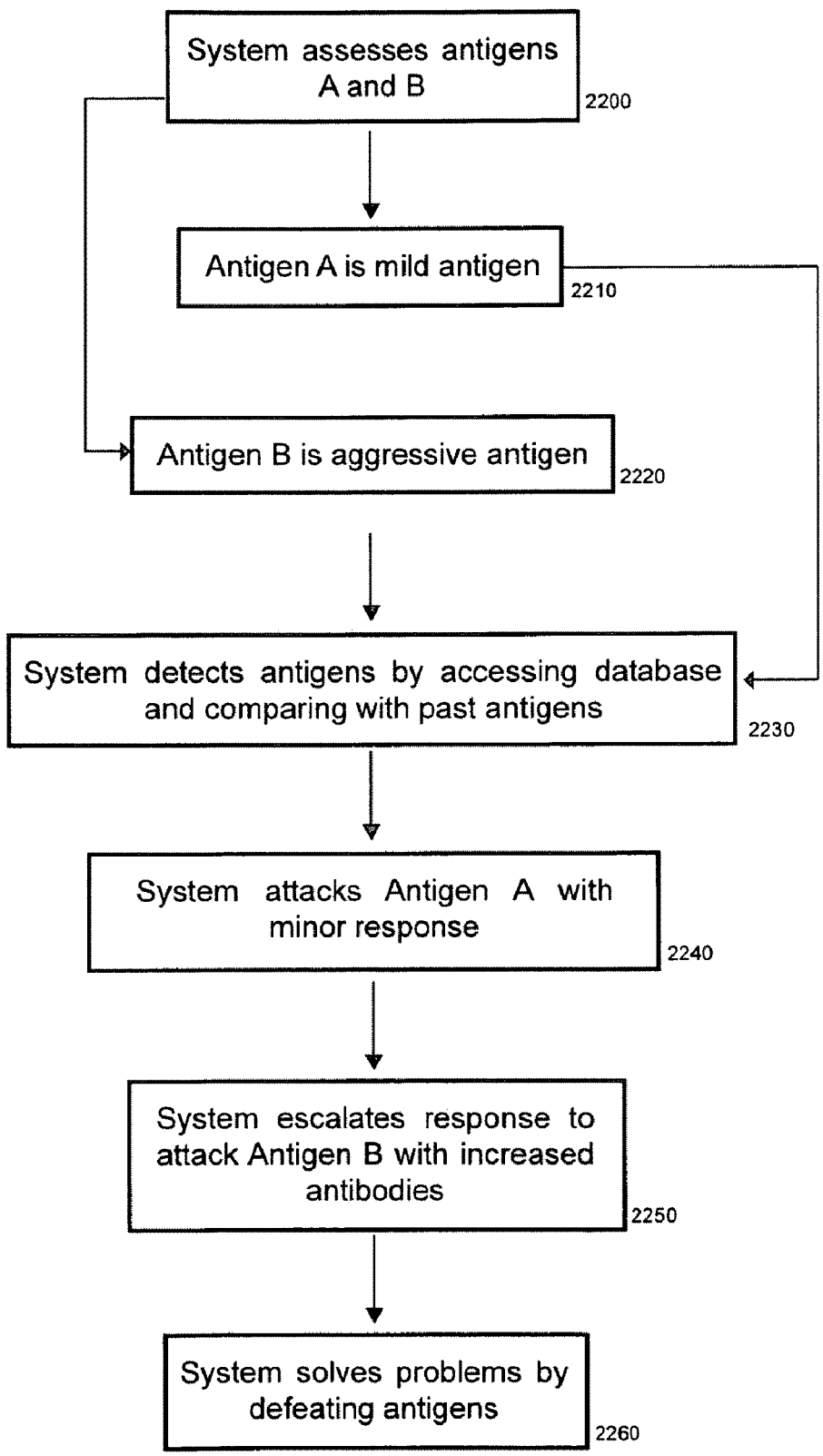
FIG. 22 is a flow chart showing the system solving different sorts of antigen problems by distinguishing the quality of the antigens.

The system is also designed to distinguish between multiple types of antigens. FIG. 22 describes the process of solving different problem types by distinguishing between the quality of the antigens. After the system assesses antigens A and B (2200), antigen A is detected as a mild antigen (2210) and antigen B is detected as an aggressive antigen (2220). The system detects the type and quality of the antigens by accessing a database and comparing antigens A and B to past antigens (2230) in specific categories and according to particular properties. The system attacks antigen A with a minor response (2240) and escalates a response to attack antigen B with a higher number of antibodies (2250). This model optimizes the efficiency of computation resources.

As a result of these actions, the system solves both types of problems. The escalation process of attacking a relatively more aggressive antigen with more aggressive responses involves the need to distinguish between qualities of antigens. In one respect, a new antigen which is not yet clearly classified as benign or aggressive will require the system to escalate the attack on the antigen over time, by efficiently preserving scarce resources initially and severely attacking an aggressive antigen as it receives feedback from the system of resisting the escalation of resources.

Figure 23:
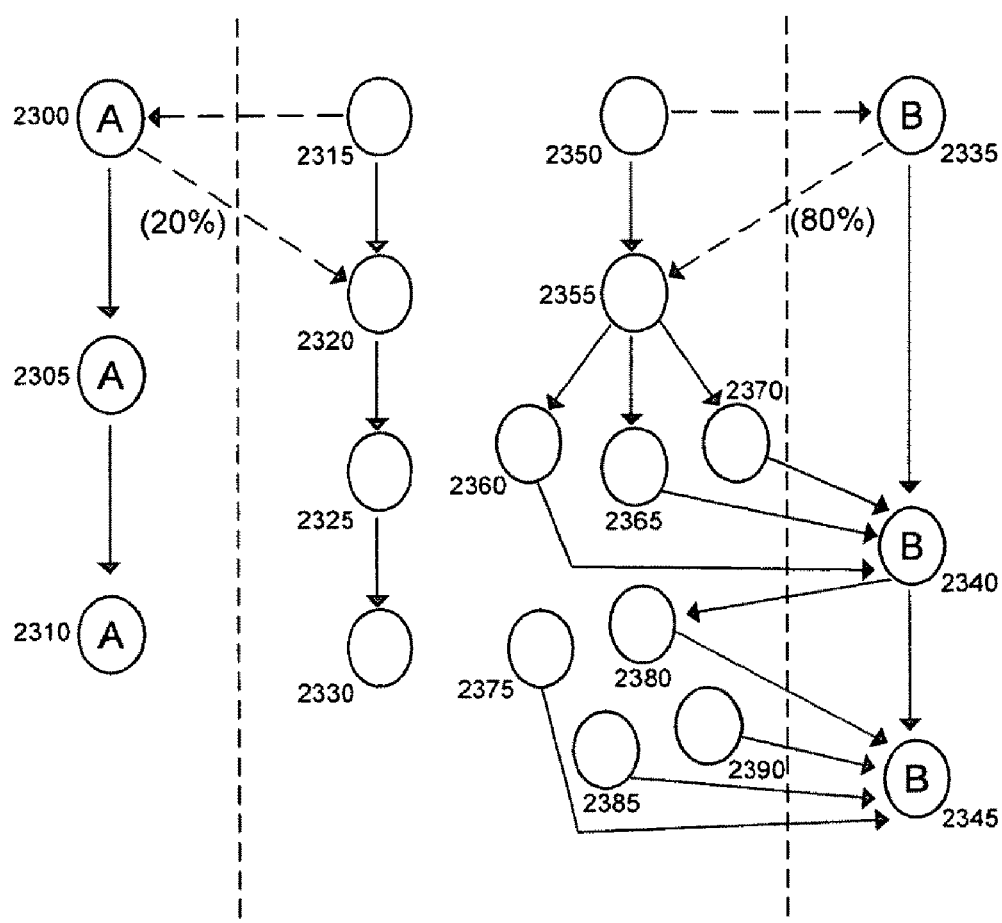
FIG. 23 is a schematic drawing showing the statistical model used to assess the relative danger of applying escalating solutions.

In FIG. 23, a statistical model is used to assess the relative danger of applying escalating solutions. In the left column, antigen A (2300, 2305 and 2310) is represented as moving downward over time. As it interacts with the antibodies in the middle column, it is initially viewed as requiring twenty percent of available resources to defeat. On the other hand, in the right column, antigen B (2335, 2340 and 2345) is represented as moving downward over time. However, this more aggressive antigen is initially identified as being much more hostile and requires eighty percent of the system's available resources to defeat. At each phase, the system at layer 1 brings more antibodies to attack the aggressive antigen. To do this, the system escalates the generation of antibody clones (2360, 2365 and 2370 at phase two and 2375, 2380, 2385 and 2390 at phase three) to generate sufficient capacity to defeat the antigen.

Figure 24:
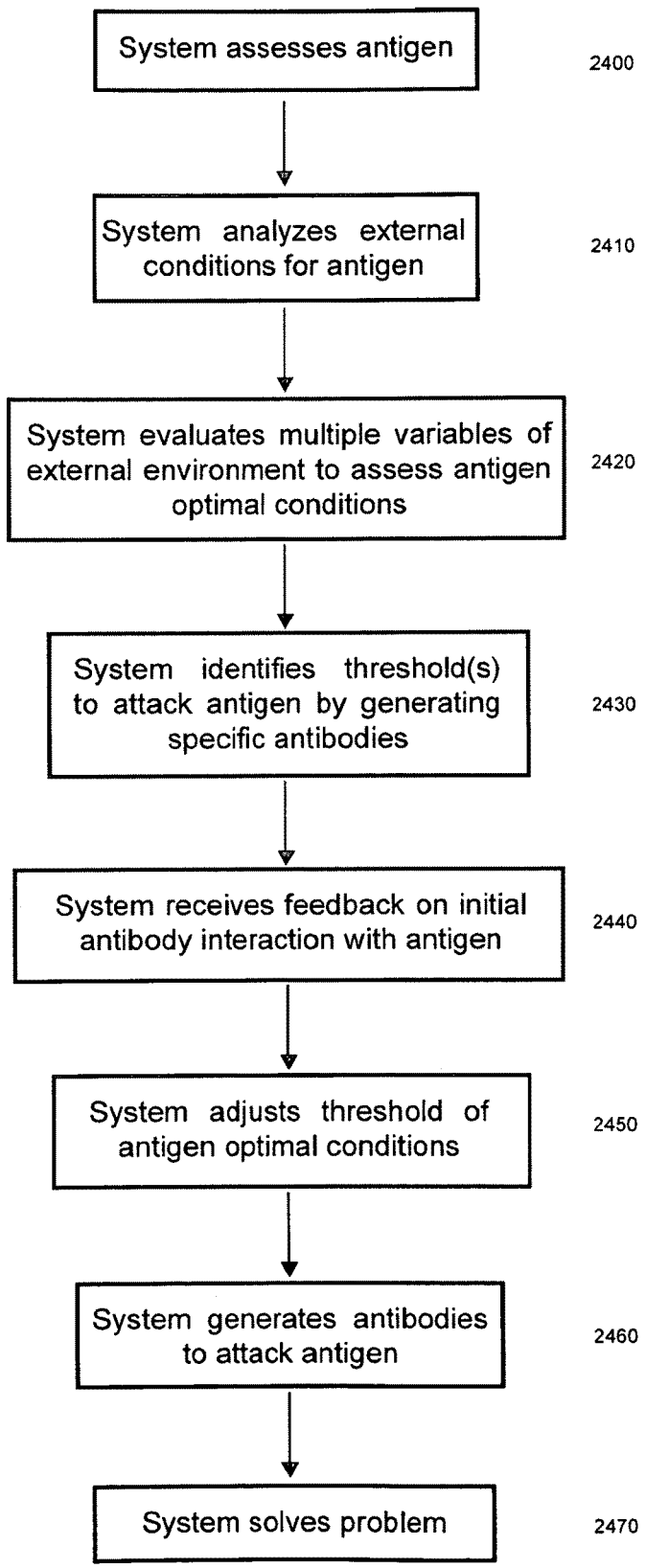
FIG. 24 is a flow chart describing the multiple variables and thresholds required to attack an antigen with antibodies.

FIG. 24 shows the process whereby multiple variables and thresholds are required to attack an antigen with antibodies. After the system assesses an antigen (2400), it analyzes external conditions for the antigen (2410) and evaluates the multiple variables of the external environment to assess the antigen's optimal conditions (2420). The system identifies threshold(s) to attack the antigen by generating specific antibodies (2430) and receives feedback on initial antibody interaction with the antigen (2440). The system then adjusts the threshold of antigen optimal conditions (2450) and generates antibodies to attack the antigen (2460). This process solves the problem.

Figure 25:
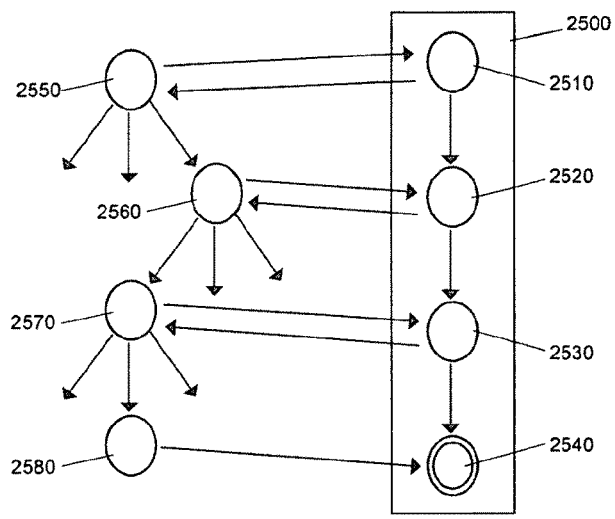
FIG. 25 is a schematic diagram showing a rapid antibody mutation evolution used to solve an antigen.

In FIG. 25, the antibody evolution process is shown that requires mutation. In an external environment (2500), the antigens evolve from position 2510 to positions 2520, 2530 and 2540. As the antibodies on the left side of the diagram interact with the antigen, they co-evolve according to specific mutation vectors. After the initial antibody development phase (2550), the third arrow depicts the direction of evolution for the second phase (2560), the first arrow of the next phase depicts the direction of evolution for the third phase (2570) and the second arrow of the last phase depicts the direction of the evolution of the last phase (2580). At each phase, interactions with the antigen guide the direction of evolution for the antibodies in order for the antibodies to successfully defeat the antigen at 2450.

Figure 26:
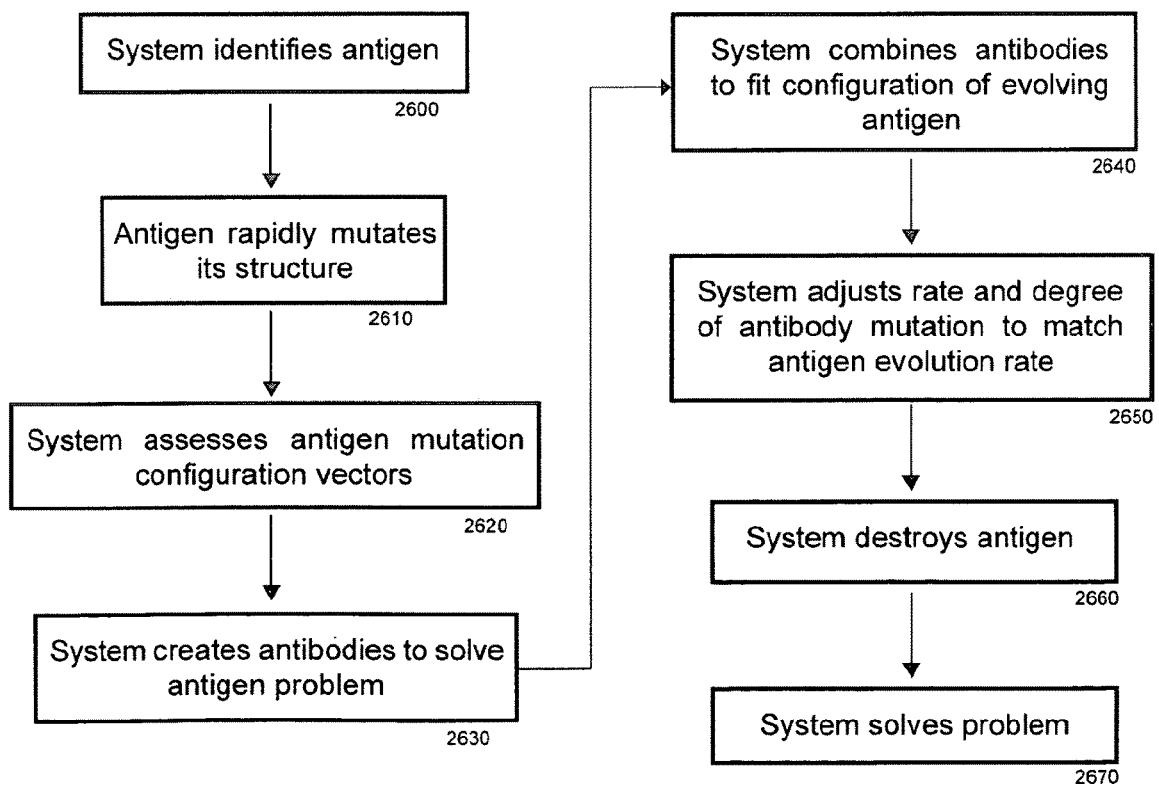
FIG. 26 is a flow chart showing the process of the combination of antibodies used to destroy an antigen.

FIG. 26 describes the process of antibody combination used to destroy an antigen. Once the system identifies an antigen (2600), the antigen rapidly mutates its structure (2610). The system then assesses the antigen mutation configuration vectors (2620) and creates antibodies to solve the antigen problem (2630). The system combines antibodies to fit the configuration of the evolving antigen (2640) and the system adjusts the rate and degree of antibody mutation to match the antigen evolution rate (2650). The system destroys the antigen (2660), solves the problem (2670) and returns to equilibrium.

Figure 27:
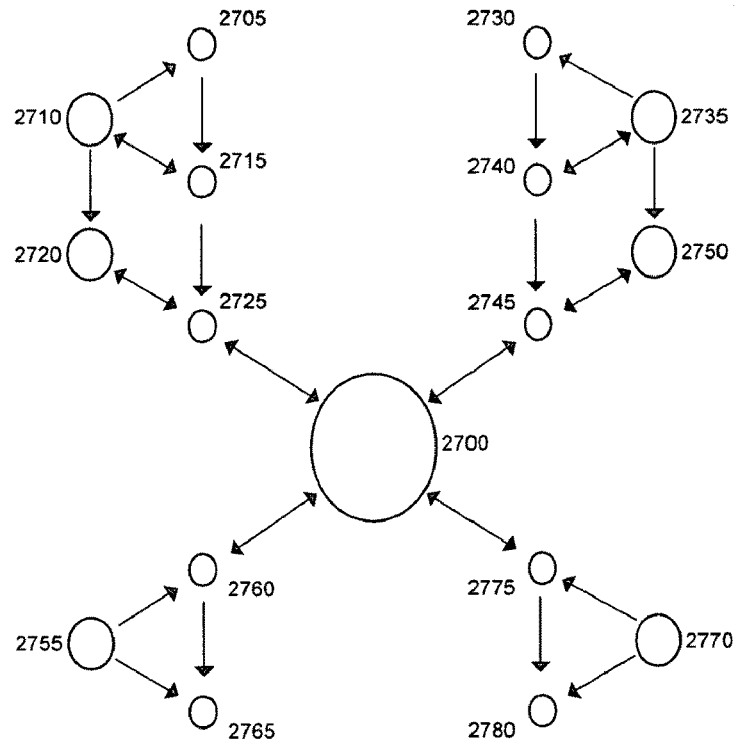
FIG. 27 is a schematic diagram showing the multiple solutions input into a global memory which is accessed when a similar antigen is discovered.

FIG. 27 shows how multiple solutions are input into a global memory, which is later accessed when a similar antigen is discovered. The antigens (2710 to 2720 and 2735 to 2750) interact with antibodies (2705, 2715 and 2725 and 2730, 2740 and 2745) and the antibodies solve the problem of the antigens. Once solved, the solutions are entered into the central database (2700). In later encounters with the same antigens (2755 to 2765 and 2770 to 2780), the system accesses the database, discovers the antigen categories and the appropriate solutions and passes this information to the antibodies (2760 and 2775) which are able to rapidly apply the same solutions and eradicate the antigens. This process maximizes efficiency and preserves computational resources.

Figure 28:
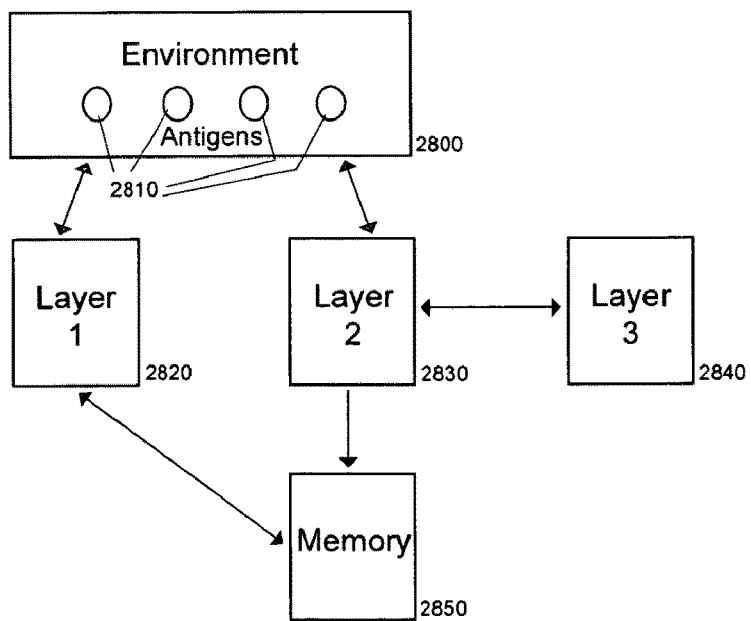
FIG. 28 is a schematic diagram showing the interaction of the three layers of the AIS3 with both the environment and the memory element.

FIG. 28 shows the interaction of the three layers of the AIS3 with both the environment and the memory element. The environment (2800) hosts antigens (2810) which interact with layers 1 (2820) and 2 (2830). Layer 2 solves novel problems and inputs data into memory (2850) while layer 1 accesses the information in memory. Layer 3 (2840) interacts with layer 2 in order to provide analytical capacity to assist in solving novel optimization problems.

Figure 29:
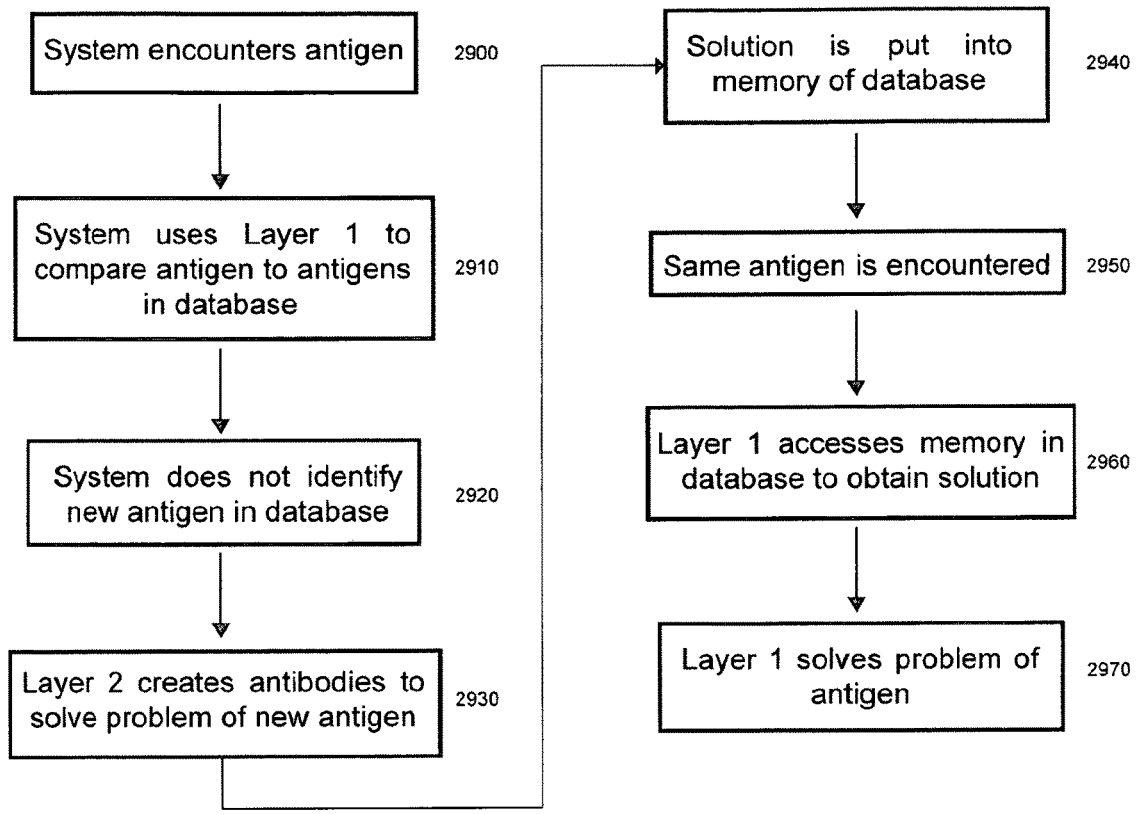
FIG. 29 is a flow chart showing the process of passing the solution generation to layer 2 to solve a problem of a new antigen.

FIG. 29 shows the process of passing the solution generation from layer 1 to layer 2 to solve a problem of a new antigen. After the system encounters an antigen (2900), it uses layer 1 to compare the antigen to the antigens in the database (2910). The system does not identify the new antigen in the database (2920) and passes the problem to layer 2. Layer 2 creates antibodies to solve the problem of the new antigen (2930) and the solution is stored in database memory (2940). The same antigen is encountered at a later time (2950) and layer 1 accesses the memory in the database to obtain a solution (2960) after which layer 1 solves the problem (2970).

Figure 30:
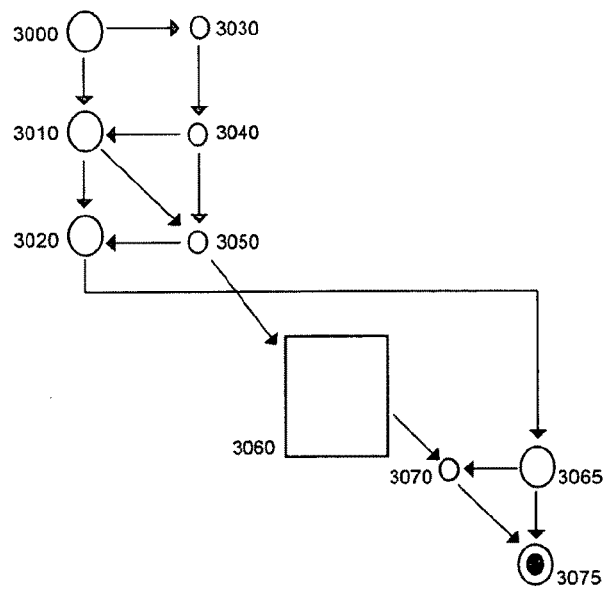
FIG. 30 is a schematic diagram showing the process used by layer 2 to solve an antigen problem, store the solution in memory and produce an antibiotic to solve a similar antigen problem at layer 1.

FIG. 30 shows the process used by layer 2 to solve an antigen problem, store the solution in memory and produce an antibiotic to solve a similar antigen problem at layer 1. The antigen (3000) is encountered by the antibody (3030), which tracks the antigen and solves it at 3050 and stores the solution (3060). Once the same antigen (3065) is discovered later, the antibody (3070) accesses the database and, at layer 1, after discerning the same antigen, acquires the solution to handily solves the antigen problem at 3075.

Figure 31:
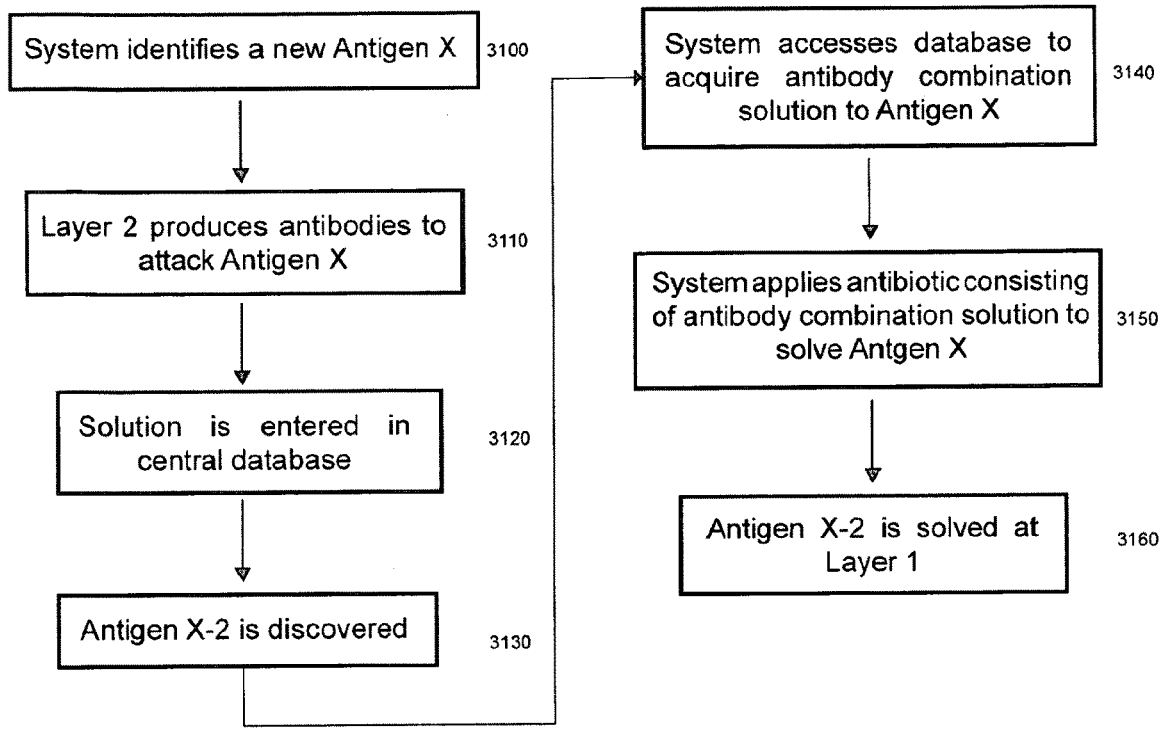
FIG. 31 is a flow chart showing the process of layer 2 generating a solution to solve an antigen and applying the solution at layer 1.

FIG. 31 is a flow chart that shows the process of generating a solution at layer 2 to solve an antigen and applying the solution at layer 1. Once the system identifies a new antigen X (3100), layer 2 produces antibodies to attack antigen X (3110) and the solution is entered into a central database (3120). Antigen X-2 is then discovered (3130) and the system accesses a database to acquire the antibody combination solution to antigen X (3140). The system then applies an antibiotic consisting of the antibody combination solution used to solve antigen X (3150) and antigen X-2 (a derivative of antigen X) is solved at layer 1 (3160). The new solution is stored in the database.

Figure 32:
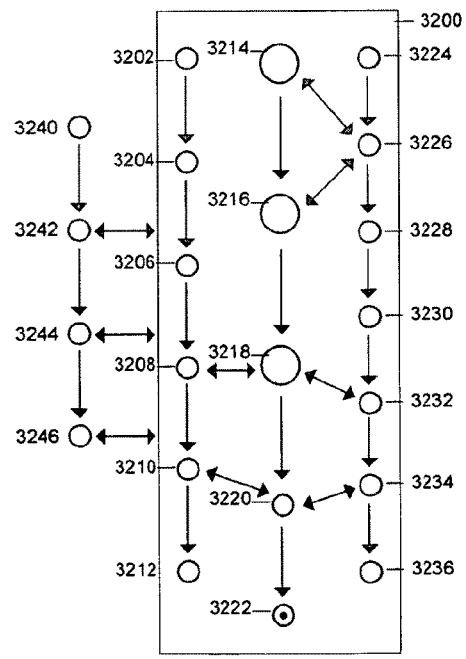
FIG. 32 is a schematic drawing showing the process of multiple interacting antigens in an environment overwhelming one antigen.

Antigens exist in an environment in which they are interactive with each other. In FIG. 32, multiple interacting antigens are shown in an environment overwhelming an evolving antigen. Within the environment (3200), the antigen moving downward in the left column (3202-3212) and the antigen moving downward in the right column (3224-3236) interact with the antigen in the center column (3214-3222) in multiple phases. Because of this interaction, the center antigen is diminished. The antibodies on the far left column (3240-3246) interact with the antigens in the environment until the center antigen is solved at 3222.

Figure 33:
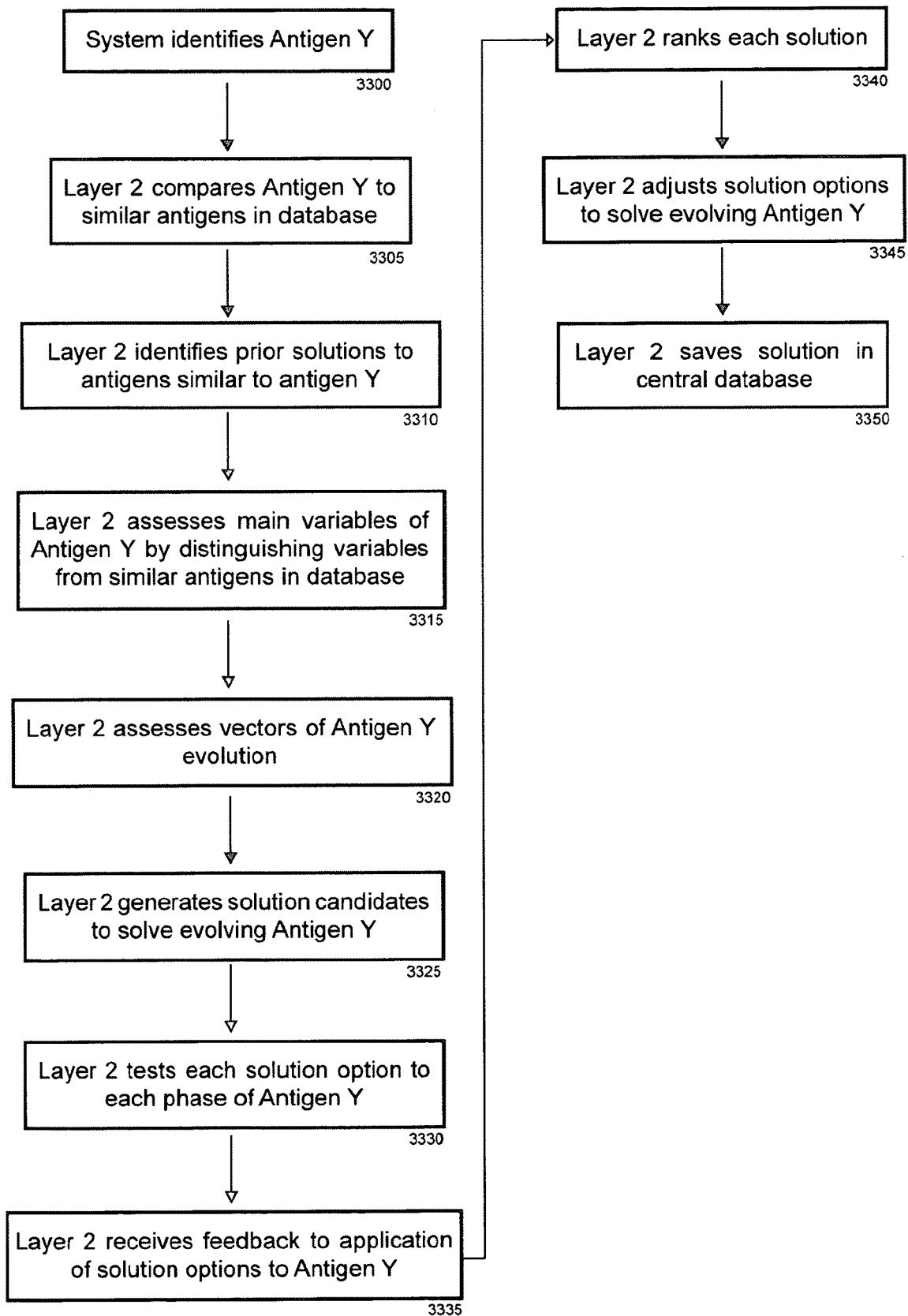
FIG. 33 is a flow chart showing the process of generating, testing and adjusting a solution to an antigen.

FIG. 33 shows the process of generating, testing and adjusting a solution to an antigen. After the system identifies the antigen Y (3300), layer 2 compares antigen Y to similar antigens in the database (3305) and identifies prior solutions to antigens similar to antigen Y (3310). Layer 2 then assesses the main variables of antigen Y by distinguishing between variables from similar antigens in the database (3315). Layer 2 assesses the vectors of antigen Y evolution (3320) and generates solution candidates to solve evolving antigen Y (3325). Layer 2 tests each solution option to each phase of antigen Y (3330) development and receives feedback to application of solution options to antigen Y (3335). Layer 2 ranks each solution option (3340) and adjusts solution options to solve evolving antigen Y (3345). The new solution is stored in the database (3350).

Figure 34:
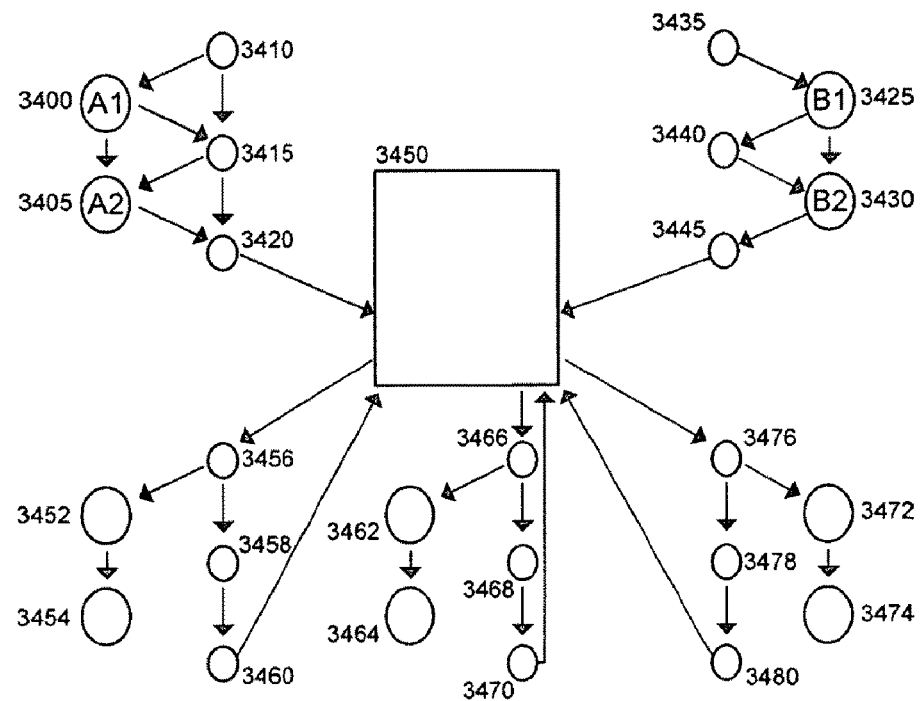
FIG. 34 is a schematic diagram showing the process of collective teaching in which the information is transmitted globally for individual antibodies.

FIG. 34 shows the process of collective teaching in which the information is transmitted globally for individual antibodies. Antibody A, which evolves at positions A1 (3400) and A2 (3405), interacts with antibodies at 3410 to 3420. Similarly, antibody B, which evolves at position B1 (3425) and B2 (3430), interacts with antibodies at 3435 to 3445. The solutions to the problems are then entered into a central database (3450). When future antigens are identified (3452, 3462 and 3472), antibodies are generated (3456, 3466 and 3476) to solve the newly encountered antigens by accessing the database for prior solutions. The latest solutions (at 3460, 3470 and 3480) are then entered into the database for future access. This model allows the storage and access of multiple combinatorial optimization solutions simultaneously. In this multiphasal process, the prior antibodies teach future antibodies to solve problems.

Figure 35:
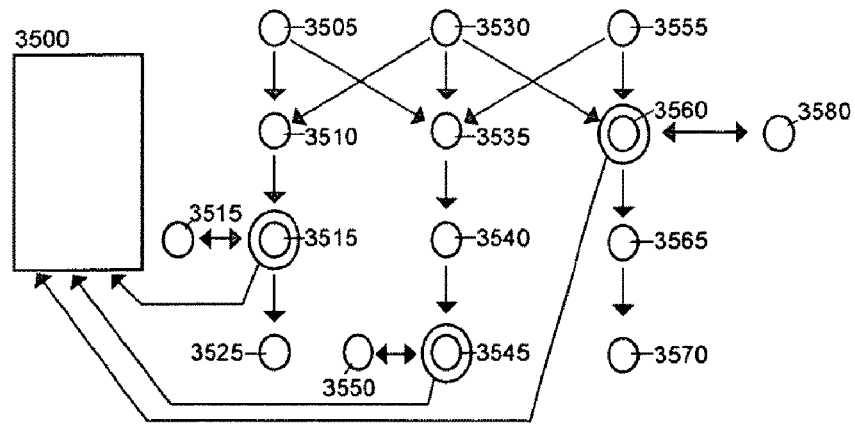
FIG. 35 is a schematic diagram showing the process of collectives of antibodies teaching other antibodies and solving eMOOPs and entering the solutions into a central database.

FIG. 35 shows the process of collectives of antibodies teaching other antibodies and solving eMOOPs. As they evolve, several groups of antibodies (3505-3525, 3530-3545 and 3555-3570) teach other antibodies directly about their experiences and solve the emerging antigens (3520, 3550 and 3580, respectively). The solutions to the newly encountered antigens are applied immediately without access to a database because the antibodies share information directly. However, the solutions may also be generated by accessing a database once the antigens are detected and identified at layer 1; thus, past solutions are passed to new problems on-demand, illustrating multiple learning components of the system. The solutions may be generated to solve the antigens at any phase of evolution. Once the antigens are solved, the new solutions are entered into the database (3500).

Figure 36:
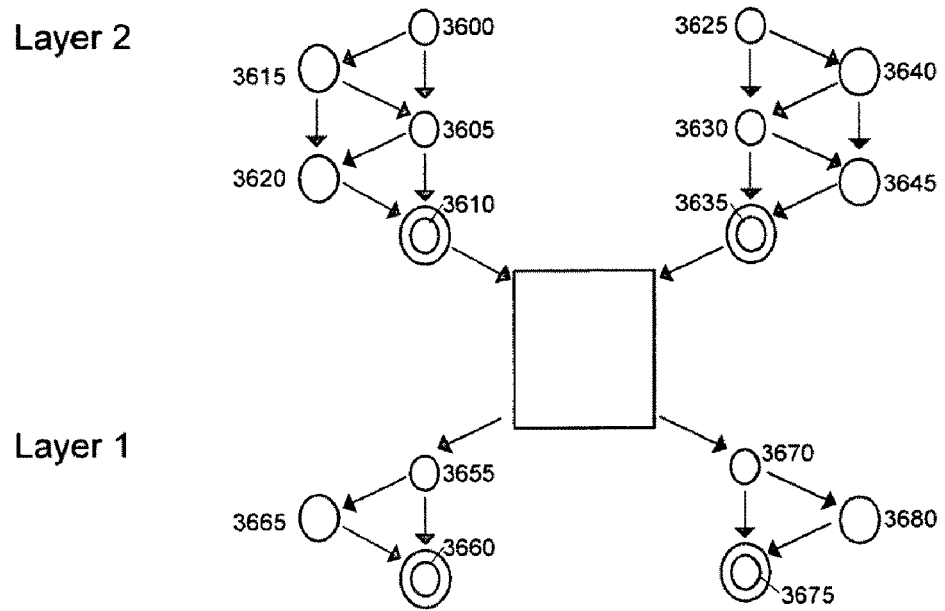
FIG. 36 is a schematic diagram showing the process of social teaching between antigens in which solutions that are produced at layer 2 are pushed to the next generation of antibodies used to apply the solution at layer 1.

FIG. 36 shows the process of social teaching between antigens in which solutions that are produced at layer 2 are pushed to the next generation of antibodies used to apply the solution at layer 1. As the antibodies evolve (3600-3610 and 3625-3635) at layer 2, they encounter and solve antigen problems (3615-3620 and 3640-3645) and enter the solutions (3610 and 3635) into the database (3650). At layer 1, antibodies (3655 and 3670) then interact with the newly encountered antigens (3665 and 3680) and solve the problems rapidly (3660 and 3675) by accessing the database for past solutions to known antigens. The teaching process occurs by layer 2 pushing the solutions to new antibodies at layer 1 to solve a new generation of problems.

Figure 37:
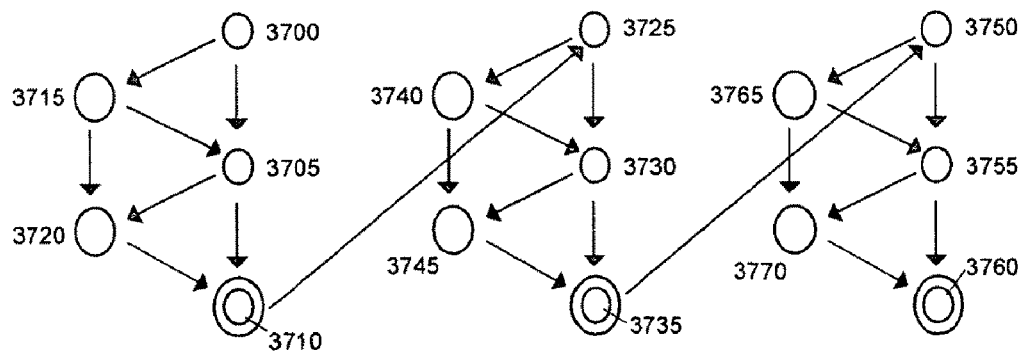
FIG. 37 is a schematic diagram showing the sharing of data with antibodies in a decentralized system.

FIG. 37 shows the sharing of data with antibodies in a decentralized system. In this figure, a set of antibodies (3700-3710) interacts with an evolving antigen (3715-3720) and solves the problem at 3710. This solution is then passed on directly to a set of antibodies (3725), which interacts with another evolving antigen (3740-3745) and solves the problem at 3735. Similarly, this solution is passed directly to the antibodies at 3750. As these antibodies (3750-3760) interact with the evolving antigen (3765-3770), the antigen is solved at 3770. This process is significant because it passes solutions directly to successive antibodies.

Antibodies solve optimization problems by satisfying the constraints of the multi-objective problem (antigen). In FIG. 38, the model is shown of the process of fitting antibodies to a complementary mold of an evolving antigen. At the first phase of the process, the antigen (3800) and the antibodies (3810 and 3820) are identified. At the second phase, the antigen (3830) is surrounded by cloned antibodies (3840) which proceed to form around the antigen. Finally, at the third phase, the antigen (3850) is fully surrounded by the antibodies (3860), which solve the problem. In the HIS, antibodies solve the problem encountered by an antigen by identifying the specific geometric contours of the antigen and by enveloping the antigen. The present model emulates some elements of this approach by analogy by deciphering the components of the antigen and by solving the constraints of the eMOOP.

Figure 39:
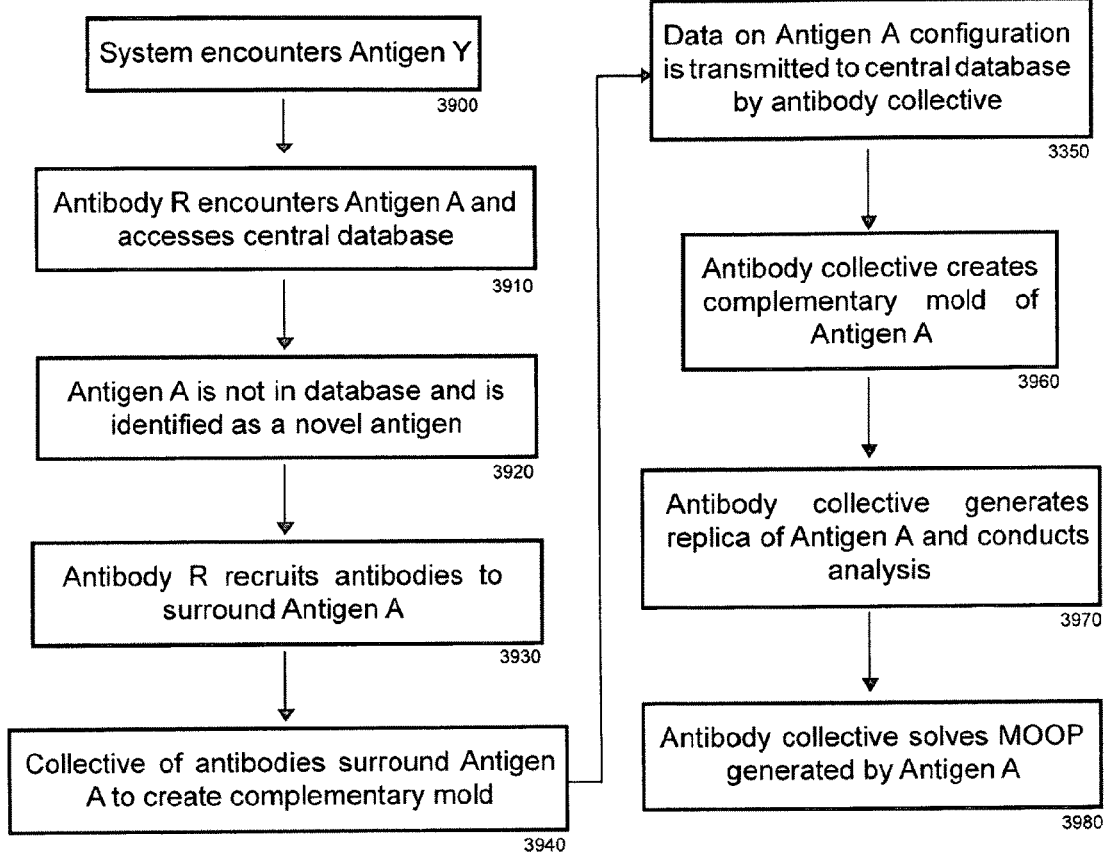
FIG. 39 is a flow chart describing the process of an antibody generating other antibodies to solve a problem of an antigen.

In FIG. 39, the process of an antibody that generates other antibodies to solve an optimization problem is shown. Once the system encounters antigen A (3900), antibody R encounters antigen A and accesses a central database (3910). However, antigen A is not discovered in the database as a novel antigen (3920) and antibody R recruits antibodies to surround antigen A (3930). A collective of antibodies surround antigen A to create a complementary mold (3940). Data on the antigen A configuration is transmitted to the central database by the antibody collective (3950) and the antibody collective creates a complementary mold of antigen A (3960). The antibody collective generates a replica of antigen A and conducts analysis (3970) and solves the MOOP generated by antigen A (3980).

Figure 40:
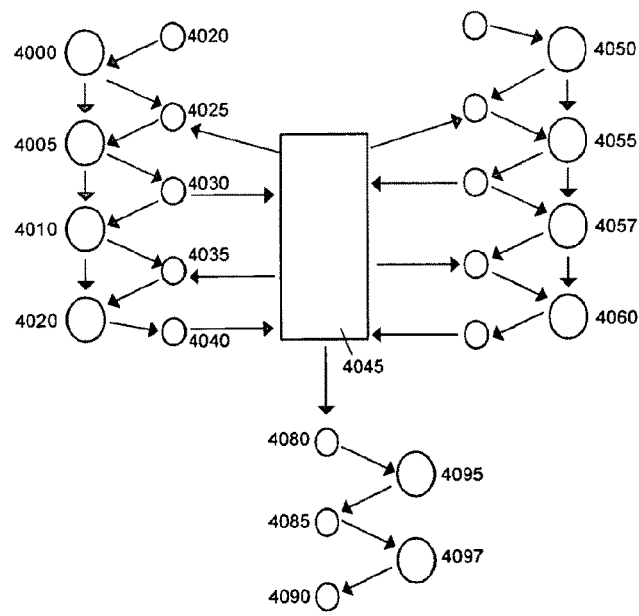
FIG. 40 is a schematic diagram showing the reverse engineering process of analyzing the evolution of an antigen.

FIG. 40 shows the reverse engineering process of analyzing the evolution of an antigen. Once evolutionary antigens (4000-4015 and 4050-4060) are detected by antibodies (4020 and 4065), the antibodies immediately access the central database (4045) to obtain solutions to the antigens. The antibodies then analyze the antigens (4030 and 4072), develop solutions at several phases and enter the data into the database. Again, the antibodies access the database (4035 and 4075) in order to obtain data to use in the analyses to solve the eMOOPs. Once the eMOOPs are solved, the solutions (4040 and 4077) are entered into the database. At a later phase, antibodies (4080-4090) interact with newly encountered antigens (4095-4097) and solve the new antigens at 4090 by accessing prior database solutions.

Figure 41:
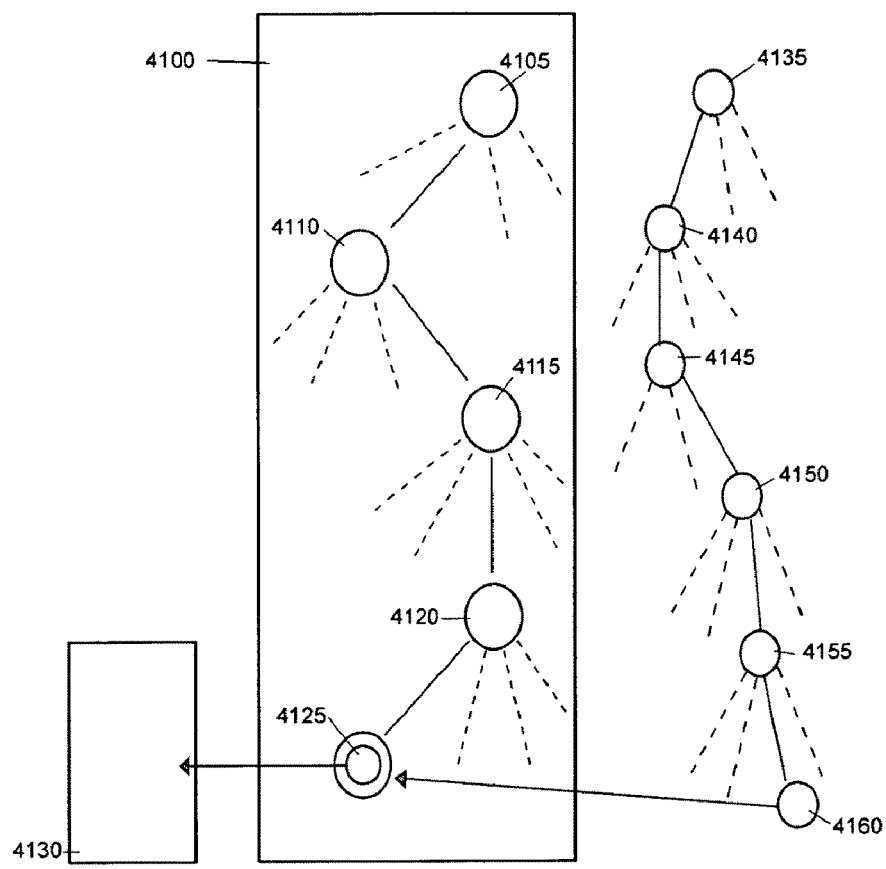
FIG. 41 is a schematic diagram showing antigen mutation vector options in an environment aligned with antibody mutation vector options and storing the solution results.

FIG. 41 shows antigen mutation vector options in an environment aligned with antibody mutation vector options and storing the solution results. The evolving antigen (4105-4125) within the environment (4100) demonstrates the multiple phases of the antigen mutation vectors. To the right side, the antibodies (4135-4160) evolve in a parallel track to mirror the antigen evolution. The antibody solution (4160) to the final phase of the antigen problem (4125) is stored in the central database (4130).

Figure 42:
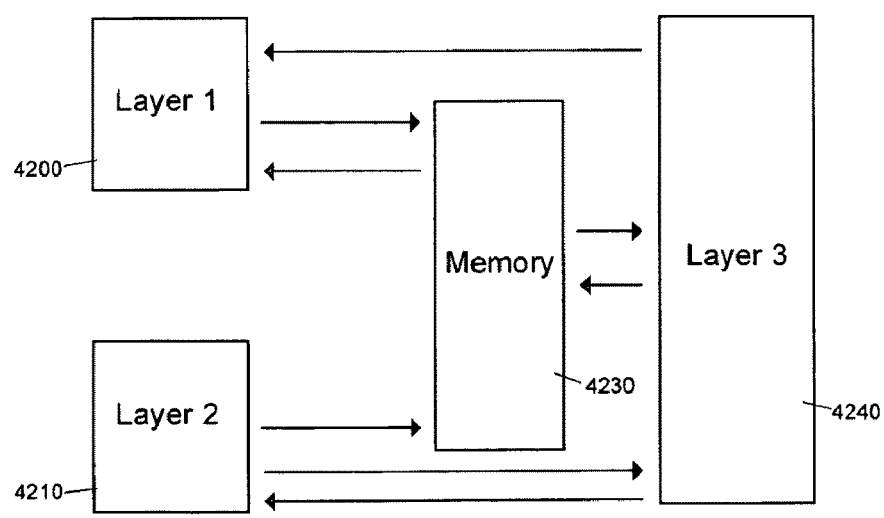
FIG. 42 is a schematic diagram showing the three layers of the AIS3 with a central memory component.

FIG. 42 shows the three layers of the AIS3 with a central memory component. In this figure, layer 1 (4200) provides information to layer 2 (4210), stores information into and accesses the central memory (4230) and receives modeling data from layer 3 (4240). Layer 2 (4210) provides information to, and receives information from, layer 3 and stores data in the central database. Layer 3 stores and accesses information in the database and provides information to both layers 1 and 2.

Figure 43:
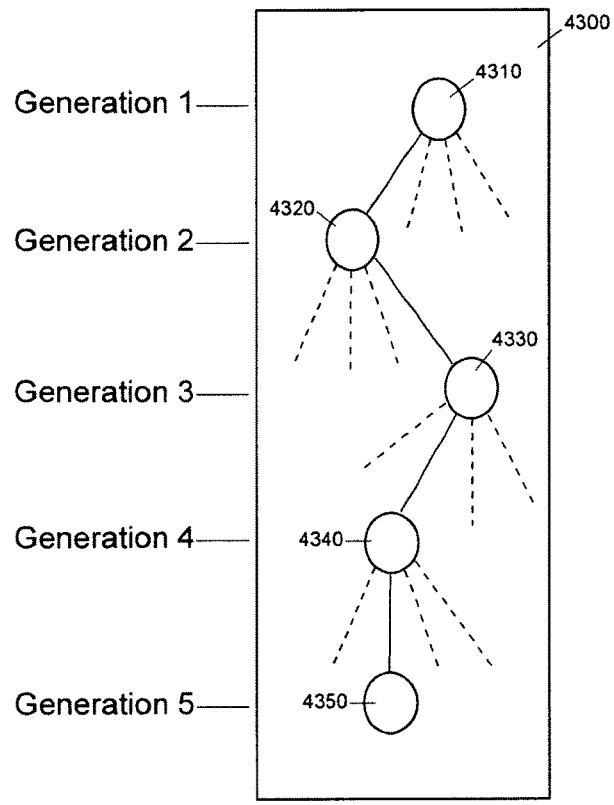
FIG. 43 is a schematic diagram illustrating the modeling process of antigen mutation vectors.

In FIG. 43, the modeling process of antigen mutation vectors is shown. From the first phase, in generation 1, the antigen (4310) evolves on a specific vector to a position at generation 2 (at 4320). At generation 3, the antigen evolves to a new position on a vector at 4330, while at generation 4, the antigen evolves to a new position on a vector at 4340 and at generation 5, the antigen evolves to a new position on a vector at 4350. Modeling the evolutionary characteristics of the antigen is critical to understanding and solving the problem.

Figure 44:
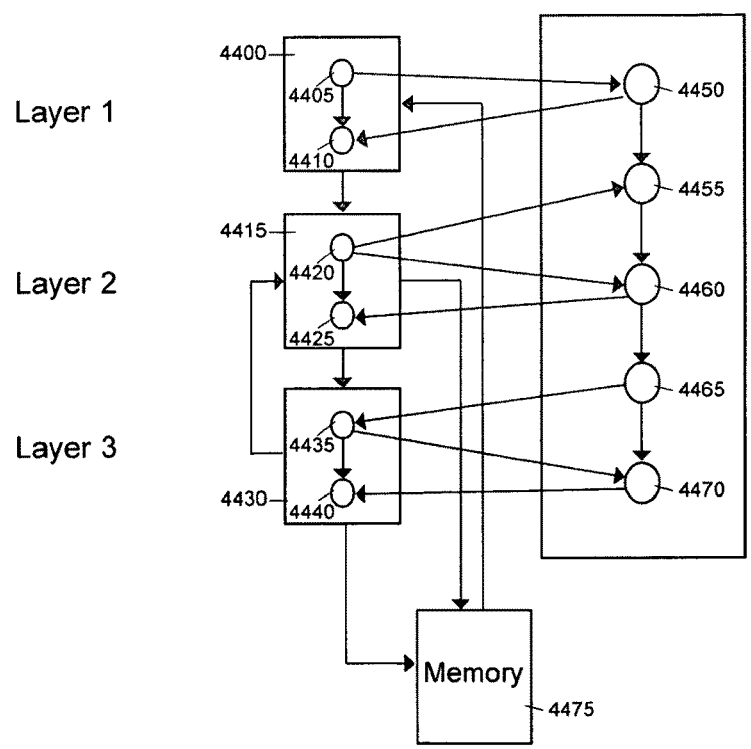
FIG. 44 is a schematic diagram showing the interoperation of the three layers of the AIS3.

FIG. 44 shows the interaction of the three layers of the AIS. Layer 1 (4400) encounters an antigen (4450) and generates solution options (4410) by accessing memory (4475). If it cannot produce successful solutions to solve the problem of the antigen, then the problem is forwarded to layer 2. At layer 2, the antigen is accessed as it evolves from 4455 to 4460. "N" (i.e., an indeterminate) number of solution attempts are constructed between 4420 and 4425 to generate solution options which are tested at 4460. If the solution is developed at layer two, the solution is stored in memory. If the solution is not generated at layer 2, the problem is forwarded to layer 3, where the problem (4465) is modeled at 4435. The modeling process will engage "N" number of modeling simulations between 4435 and 4440 to seek solutions and then enter the solution at 4440 in memory.

Figure 45:
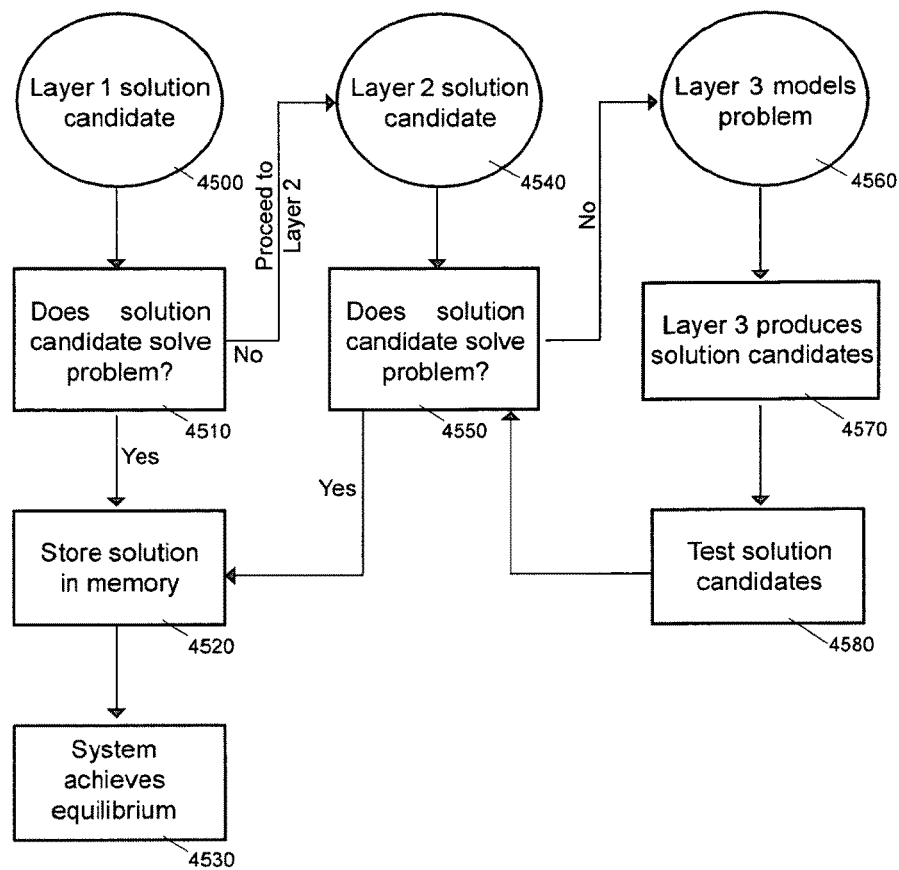
FIG. 45 is a flow chart showing the interoperation of the three layers.

FIG. 45 further shows the interoperation of the three layers. After the solution candidate is generated at layer 1 (4500), the question is asked whether the solution candidate solves the problem (4510). If it does solve the problem, then the solution is stored in memory (4520) and the system achieves equilibrium (4530). If it does not solve the problem, then the system proceeds to layer 2. After solution candidates are generated (4540) at layer 2, the question is again asked if the solution candidate solves the problem (4550). If it does solve the problem, then the solution is stored in memory and the system achieves equilibrium. If it does not solve the problem, the system proceeds to model the problem at layer 3 (4560). Layer 3 produces solution candidates (4570), tests the solution candidates (4580) and repeats this process until it solves the problem. Once the problem is solved, the solution is stored in memory and the system achieves equilibrium.

Figure 46:
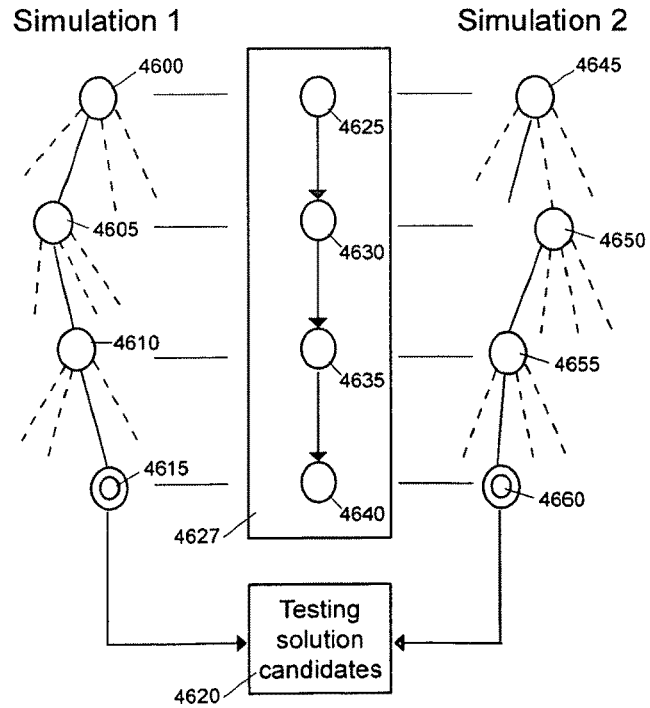
FIG. 46 is a schematic diagram that shows the layer 3 simulation option generation process.

FIG. 46 shows the layer 3 simulation option generation process. In this drawing, the evolving antigen (4625-4640) is represented in an environment. Two parallel simulations of antibodies are constructed (4600-4615 and 4645-4660) with evolving mutation vectors in order to reach solution candidates (4615 and 4660). The solution candidates are then tested (4620). In fact, though there are two simulations referenced in this drawing, the system uses a multitude of parallel simultaneous modeling approaches to model and solve the antigens.

FIG. 47 shows the process of solving an antigen problem by using the problem solving capabilities of layers 2 and 3. Once the system encounters an antigen (4700), it generates simulations of scenarios of antigen eMOOPs at layer 3 (4710). Layer 3 generates simulations of antibody collective behaviors to present solutions candidates (4720). The modeling simulations of antigens and antibodies train layer 2 solution generation (4730). By using the simulations, and statistical modeling processes that anticipate antigen evolution trajectories (4740), layer 2 accesses layer 3 modeling and adapts to the evolving antigen mutation pathways (4760). Layer 2 then solves the eMOOP and stores the solution in the database (4740).

FIG. 48 shows the process of layer 3 modeling an antigen ecosystem to develop scenario solution options. After layer 3 generates models of potential synthetic antigen R (4800), it forecasts multiple scenarios of synthetic antigen R (4810). Layer 3 then generates a simulation of antibodies to solve synthetic antigen R (4820). The system encounters antigen R (4830) and the layer 3 model of antibodies solves the problem of antigen R and stores the solution in a database (4840). When the system once again encounters antigen R (4850), the system pro-actively seeks out and attacks antigen R in real time at layer 1 (4860) by accessing the memory in the database. The antigen R MOOP is solved (4870).

Figure 49:
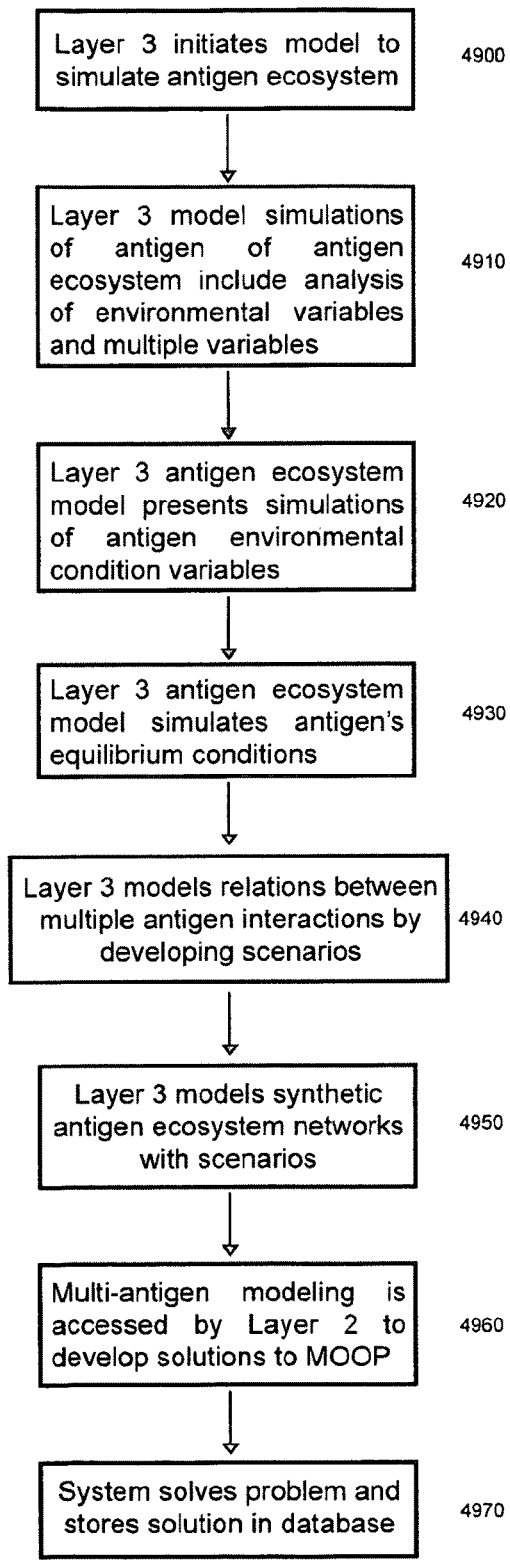
FIG. 49 is a flow chart showing the process of layer 3 modeling an antigen ecosystem to develop scenario solution options.

FIG. 49 shows the process of layer 3 modeling an antigen ecosystem to develop scenario solution options for an eMOOP. Layer 3 initiates a model to simulate antigen ecosystem (4900), which model simulations include analysis of environmental variables in multiple variables (4910). The layer 3 antigen ecosystem model then presents simulations of antigen environmental condition variables (4920) and layer 3 ecosystem model simulates the antigen's equilibrium conditions (4930). Layer 3 models relations between multiple antigen interactions by developing multiple scenarios (4940) of behaviors and layer 3 develops multiple models of scenarios of synthetic antigen ecosystem networks (4950). The multi-antigen modeling is accessed by layer 2 to develop solutions to eMOOPs (4960) in real time as new antigens are encountered. The system solves the antigen problem and stores the solution in a database (4970).

Figure 50:
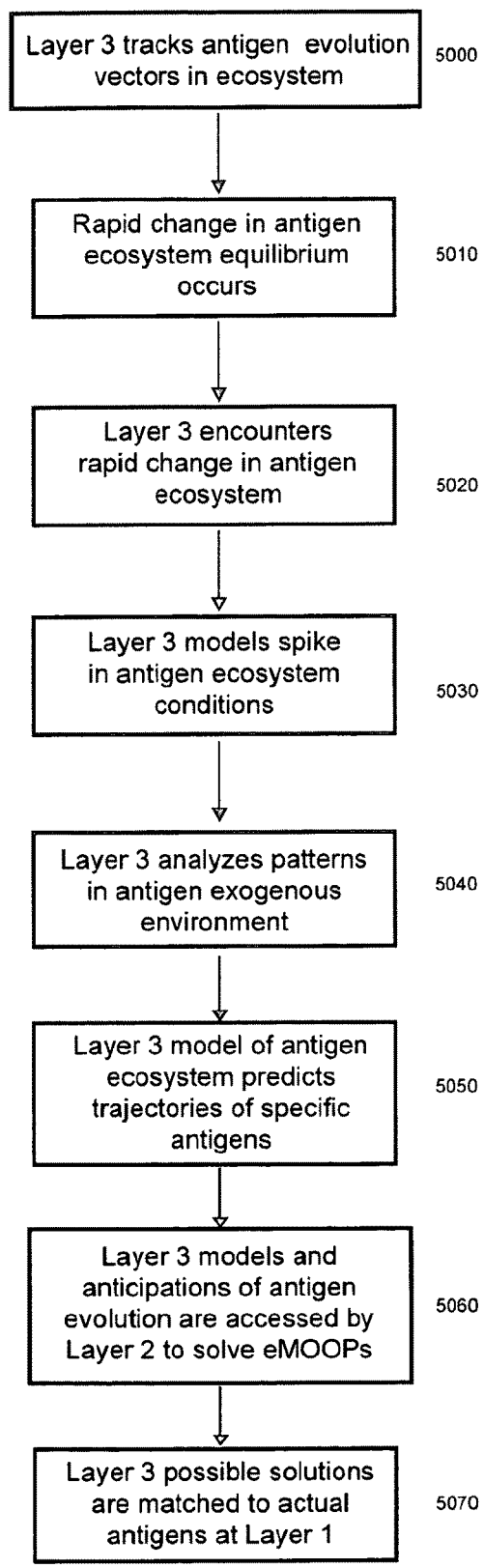
FIG. 50 is a flow chart showing the process of layer 3 modeling an antigen ecosystem to predict antigen trajectories.

FIG. 50 shows the process of layer 3 modeling an antigen ecosystem to predict antigen trajectories. After layer 3 tracks antigen evolution vectors in an ecosystem (5000), a rapid change in the antigen ecosystem equilibrium occurs (5010) and layer 3 detects the change (5020). Layer 3 models a spike in antigen ecosystem conditions (5030) and analyzes patterns in the antigen exogenous environment (5040). The layer 3 model of the antigen ecosystem then predicts trajectories of specific antigens (5050) and the layer 3 modeling and anticipations of the antigen evolution trajectories are accessed by layer 2 to solve eMOOPs (5060). Layer 3 possible solutions are matched to actual antigens at layer 1 (5070) and the problems are solved and stored.

FIGS. 51 to 60 describe the system's analysis and response to viruses, a particular class of antigens. FIG. 51 shows the evolution scenarios of a virus. At 5100, the virus may evolve into either 5110 or 5140 depending on its mutation vectors and environmental conditions. From 5110, it will evolve into phases at 5120 and 5130. In this case, its evolutionary development is limited. For instance, in this first scenario, its evolutionary track may be limited by restrictive environmental conditions. At 5140, however, the virus will develop either to position 5150 or 5170. If it evolves to position 5150, the positive environmental conditions will allow it to flourish at a later phase at 5160. If it evolves to the mutation vector at 5170, its development will remain restricted at the next phase at position 5180.

FIG. 52 shows the artificial virus hypermutation vector modeling scenarios. After the system models the artificial virus hypermutation direction vectors (5200), the vectors are determined to be either slow (5210) (in a cold environment), normal (5230) (in an average environment) or rapid (5250) (in a hot environment). If the virus's vector is slow, its development is slow (5220). If its vector is normal, its development is normal (5240). Finally, if its vector is rapid, its development is accelerated (5260).

Figure 53:
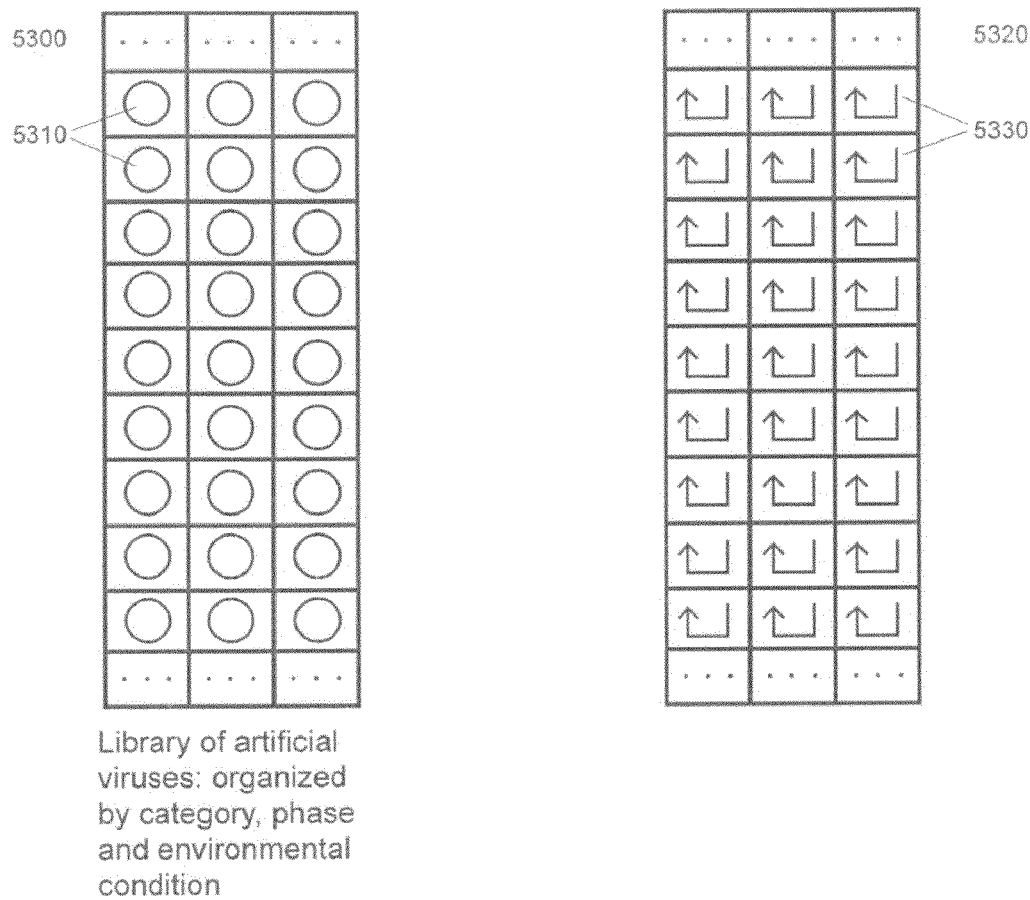
FIG. 53 is a schematic drawing showing a library of artificial viruses and the search for solutions to eMOOPs.

FIG. 53 illustrates a library of artificial viruses and the search for solutions to eMOOPs. On the left, the library (5300) or catalogue of artificial viruses organizes the viruses (5310) by category, phase of development and environmental condition. This organization system is analogized a periodic table for chemicals in which the variables of chemicals are organized into specific categories. These virus attributes fit into a common classification scheme. On the right side is a table (5320) which describes the corresponding search for solutions (5330) to the specific viruses that are classified in the virus library.

Figure 54:
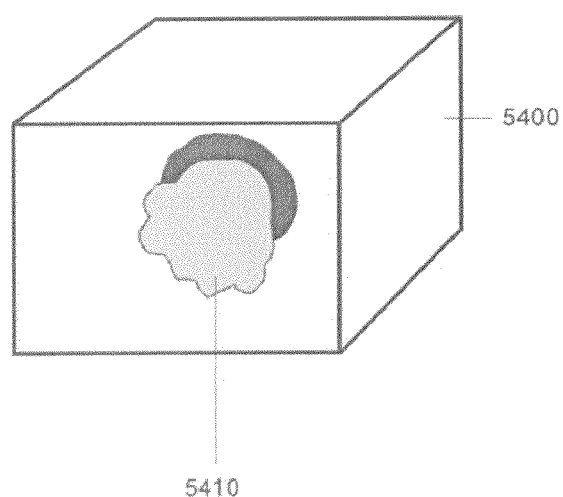
FIG. 54 is a schematic drawing showing a three dimensional snapshot of an artificial virus.

In FIG. 54, a three dimensional (5410) snapshot of an artificial virus is shown. It is important to realize that while most representations of viruses are two dimensional, the artificial synthetic virus is analogized to a real virus with three dimensions of geometric extension in space. In addition, the analysis of the evolutionary process of the artificial virus maps the virus over time. Therefore, a four dimensional animation of virus evolution is critical to understanding the AIS3 modeling process for analysis of artificial and synthetic viruses. With 4D animations, the system is able to analyze the virus mutation vectors at multiple phases, is able to compare the virus evolution with other viruses and is able to predict and anticipate the probable evolutionary pathways of complex eMOOPs. Only by accurately analyzing eMOOPs can solutions be developed in a timely way to satisfy critical constraints.

Figure 55:
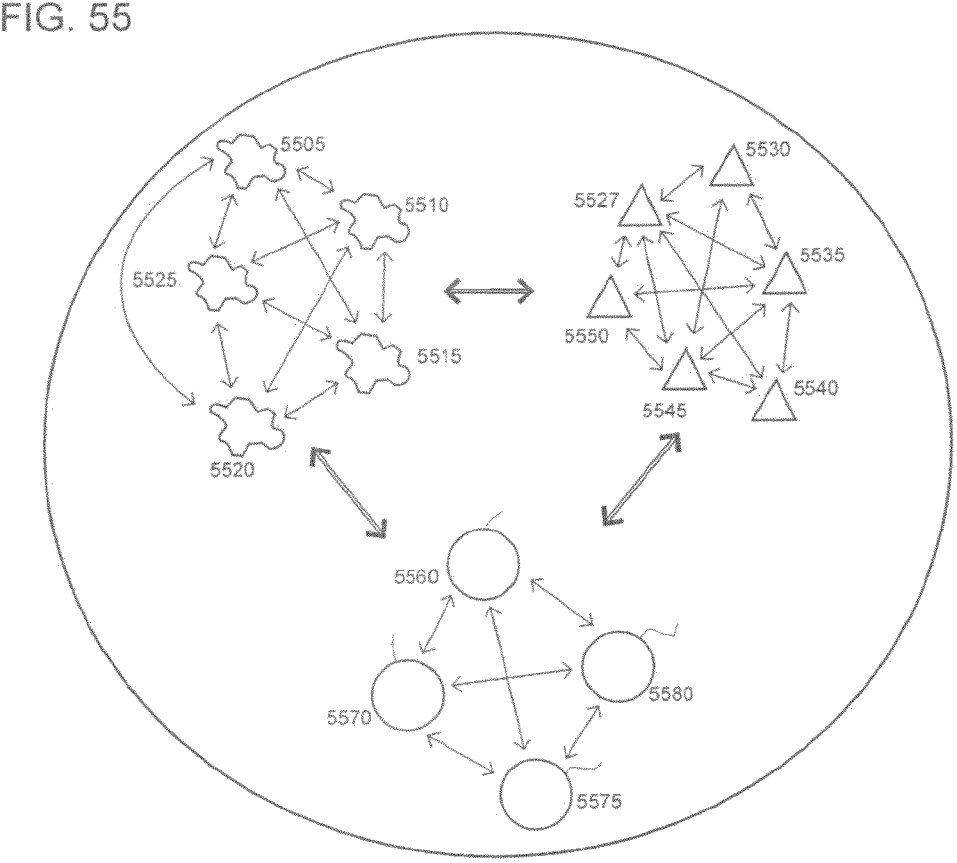
FIG. 55 is a schematic drawing showing the connection between several collectives of antigens in an environment in which the system models competition between the groups and cooperation within the groups.

FIG. 55 shows the connection between several collectives of antigens in an environment in which the system models competition between the groups and cooperation within groups. In the social settings among antigens in an artificial environment (5500), there is both cooperation and competition. Within specific antigen family types (5505, 5525 and 5560), there is cooperation between members which share common attributes. However, between the families of antigens there is competition.

Figure 56:
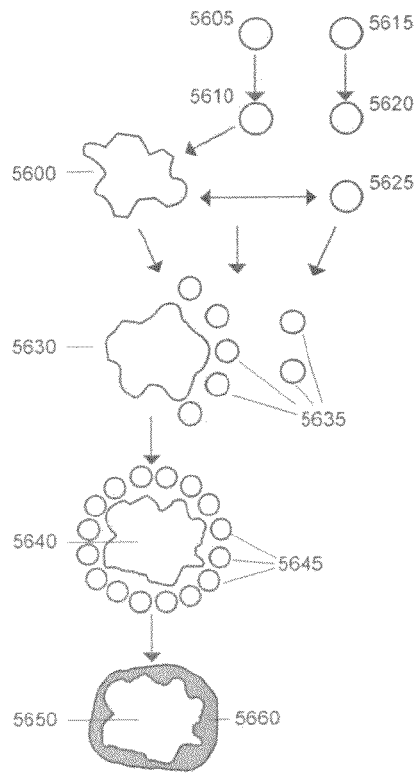
FIG. 56 is a schematic drawing showing an antibody collective enveloping an evolving virus.

FIG. 56 shows an antibody collective enveloping an evolving virus. The virus (5600) at the first phase is encountered by the antibodies (5610 and 5625) which recruit or clone other antibodies (5605, 5615 and 5620). The antibody group (5635) at phase two approaches the virus. At phase three, the antibodies (5645) collectively surround the virus (5640). At the final phase, the virus (5650) is enveloped by the antibodies (5660) and the problem is solved. This process shows the four dimensional character of identification and destruction of a virus by an antibody collective.

Figure 57:
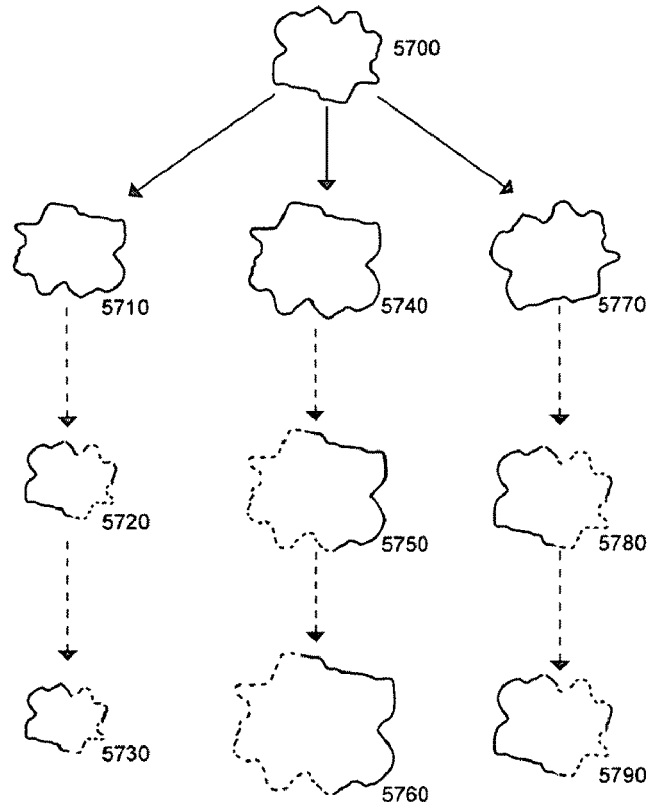
FIG. 57 is a schematic drawing showing the experimentation process of adjusting variables and potentialities of antigens with several scenario simulations.

FIG. 57 shows the experimentation process of adjusting variables and potentialities of antigens with several scenario simulations. The antigen at 5700 evolves into several vector pathway potentialities (5710, 5740 and 5770); each of these evolutionary potentialities develops its own evolutionary pathway based on its distinctive variables. The AIS3 layer 3 models the simulations of each of the antigen evolutionary pathways by experimenting with the potentialities. The evolutionary development process of 5710 moves to 5720 and 5730, while 5740 moves to 5750 and 5760 and 5770 moves to 5780 and 5790. The dotted lines reflect potentialities of the simulated development of the antigen simulations.

Figure 58:
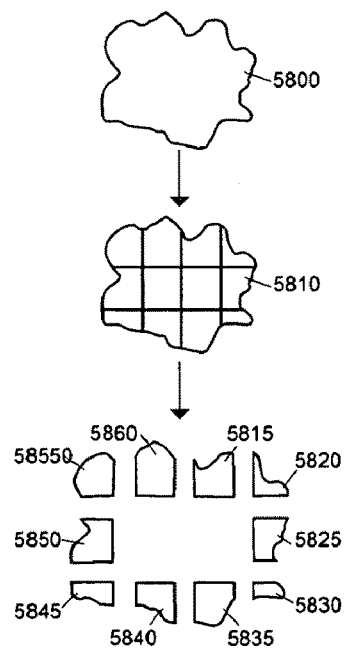
FIG. 58 is a schematic drawing showing the reverse engineering process of the system to create an artificial synthetic vaccine with of virus to activate AIS3 funct the solution (152). The antibodies interact with and track the antigens (A, B and C) (105, 110 and 115) as they co-evolve in their environment (100). The solution (at 152) corresponds to the last antigen phase (117).

FIG. 58 shows the reverse engineering process of the system to create an artificial synthetic vaccine of a virus to activate AIS3 functions. A virus (5800) is modeled to produce an analysis of its components (5810). These components are disassociated (5815-5860) in the third phase of the process. The separate parts of the virus are used to seed an artificial vaccine to customize a solution to the particular virus. The vaccine is used to inoculate the system at layer 1 by anticipating a known antigen, which, when encountered, is rapidly solved by accelerating the system's problem solving functions.

Figure 59:
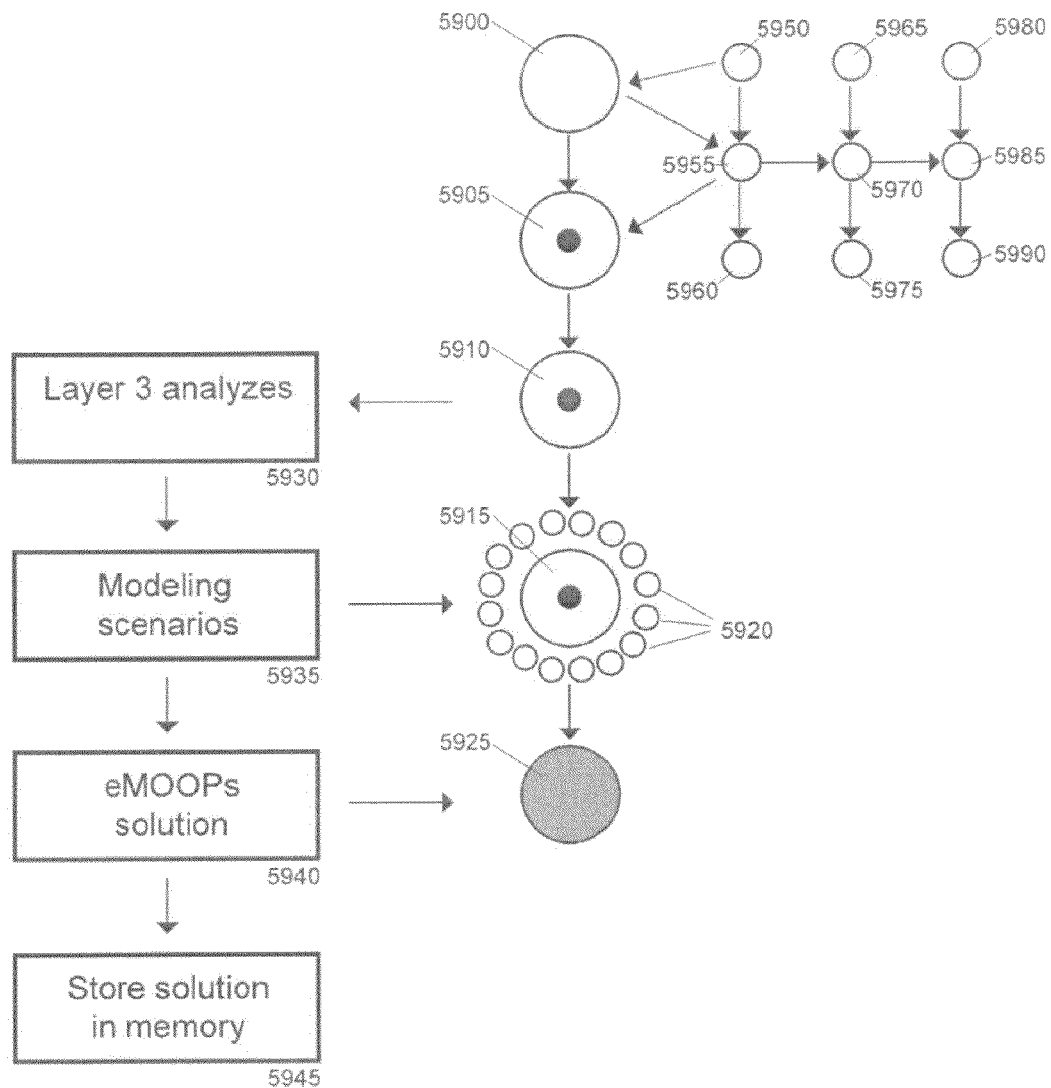

FIG. 59 shows the tagging of an antigen to attract an antibody collective. When an antigen (5900) is discovered by an antibody (5950), the antigen is tagged (5905) by an antibody (5955) and the tagged antigen attracts a collective of antibodies (5960-5990). The tagging of the antigen allows the system to track the antigen's evolutionary pathways. Antibodies are attracted to the tagged antigen (5910) at the next phase (5915 and 5920). Layer 3 analyzes the antigen (5930) and generates modeling scenarios (5935) using the tagged antigen and the antibody collective information. The eMOOPs solve (5940) the antigen problem (5925) and store the solution in memory (5945).

Figure 60:
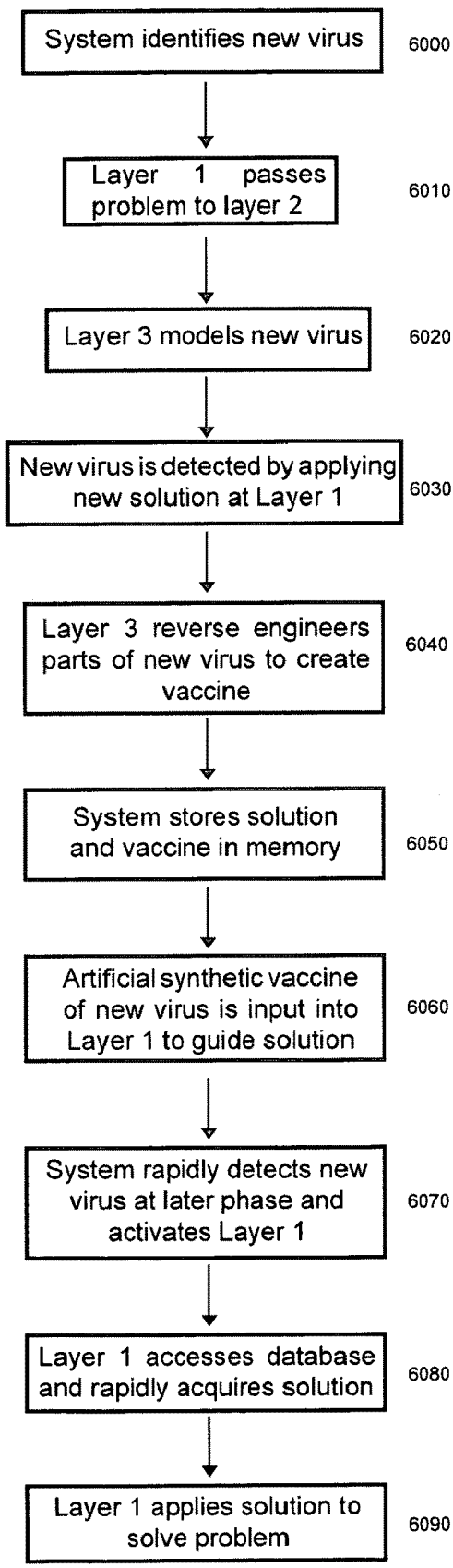

In FIG. 60, the process of using an artificial synthetic vaccine to solve problems of an artificial virus is described. After the system identifies a new virus (6000), layer 1 passes the problem to layer 2 (6010) and layer 3 models the new virus (6020). The new virus is defeated by applying a new solution at layer 1 (6030). Layer 3 reverse engineers parts of a new virus to create a vaccine (6040) and the system stores the solution and vaccine in memory (6050). The artificial synthetic vaccine of the new virus is input into layer 1 to guide a solution (6060) to the virus and when the system rapidly detects a new virus, it activates layer 1 (6070). Layer 1 accesses a database, rapidly acquires a solution (6080) and applies the solution to solve the problem (6090).

Figure 61:
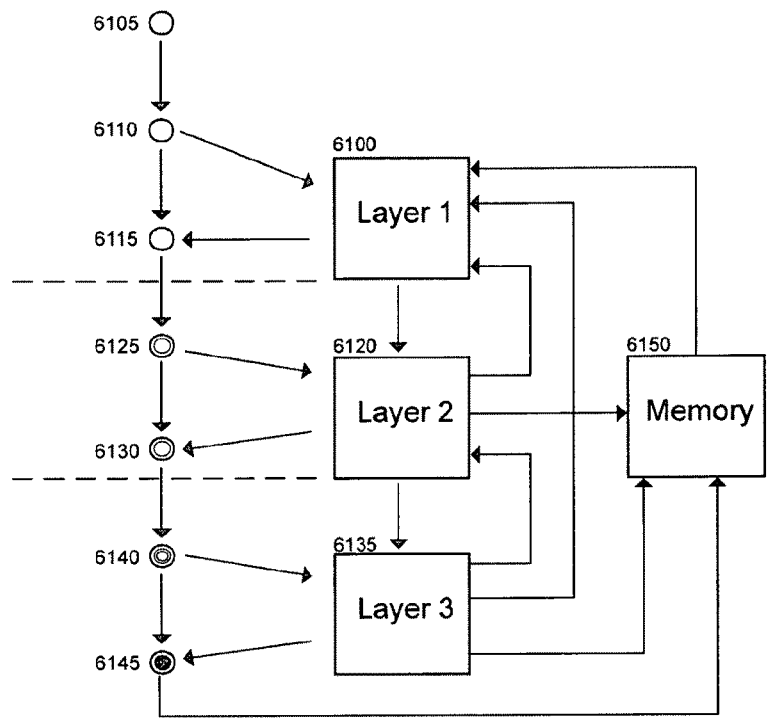

FIG. 61 shows the timing of each layer's training and the different thresholds of activation. In the first phase, the antigen (6105-6115) is encountered and assessed by layer 1 (6100). Once this process of analysis is performed by accessing the memory (6150) to compare the antigen to past problems and solutions, the decision is made to pass the problem to the second layer (6125 to 6130). The threshold of activation of layer 2 (6120) is set by the achievement of criteria in layer 1. Analysis of particularly complex antigens is also passed to layer 3 (6135) once their complexity satisfies a specific threshold (6140) to justify use of these modeling resources. Once the problem is solved (6145), the solution is entered into memory (6150). The escalation of functions efficiently conserves computational resources.

The central database model is important to immunocomputing systems because of the utility of passing information, particularly solutions to problems, from one layer to another, for rapid solution generation to later problems. Another main model used to show the use of memory storage is to implement the system by using a distributed database management system in a computer system.

The dbms may be either a central database or a distributed database. The AIS3 may use either model. In the case of the central database, the multiple layers of the AIS3 stores data from all layers to be used by all layers. In the case of the distributed database, however, each system layer uses its own memory. This approach has the advantage of rapid storage and access in a distributed network in which each layer is located in a separate domain.

A third model synthesizes the two memory models by combining a distributed memory approach with a central memory approach. In this case, while each layer has its own memory capability, the three layers share a central memory as well for inter-layer access; this model produces redundancies that back up data from problem solving functions in real time in both the distributed and central databases. Since the memory system is critical to the AIS3, and to metaheuristic systems in general because they provide systems for learning and adaptation, understanding the structure and function of these memory models are important. These models are discussed in the figures below.

Figure 62:
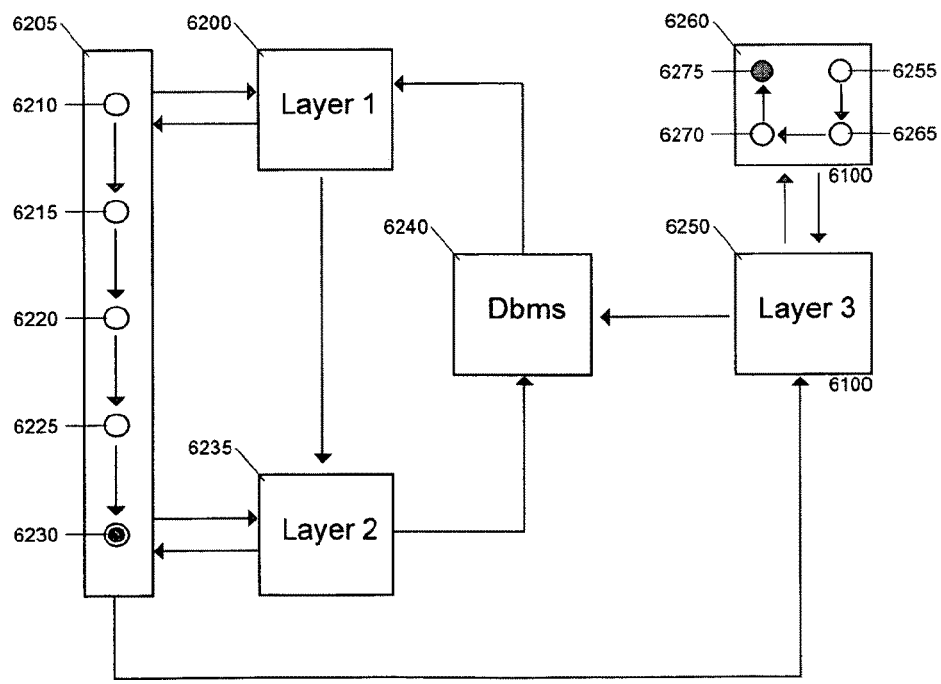

FIG. 62 shows the interaction process of the three layers of the AIS integrated with the central database management system. The antigen and the environment (6205) for the evolving antigen (6210-6230) are analyzed at layer 1 (6200) and, if necessary, at layer 2 (6235) and layer 3 (6250). Analyses and solutions from layers 2 and 3 are stored in the dbms (6240). The modeling process of layer 3 is shown at 6255-6275. Layer 1 accesses the central database as it discovers an antigen.

Figure 63:
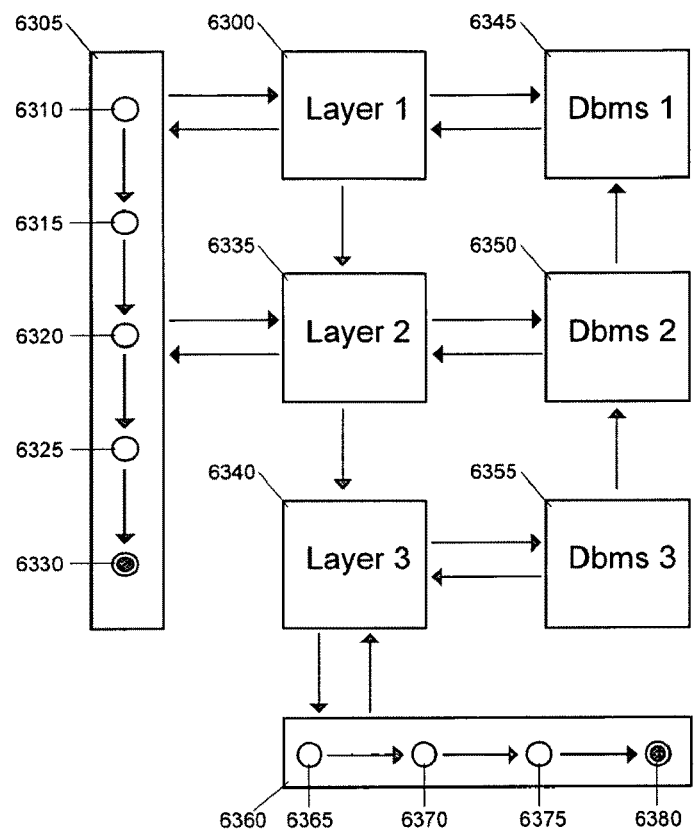

FIG. 63 shows the use of the distributed memory in the AIS3. The antigen and the environment (6305) for the evolving antigen (6310-6330) are analyzed at layer 1 (6300) and, if necessary, at layer 2 (6335) and layer 3 (6340). Layer 1 accesses dbms 1 (6345), which is informed, in this distributed model, by information from dbms 2 (6350). Layer 2 is informed by dbms 2, and receives information from dbms 3 (6355). Layer 3 (6340) stores data in and accesses dbms 3 (6355) while producing antigen models (6365-6380), including models of a "potential" environment. The three layers' databases work together in an integrated way to successively store and access data at critical thresholds of the problem solving process.

Figure 64:
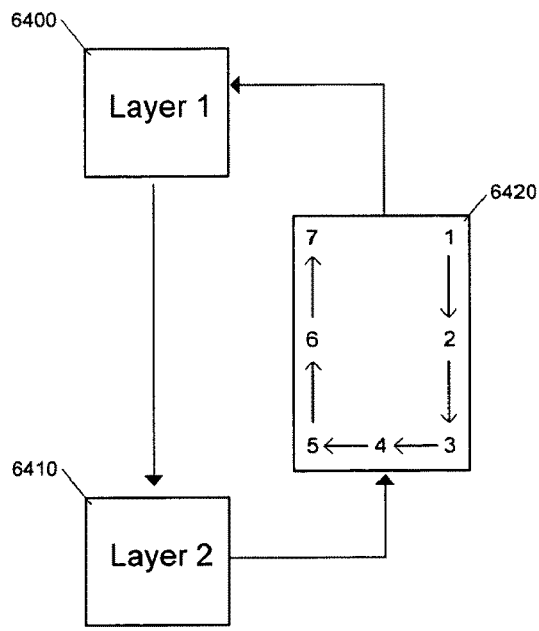

FIG. 64 shows the process of accessing the most recent information from memory. Layer 2 (6410) stores problem solving information in the database (6420), which is accessed by layer 1 (6400). The numbering sequence at 6420 shows that the most recent information is accessed first in memory. Lower priority information is provided a continuously lower position in the dbms.

Figure 65:
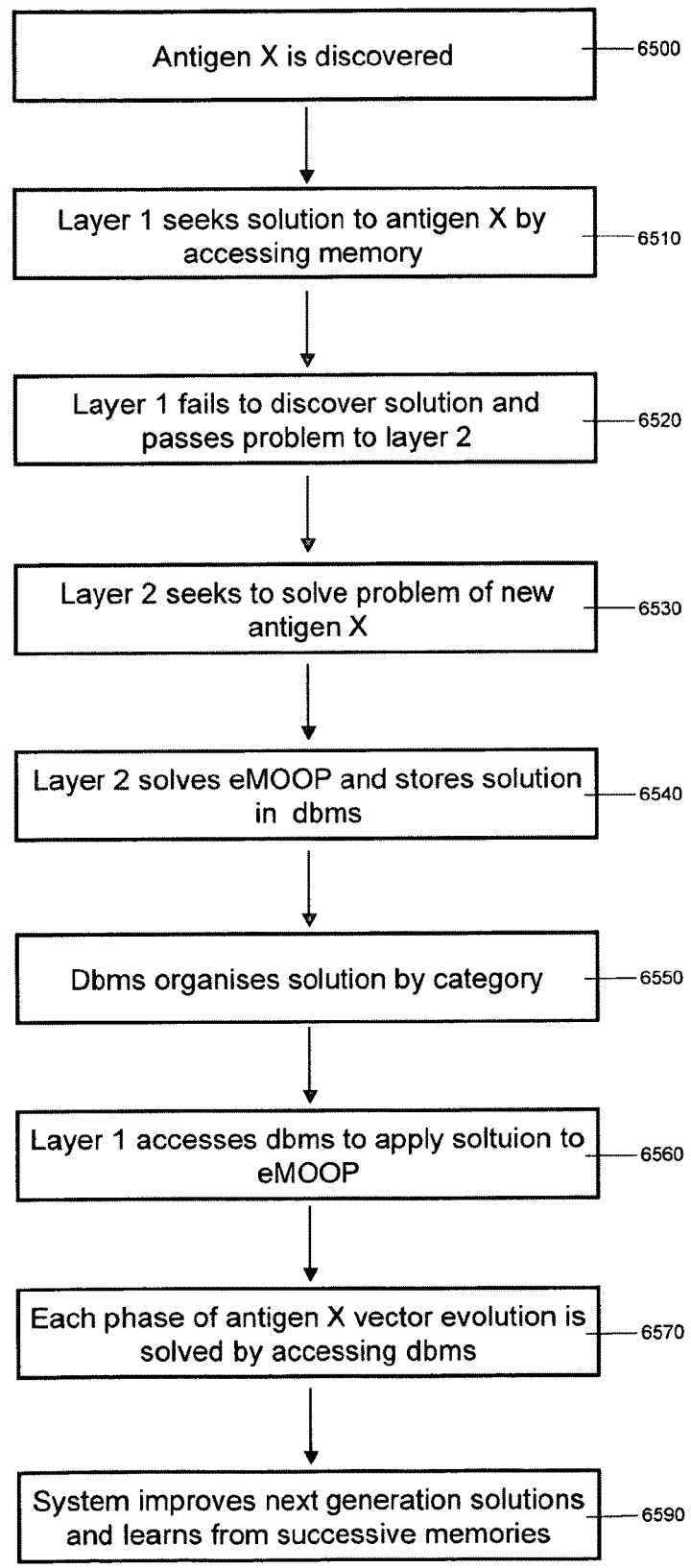

FIG. 65 shows the process of solving a problem of an evolving antigen at layers 1 and 2 using the memory system. After antigen X is discovered (6500) by the system, layer 1 seeks a solution to antigen X by accessing memory in database (6510). Layer 1 fails to discover a solution and passes the problem to layer 2 (6520). Layer 2 then seeks to solve the problem of the new antigen X (6530), solves the eMOOP and stores the solution in the dbms (6540). The dbms organizes solutions by category (6550) for rapid access. Layer 1 then accesses the dbms to seek and apply a solution to an eMOOP (6560). At each phase of antigen X, the vector evolution is solved by accessing the database (6570). The system improves next generation solutions and learns from successive memory sharing processes (6580).

Figure 66:
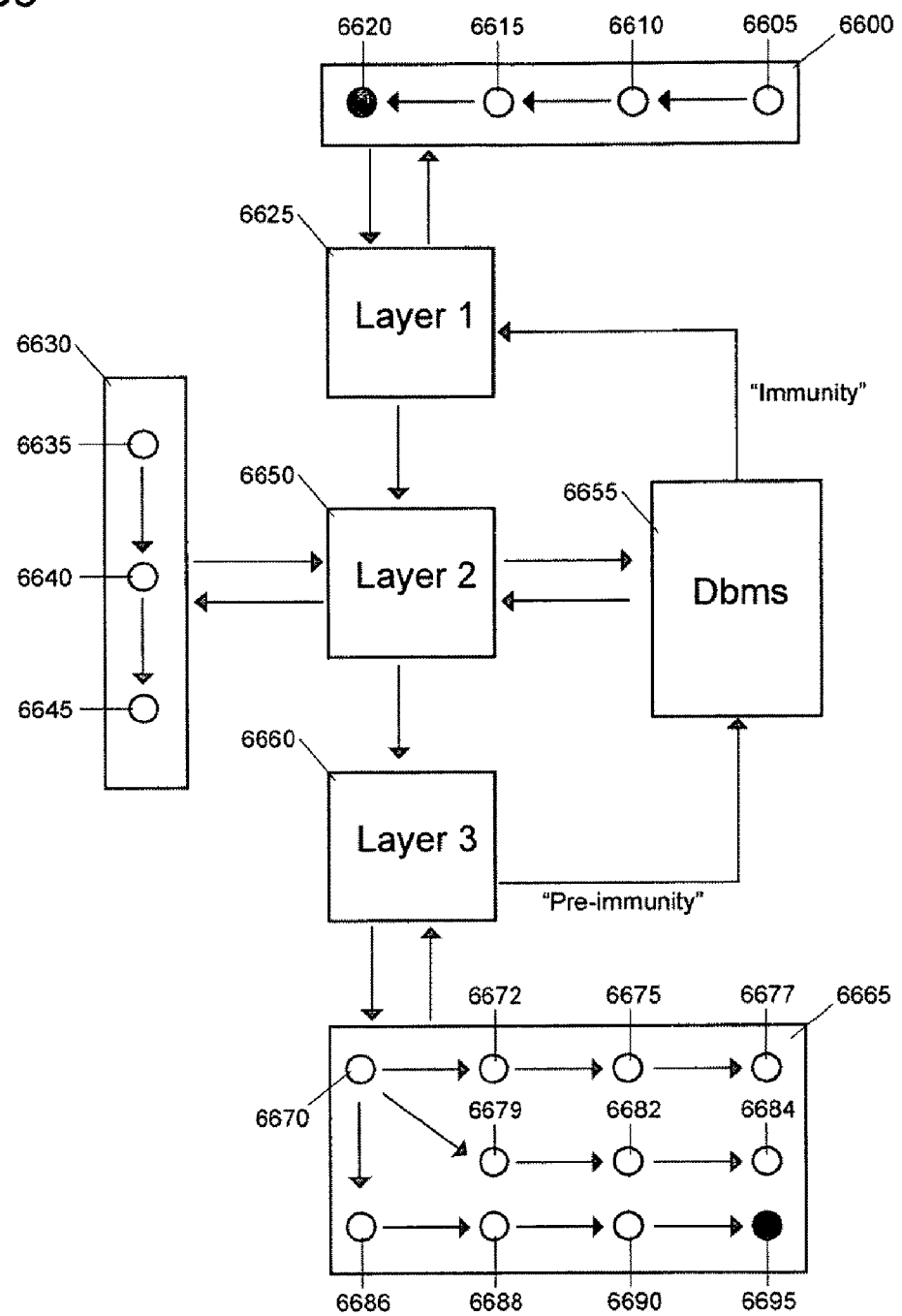

FIG. 66 illustrates how solution candidates are generated at layer 3, tested at layer 2 and applied at layer 2 of the AIS3. Layer 1 (6625) accesses an evolving antigen (6605-6620) in an artificial antigen environment (6600) and receives information from a dbms (6655) from prior stored solutions. The problem is passed on to layer 2, which seeks to experiment with the evolving antigen (6635-6645) in an evolving environment (6630). To analyze the antigen, layer 2 passes the problem to layer 3 (6660), which models multiple scenarios of the antigen as well as potential antigens (6670-6695). When solution candidates are generated at layer 3, they are stored in the dbms as "pre-immunity" and passed on to layer 2 for testing and experimentation and development of a solution. Layer 2 passes the solution to the dbms, which is accessed as "imnimunity" by layer 1 when the antigen is later discovered.

Figure 67:
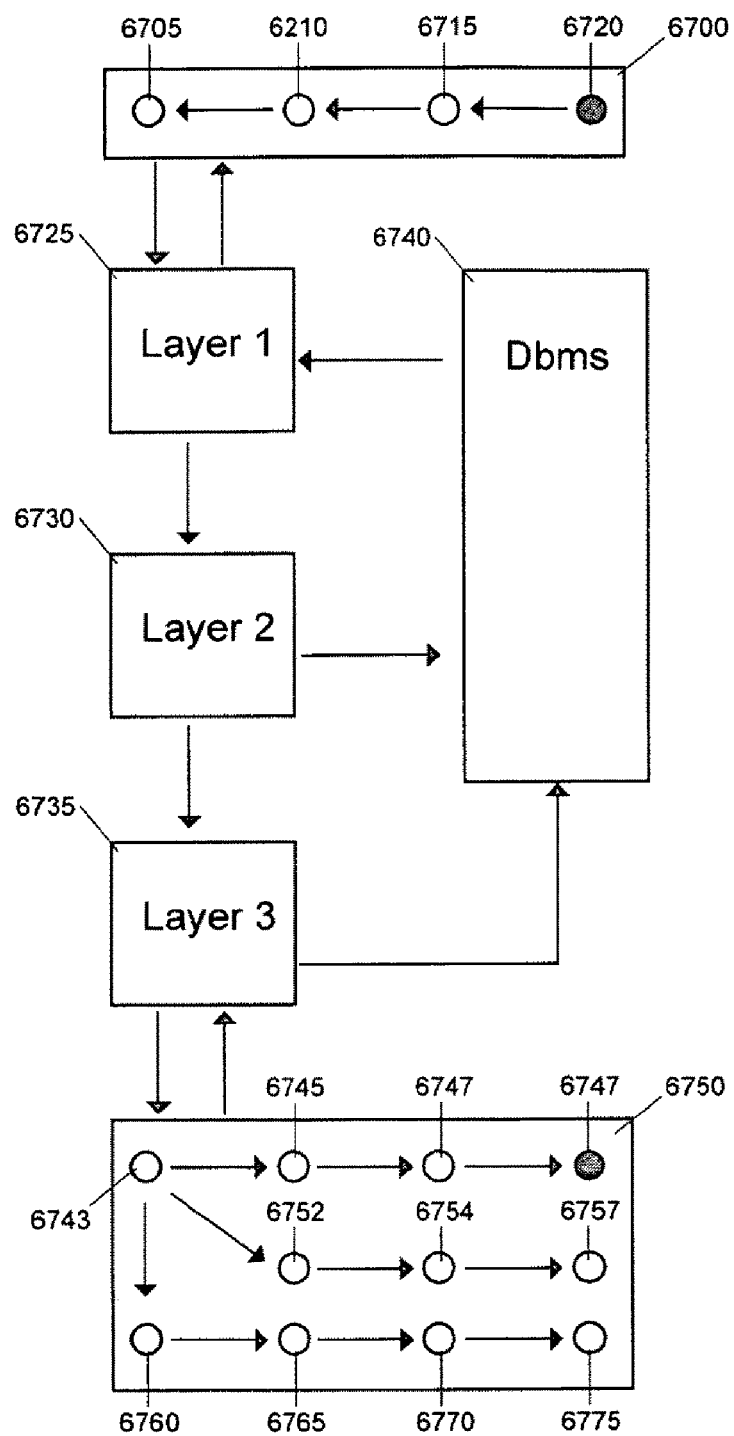

FIG. 67 shows the application of solutions generated at layers 2 and 3 and the training process that builds immunity. Potential solutions are modeled at layer 3 by generating scenarios of potential antigens (6743-6750). A promising solution candidate (6747) is tested and stored in the dbms and tested at layer 1 (6725). The solution candidate is applied to the existing antigen at 6720 and the eMOOP is solved.

Figure 68:
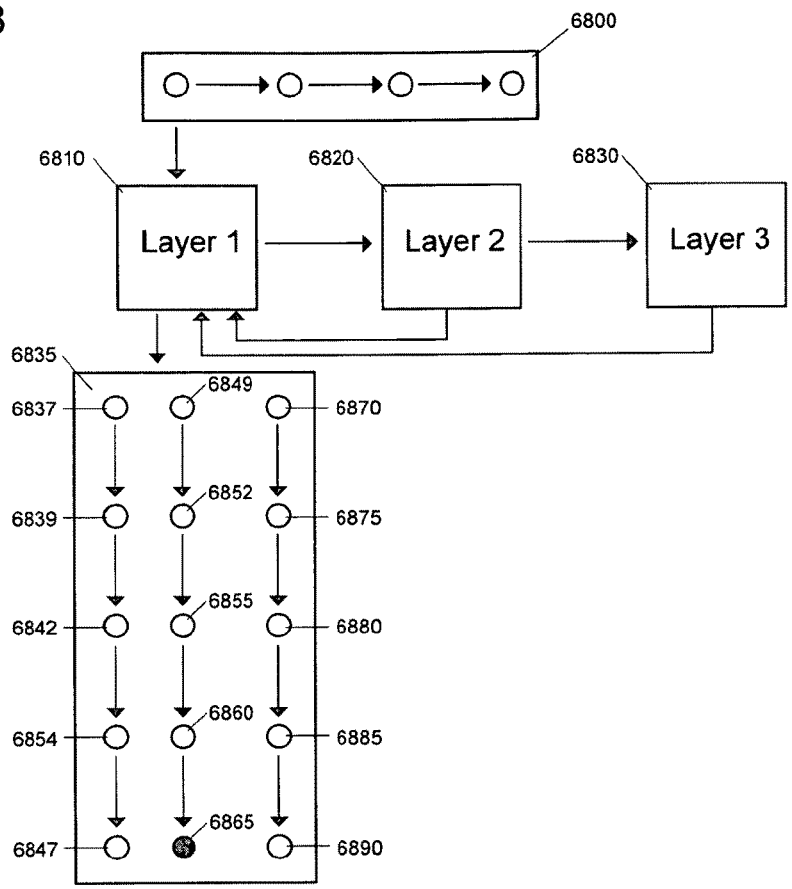

FIG. 68 shows the pre-set triggers at specific thresholds of the three layers that activate the cascade process at layer 1. The process is activated when the system encounters an evolving antigen (6800) at layer 1 (6810). Layer 1 proceeds to analyze the antigen by collecting information from past problem-solving experiences at the database. This process is depicted in 6835 as the multiple antigen analyses proceed at 6837-6847, 6849-6865 and 6870-6890. If the problem is solved, for example at 6865, then the system applies the solution and the system returns to equilibrium. However, layer 2 is activated if an adequate solution is not presented in a specified time. This process of moving to a new level of problem analysis and solution generation involves a pre-set trigger that is activated when specific conditions indicate that layer 1 is insufficient to solve the problem with existing resources. This triggering mechanism, such as use of preset criteria that identifies an aggressive antigen, stimulates a cascade process of activating layer 2. Layer 3 is also activated by layer 2 in order to assist in simultaneously modeling the problem and potential problems and generating solution candidates.

Figure 69:
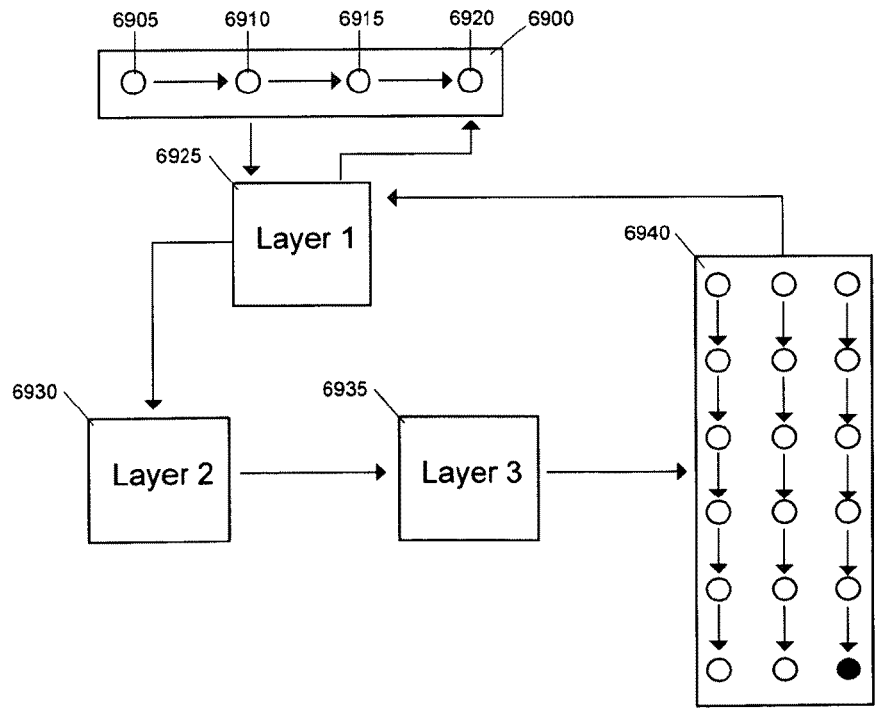

FIG. 69 shows the process in which layer 3 develops a multi-scenario model with specification of conditions to trigger the cascade process of layer 1, including the possible variables that fit the profile of a hostile new antigen. The antigen modeling at 6940 in layer 3 (6935) identifies the conditions to activate the cascade process of layer 1 when, and only when, a specific antigen (6905-6920) is encountered. The solution to the antigen is applied at layer 1.

Figure 70:
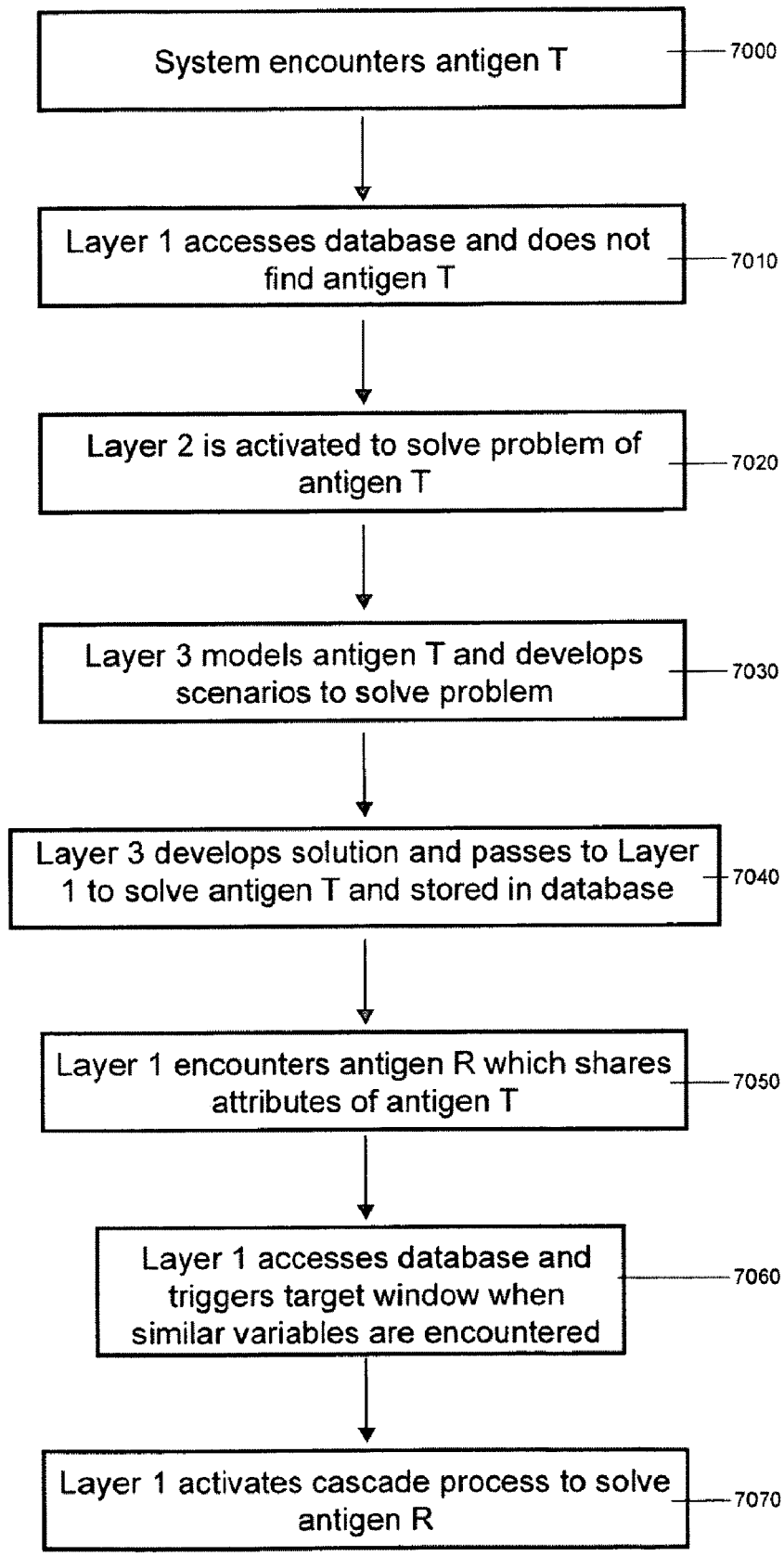
Figure 71:
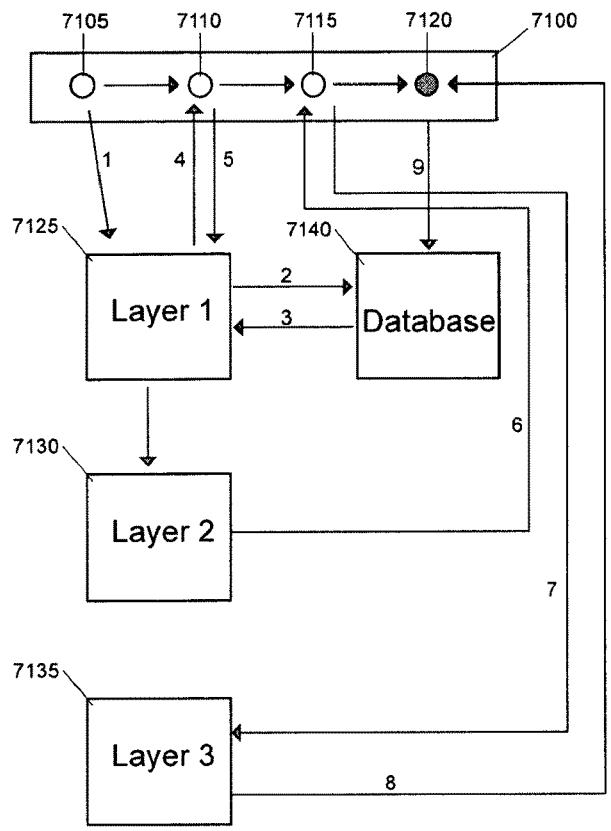
Figure 72:
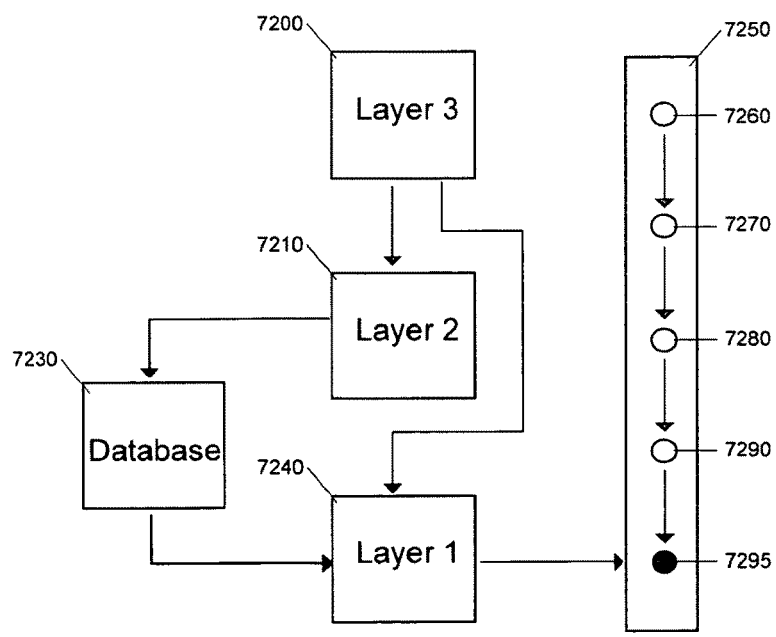
Figure 73:
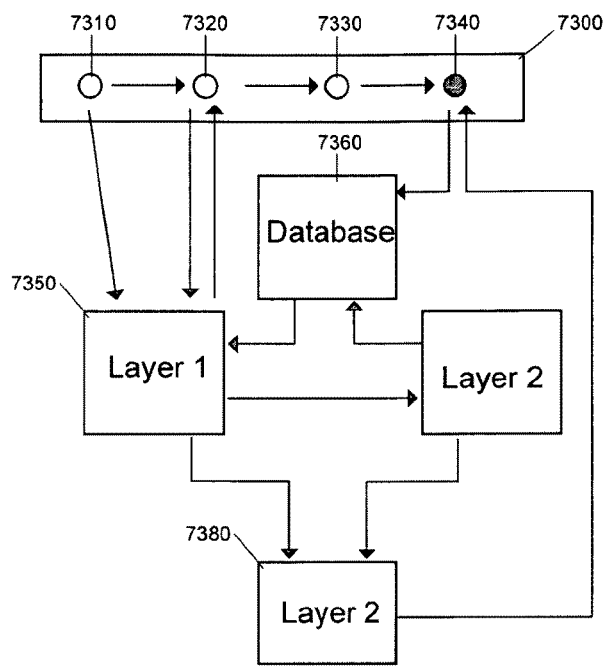
Figure 74:
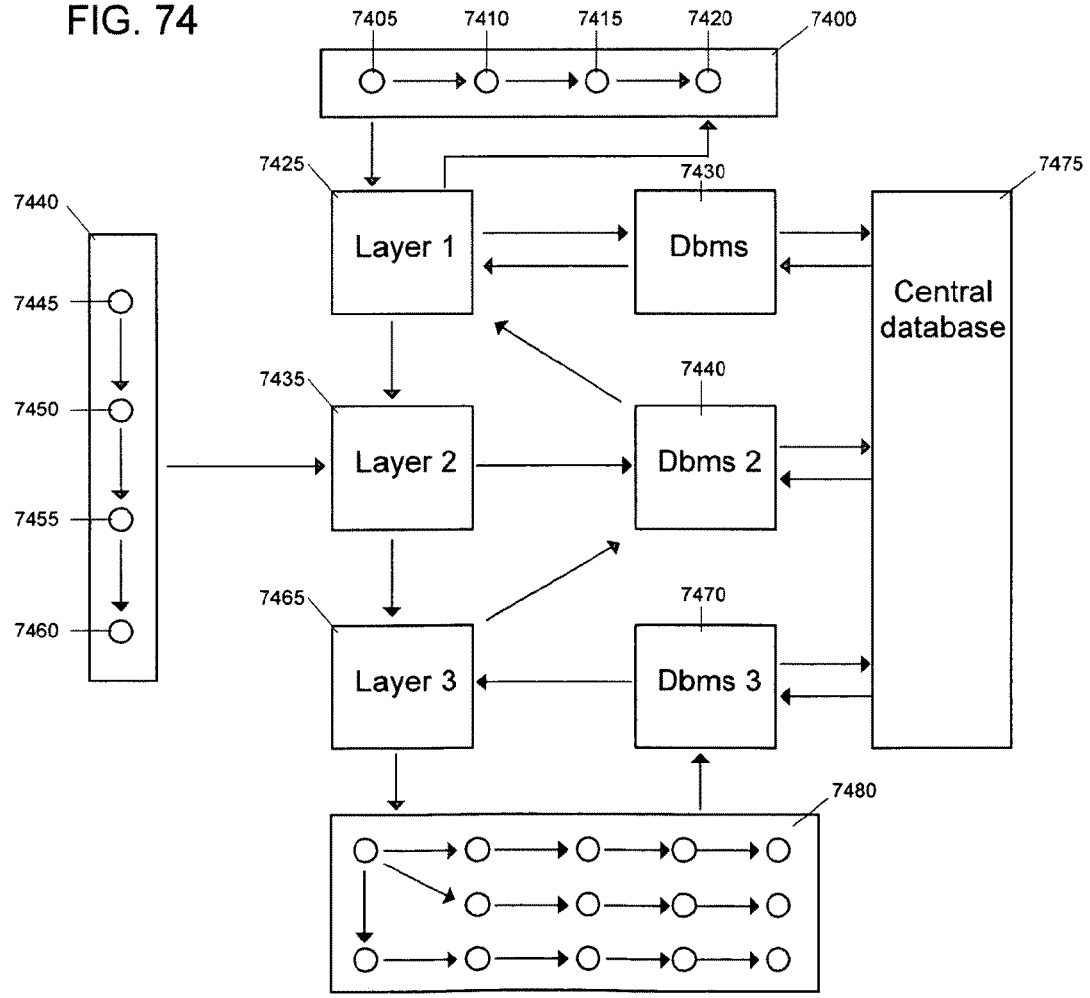
Figure 75:
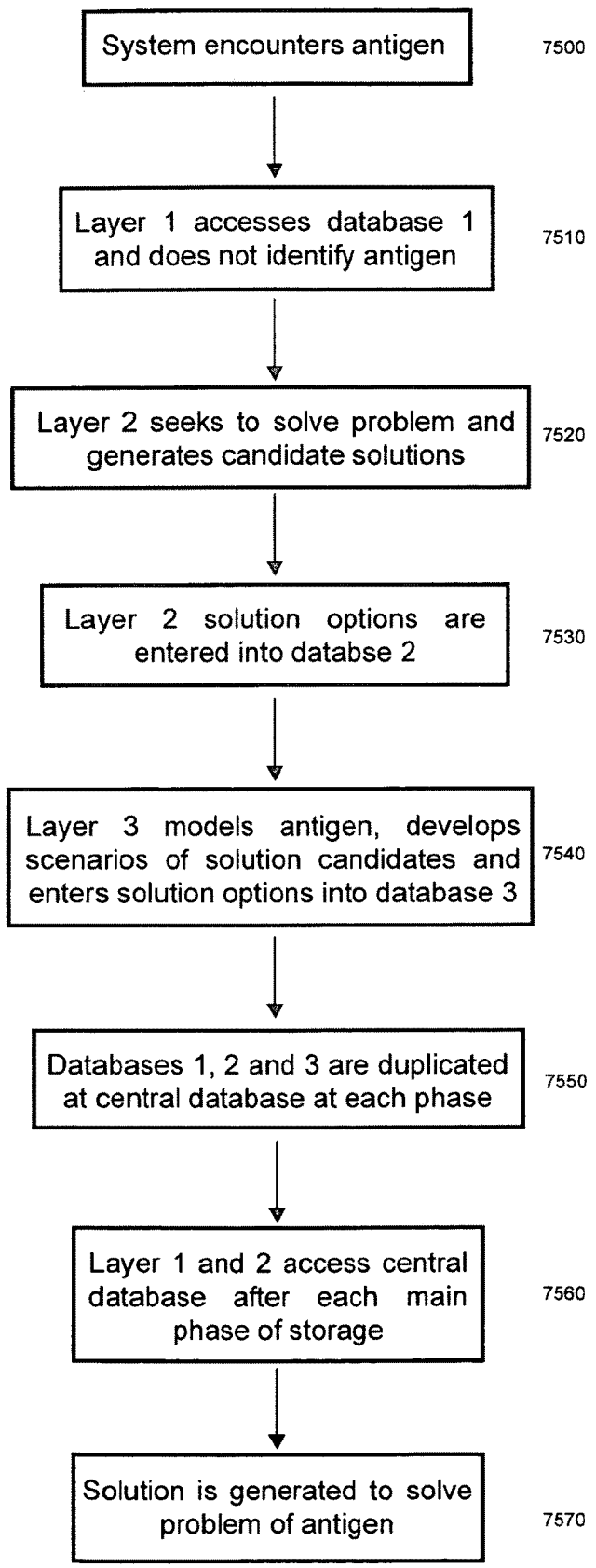
Figure 76:
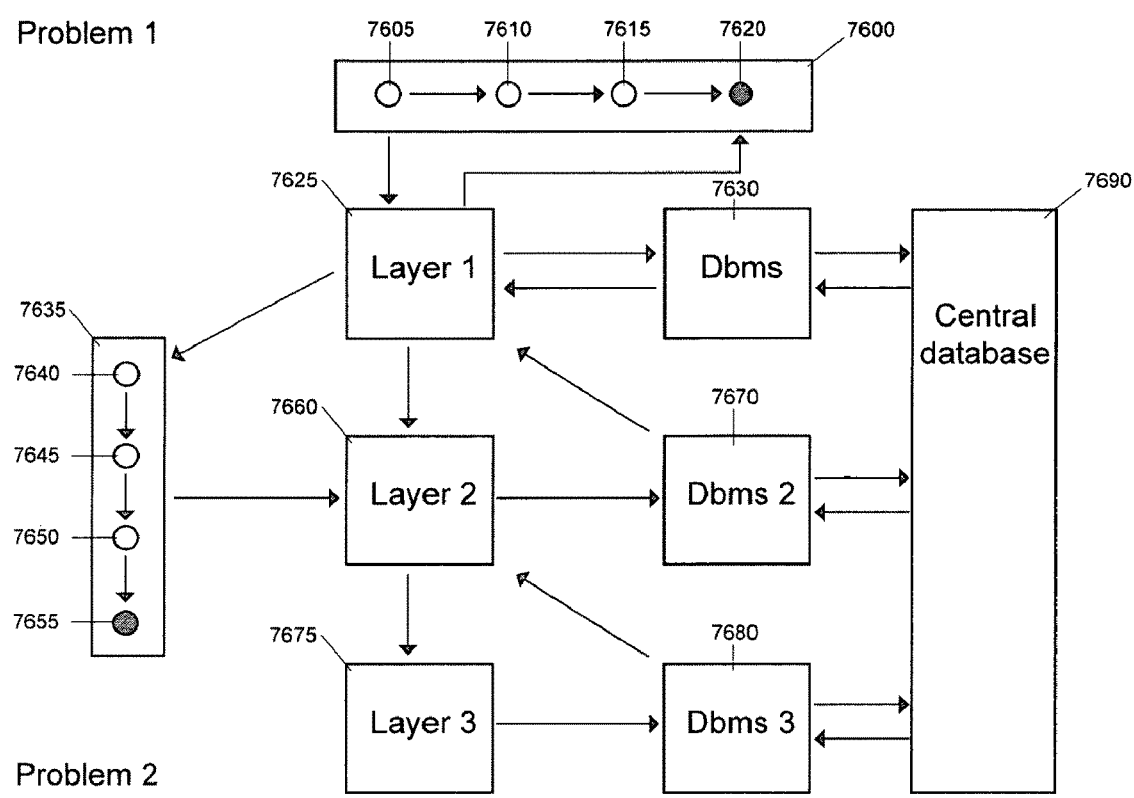
Figure 77:
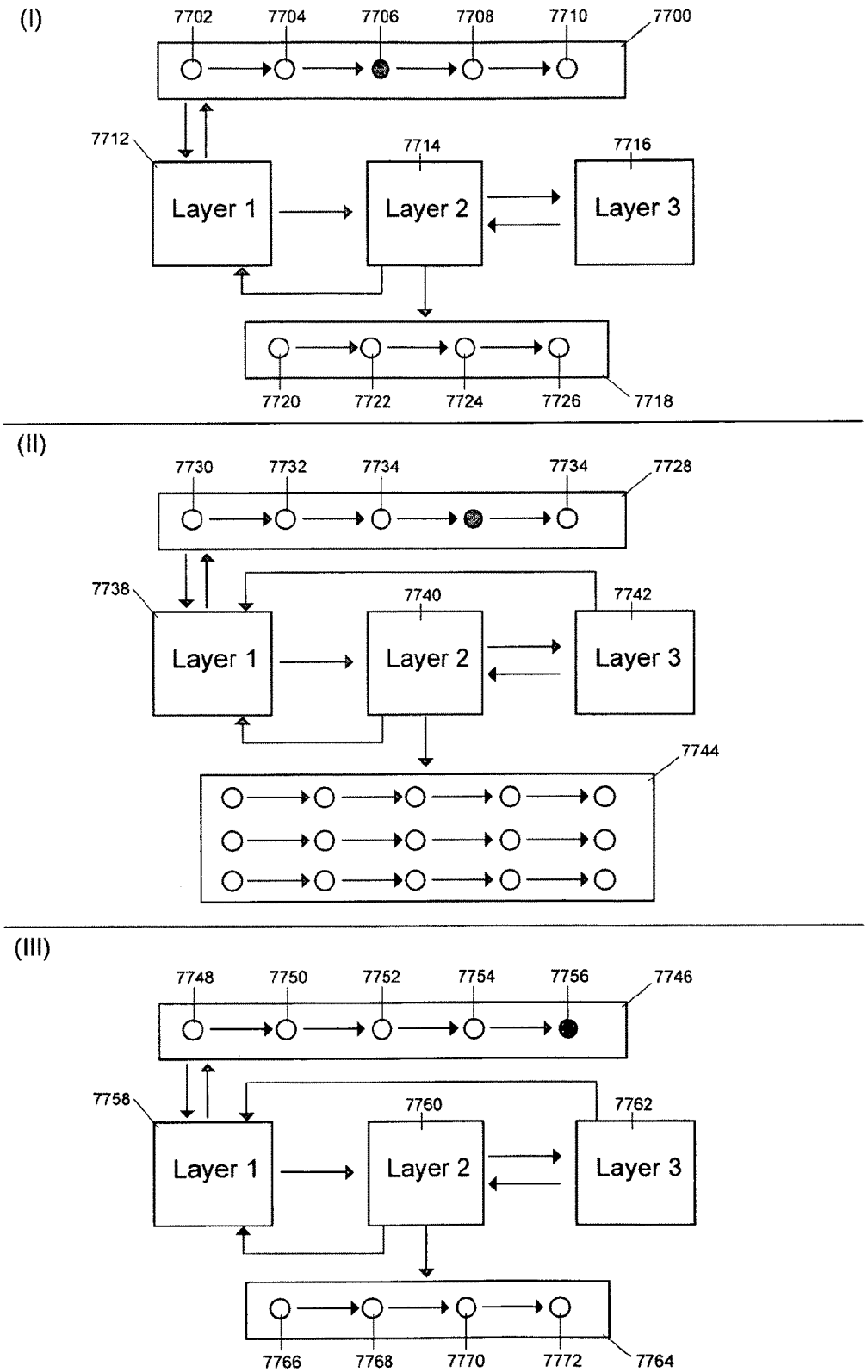

FIG. 70 describes the process of solving an optimization problem using the three layers of the AIS3. Once the system encounters antigen T (7000), layer 1 accesses a database and does not find antigen T (7010). Layer 2 is activated to solve the problem of antigen T (7020) and, further, layer 3 models antigen T and develops scenarios to solve the problem (7030). Layer 3 develops a solution and passes the solution to layer 1 to solve antigen T, which is stored in a database (7040). Layer 1 encounters antigen R which shares attributes of antigen T (7050) and layer 1 accesses the database and triggers the target window in which similar variables are present (7060). Layer 1 then activates the cascade process to solve antigen R (7070).

FIG. 71 shows the bucket brigade sequence process of passing information between the layers of the AIS3 to solve an optimization problem. After an antigen (7105) is encountered at phase 1, layer 2 (7125) accesses a database (7140) to obtain information on past antigen identification and solutions. Layer 1 interacts with the second phase of the development of the antigen (7710) by testing a solution and the information it obtains from this phase of the antigen is provided as feedback to layer 1. If the problem is not solved, the system moves to activate layer 2 (7130) at the third phase in the development of the antigen (7115). Information from this phase of the development of the antigen is fed to layer 3 (7135) which then models the antigen and solves the problem at 7120. The solution is then stored in the dbms.

In FIG. 72, the process of stimulating layers 1 and 2 from layer 3 to perform specific functions is shown. In a later phase of problem solving, the modeling and analytical functions at layer 3 (7200) provide solutions to be applied at layer 2 (7210) and to layer 1 (7240). The solution candidates generated from the models at layer 3 are implemented into solutions at layer 2 and stored in the database (7230). Layer 1 accesses the database to apply solutions to active evolving antigens (7260-7295) in an artificial environment (7250).

FIG. 73 shows how data from layers 1 and 2 are input into layer 3. After layer 1 (7350) encounters an antigen (7300) at phase one, it interacts with applying solutions at the antigen's second phase (7320) by accessing the database (7360). If layer 1 cannot solve the problem, information about the problem is transmitted to layers 2 (7370) and 3 (7380). Layer 2 seeks to solve the problem and enters the solution candidates into the database for access to layer 1 interactions with the antigen. Layer 3 models the problem and presents solution candidates that are provided to solve the problem (7340), which are stored in the database for future reference.

FIG. 74 shows the process of employing both central memory and distributed memory in the AIS3. An evolving antigen (7405-7420) is encountered by layer 1 (7425), which accesses dbms 1 (7430) to seek to solve the problem. If the problem is not solved in layer 1, the system moves to solve the problem at layer 2 (7435), which analyzes the problem and stores information in dbms 2 (7440). Dbms 2 provides information to layer 1 about customized solution candidates to specific new antigens. Layer 2 analyzes the problem and generates solution candidates (7445-7460). Layer 2 further transfers the problem to layer 3 (7465). Layer 3 models various real and artificial synthetic antigen problems and solution options (7480), which are entered into dbms 3 (7470). Layer 3 accesses dbms 3 to model solutions and provides these solution candidates to dbms 2, which is later accessed by layer 1 for solution application and experimentation with the antigens. Dbms 1, dbms 2 and dbms 3 each store data in the central database. Information from the central database is also accessed by the three distributed databases. Information from the three distributed databases is stored in the central dbms at regular intervals.

In FIG. 75, the process is shown of the interaction of the three layers as they store and access data into databases in the AIS3. Once the system encounters an antigen (7500), layer 1 accesses dbms 1 and does not identify the antigen (7510). Layer 2 seeks to solve the problem and generates candidate solutions (7520) and solution options are entered into dbms 2 (7530). Layer 3 then models the antigen, develops scenarios of solution candidates and enters solution options into dbms 3 (7540). Databases 1, 2 and 3 are duplicated at the central database at each phase. Layers 1 and 2 access the central database after each main phase of storage (7560). Finally, a solution is generated to solve the antigen (7570) and the solution is stored in the central database. In effect, the three distributed databases provide near-term storage to provide heuristic problem solving memory capability as each layer of the system generates analyses and solution candidates to complex eMOOPs.

FIG. 76 shows the parallel operations of layers 1 and 2 and layers 2 and 3 to solve two separate problems simultaneously. Layer 1 (7625) interacts with an artificial environment (7600) and encounters the evolving antigen (7605-7620). This first problem is analyzed by layer 1, which accesses dbms 1 (7630) and dbms 2 (7670), and passes the problem to layer 2 (7660). A second problem is encountered at 7640-7655, which is analyzed at layer 2. If one of the problems is not novel, it is easily solved by layer 1 after layer 1 accesses dbms 1 for solutions to old problems. If one or both problems are novel, however, then layer 2 analyzes both problems simultaneously. Layer 2 passes the problems to layer 3 (7675) which simultaneously analyzes both problems and generates solutions for both problems, which are then forwarded to dbms 3 (7680) (which is further forwarded to the central dbms (7690) at regular intervals) and accessed by layer 2. The solution candidates to both problems are applied by layer 1 until they are solved (7620 and 7655). Though this description illustrates the use of the AIS3 to solve two problems simultaneously, the system may be used to solve many problems simultaneously contingent on computer resources. The system will solve the problems in the order of priority and will therefore be in different stages of problem solving of multiple problems at different times.

FIG. 77 shows the multi-phasal parametric adaptation of the AIS3 in which the swelling size of the system configuration at phase two returns to equilibrium at phase three. At the first phase, the system is in equilibrium as it solves an eMOOP. However, at phase two, the system generates multiple solution options as it models eMOOPs. In this phase, it expands the resource capacity of all the layers functions to interoperate in order to solve the problems. At phase three, the system returns to an equilibrium state. This plasticity behavior of the parametric adaptation of the three layers is contingent on the number and complexity of the problems introduced to the system. If the problems continue to grow, the system will adjust to a new equilibrium within phase two and not return to a stable equilibrium.

Figure 78:
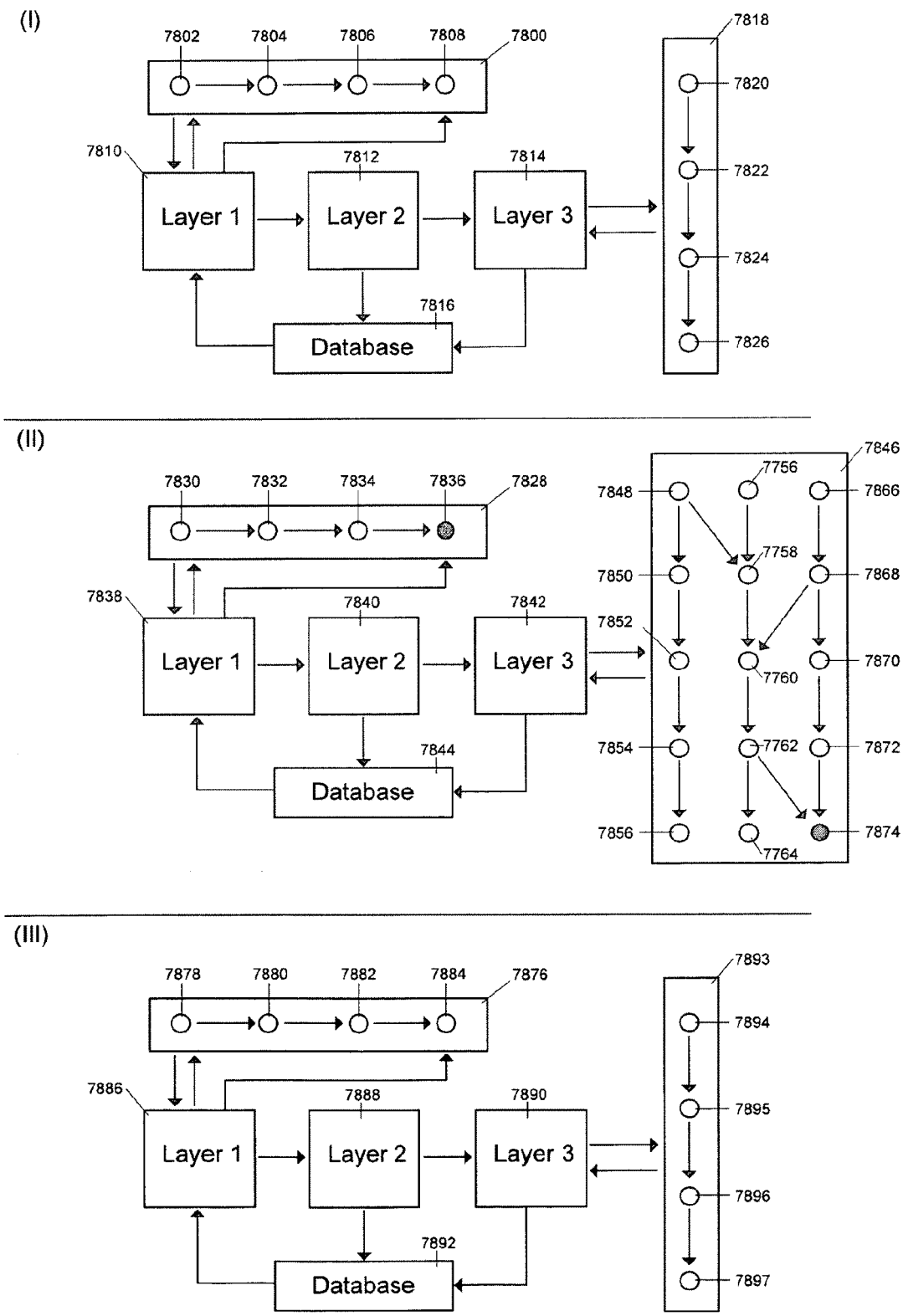

In FIG. 78, the three phases of co-evolutionary plasticity at layer 3, in which growth and decline of activity returns to equilibrium, is illustrated. In phase I, the system is in relative equilibrium as it solves known problems by applying immunity. However, at phase II, the system encounters a novel antigen which requires the modeling analyses of layer 3. As layer 3 expands its computational resource capacity to solve these problems, which are passed to layer 1 for application, the system substantially increases computational demands. As the new problem is solved, the computational resources used at layer 3 are substantially diminished in phase III. In this figure, layer 3 is the location for concentrated activity.

Figure 79:
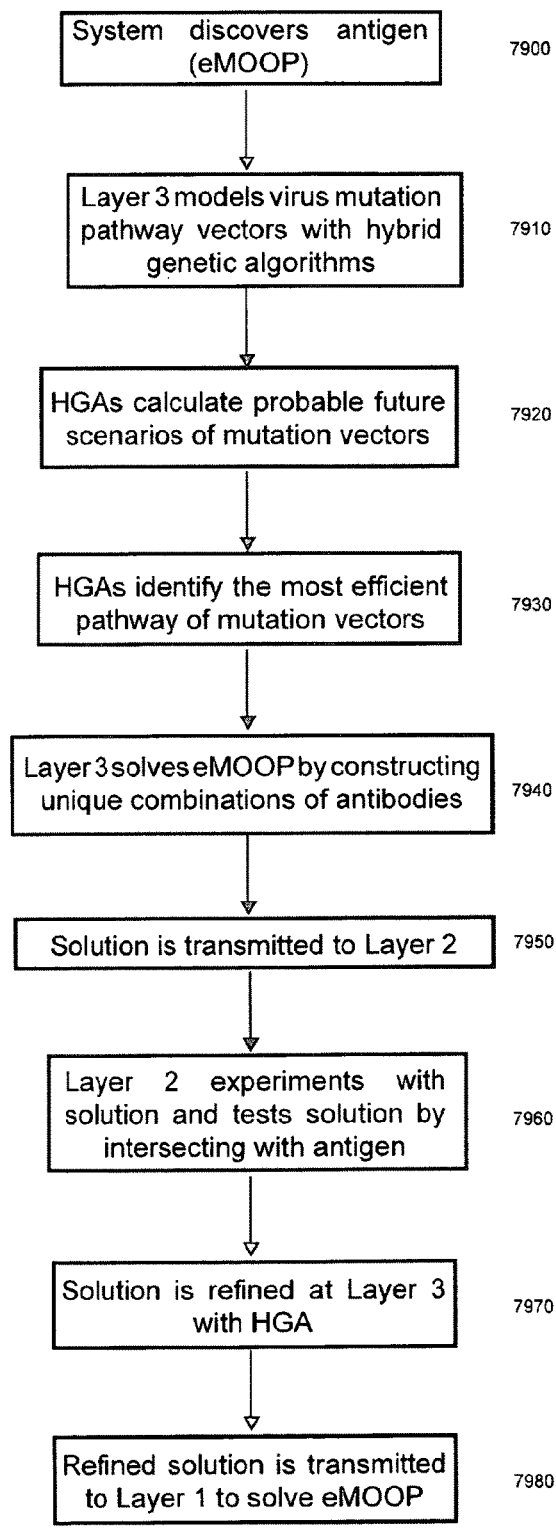
Figure 80:
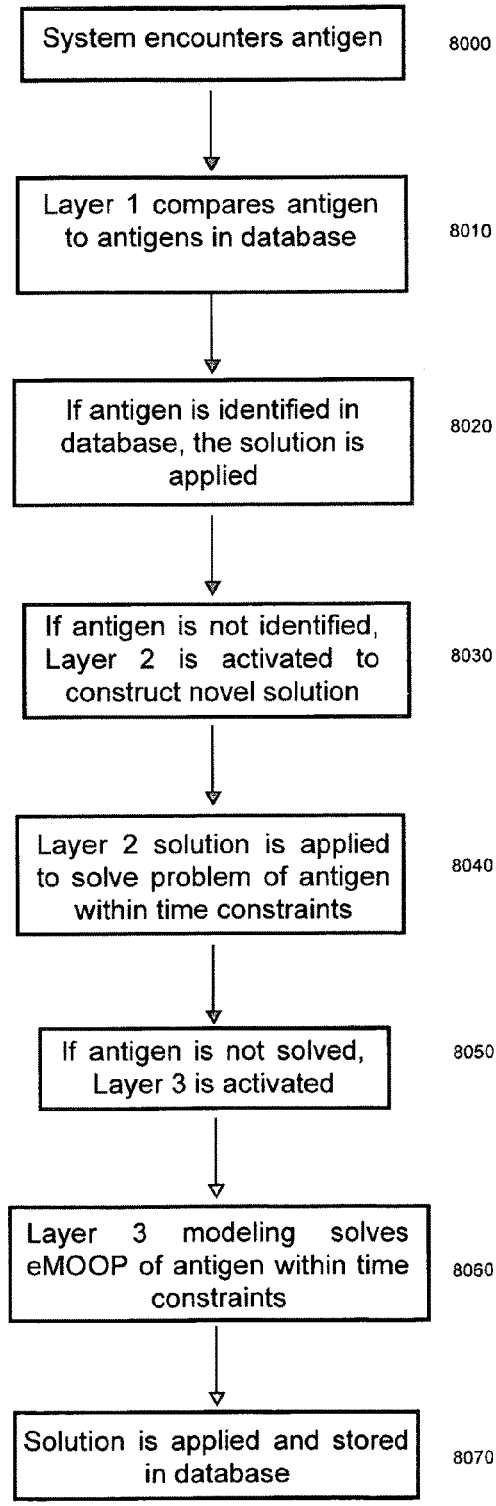
Figure 81:
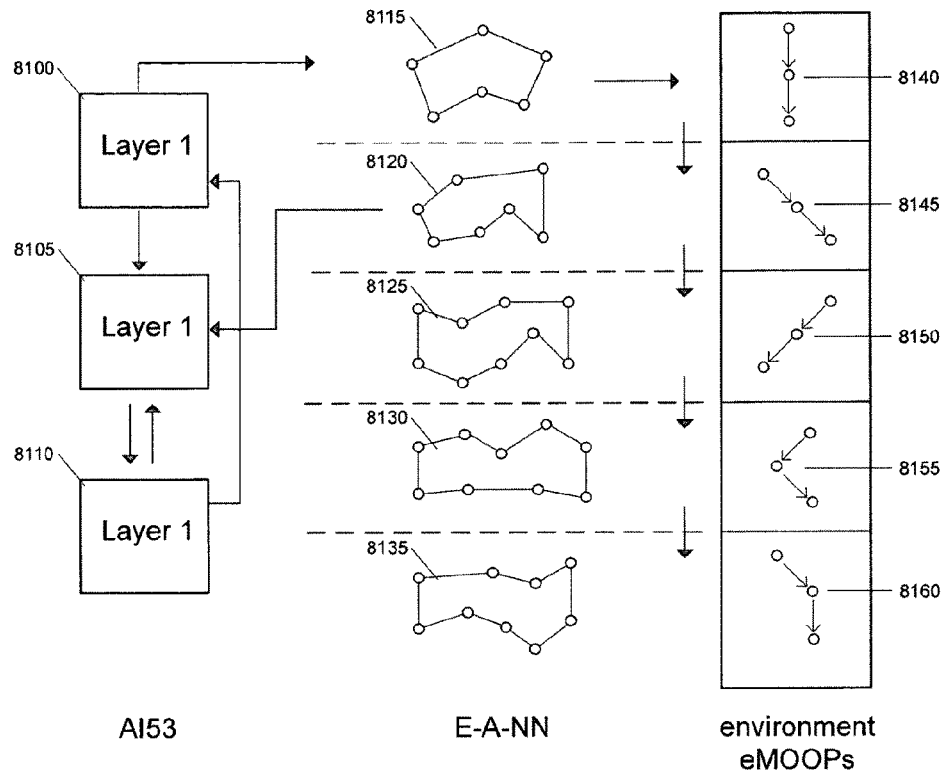
Figure 82:
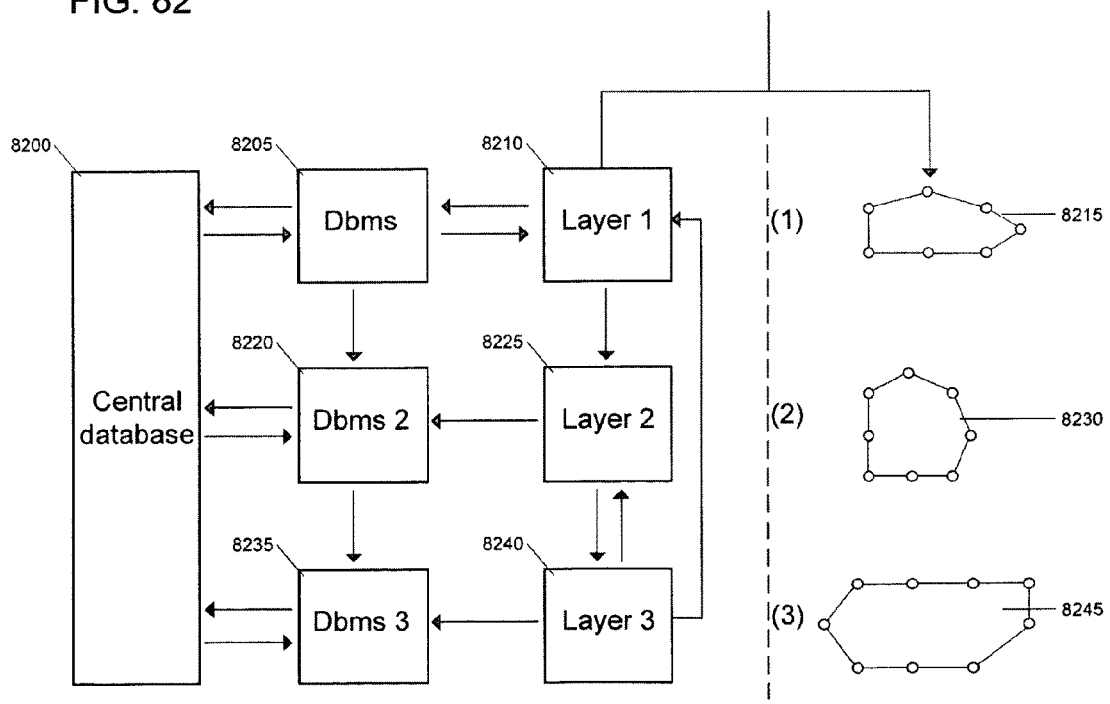
Figure 83:
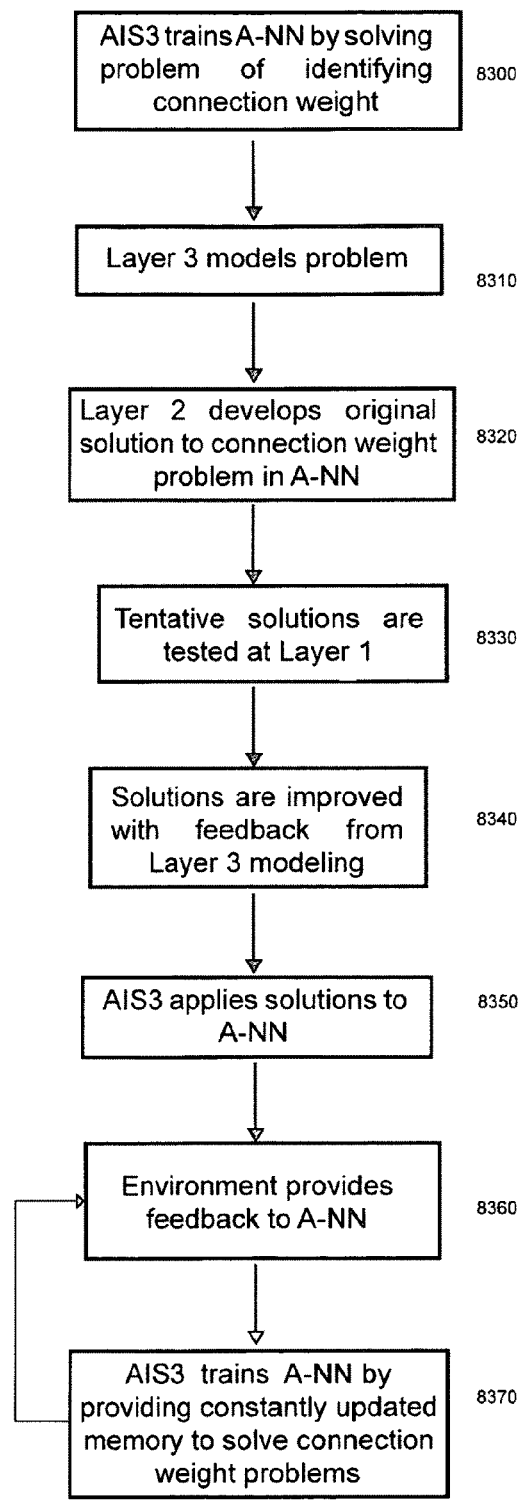
Figure 84:
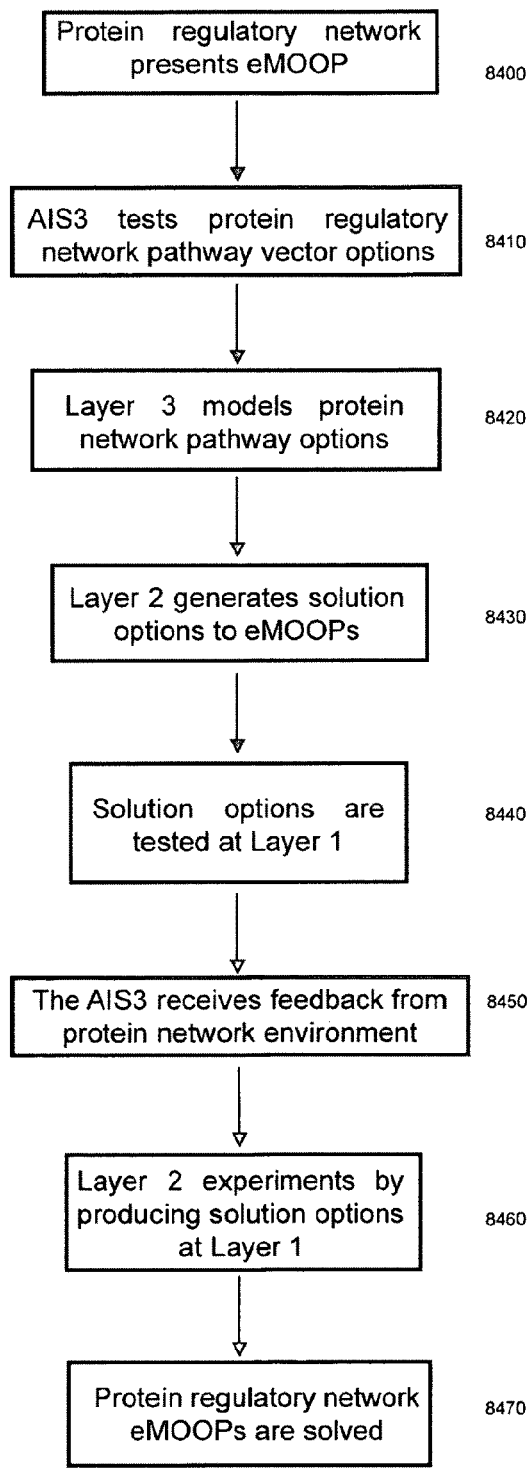
Figure 85:
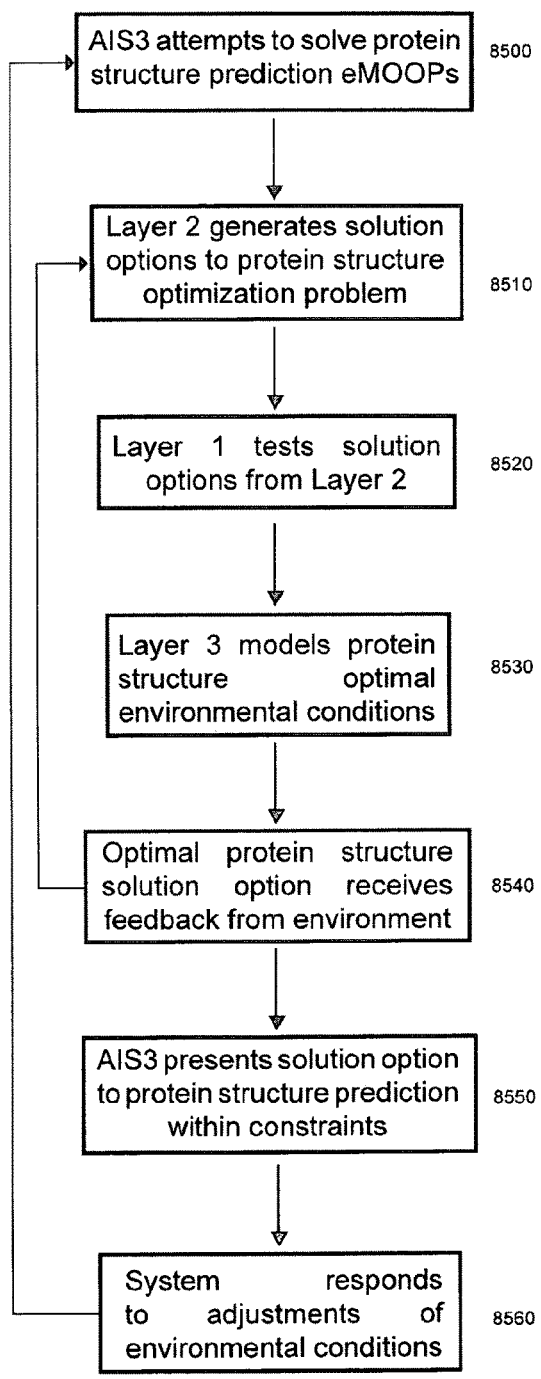
Figure 86:
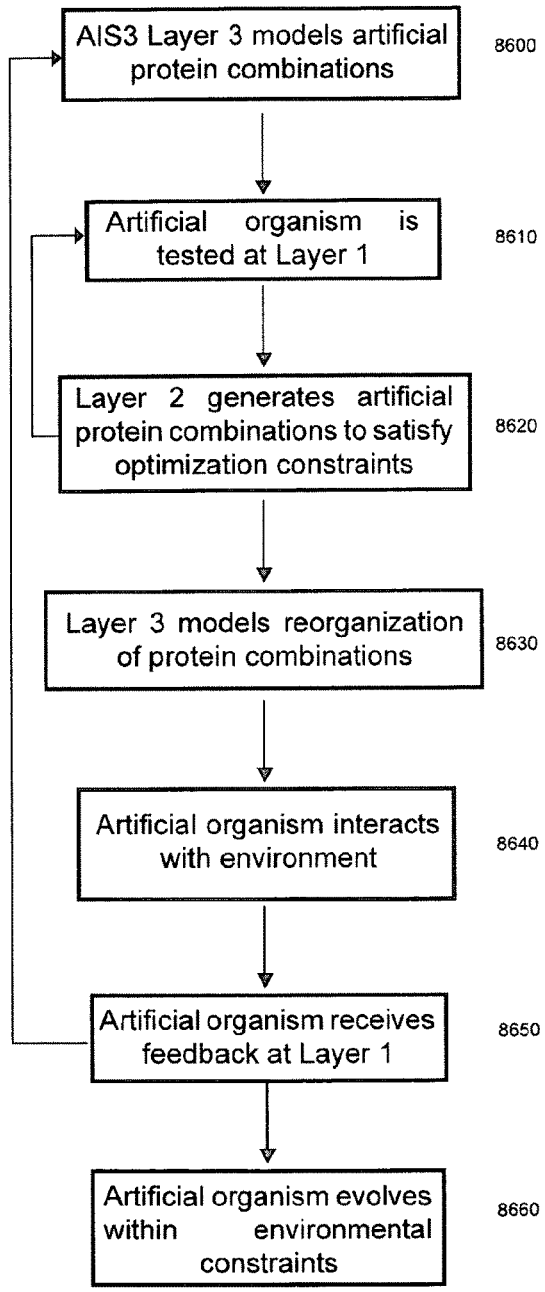

FIG. 79 shows the process of using hybrid genetic algorithms to solve problems in the AIS3. After the system discovers an antigen (7900), layer 3 models the virus mutation pathway vectors with hybrid genetic algorithms (HGAs) (7910). HGAs calculate probable future scenarios of mutation vectors (7920) and identify the most efficient pathway of mutation vectors (7930). Layer 3 solves the eMOOP by constructing unique combinations of antibodies (7940) and the solution is transmitted to layer 2 (7950). Layer 2 experiments with the solution candidate and tests the solution by interacting with the antigen (7960). The solution is refined at layer 3 with HGA (7970) and the refined solution is transmitted to layer 1 to solve the eMOOP (7980).

If an antigen is not solved within time constraints, the host may be compromised. As a consequence of this fact, it is necessary to impose time constraints on solution generation mechanisms of the AIS3. However, one way to achieve solutions within time constraints is to apply fuzzy logic filters in which 100% of the solution of not developed, but rather a majority of the solution is developed within immediate time constraints while the remainder of the problem is continuously solved over time. The limitation of this approach is that the solution is not completely solved, which may require future investment of computer resources. However, in the vast majority of cases, solving the problem in a limited way will be sufficient to maximize resource utility. In order to apply FL solutions within temporal constraints, the system will apply multiple hybrid metaheuristics at layers 2 and 3.

In FIG. 80, the process is described of solving of an eMOOP within time constraints using the three layers of the AIS3. Once the system encounters an antigen (8000), layer 1 compares the antigen to antigens in the database (8010). If the antigen is identified in the database, the solution is applied (8020). If the antigen is not identified, layer 2 is activated to construct a novel solution (8030). The layer 2 solution is applied to solve the problem of the antigen within time constraints (8040). If the antigen is not solved, layer 3 is activated (8050) and layer 3 modeling solves the eMOOP of the antigen within time constraints (8060). The solution is then applied and stored in the database (8070).

There are several categories of engineering applications of the AIS3. These application categories include artificial neural networks, protein network modeling, and protein structure predictions, network computing and autonomic computing, evolutionary systems and evolvable hardware, robotics systems and networks, and reconfigurable logic devices. These applications are specified below, though this list is not intended to be complete.

FIG. 81 shows the adaptation process by restructuring connection weights in an artificial neural network to solve EMOOPs using the AIS3. On the left column, the AIS3 layers are illustrated to analogize the process of problem solving as they restructure connection weights in an evolutionary A-NN in the center column, which tracks eMOOPs, depicted here in the right column. At phase 1, layer 1 (8100) of the AIS3 detects the first phase of the MOOP (8140) and assists the restructuring of the neural network (8115) to optimize the interaction with the antigen in the environment to solve the problem. At phase 2, the feedback from the eMOOP (8145) requires layer 2 (8105) to analyze the problem and to restructure the A-NN (8120). This process continues as the system activates layer 3 (8110) in a later phase to continue to restructure the A-NN (8125, 8130 and 8135) to solve the eMOOP. This process of continuously restructuring A-NN connection weights with the AIS3 maximizes the adaptation and learning capabilities of the neural network as it interacts with the environment to solve the optimization problem.

FIG. 82 shows the use of the AIS3 to train the A-NN connection weights. In the first phase, the A-NN (8215) initiates a configuration based on available information to solve a MOOP. The AIS3 is activated at layer 1 (8210), which accesses the dbms 1 (8205) for past solutions to current problems, though the novel problems are passed to layers 2 (8225) and 3 (8240), which update the central database (8200) at regular intervals. As the eMOOP progresses, the A-NN evolves its configuration to solve the problem, as is shown at 8230 and 8245. At each stage of the process, the AIS3 provides solution candidates that are tested by the A-NN to solve the eMOOP. The updatable and accumulated memory systems of the AIS3 provide a strong metaheuristic to the A-NN to accelerate its solutions in real time to solve complex optimization problems within time and computational constraints.

FIG. 83 shows the process of training connection weights in an A-NN using the AIS3. After the AIS3 trains the A-NN by solving the problem of identifying the connection weight (8300), layer 3 models the problem (8310) and layer 2 develops an original solution to the connection weight problem in the A-NN (8320). Tentative solutions are tested at layer 1 (8330) and solutions are improved with feedback from layer 3 modeling (8340). AIS3 then applies the solutions to the A-NN (8350). The environment provides feedback to an A-NN (8360) and the AIS3 trains the A-NN by providing constantly updated memory to solve connection weight problems (8370).

FIG. 84 shows the process of solving a protein regulatory network eMOOP using the AIS3. Once the protein regulatory network presents an eMOOP (8400), the AIS3 tests protein regulatory network pathway vector options (8410) and layer 3 models the protein network pathway options (8420). Layer 2 generates solution options to eMOOPs (8430) and solution options are tested at layer 1 (8440). The AIS3 receives feedback from the protein network environment (8450) and layer 2 experiments by producing solution options at layer 1 (8460). The protein regulatory network eMOOPs are then solved (8470).

FIG. 85 shows the process of solving a protein structure prediction eMOOP using the AIS3. After the AIS3 attempts to solve the protein structure prediction eMOOPs (8500), layer 2 generates solution options to a protein structure optimization problem (8510) and layer 1 tests solution options from layer 2 (8520). Layer 3 models protein structure optimal environmental conditions (8530) and the optimal protein structure solution option receives feedback from the environment (8540). The system then continuously generates solution options until the problem is solved. The AIS3 then presents the solution option to the protein structure prediction problem within constraints (8550) and the system responds to adjustments of environmental conditions (8560). The system then repeats until the protein structure prediction model is complete.

In FIG. 86 the process of using the AIS3 to model and adapt artificial protein combinations for synthetic biology is shown. After layer 3 models the artificial protein combinations (8600), the artificial organism is tested at layer 1 (8610). Layer 2 then generates artificial protein combinations to satisfy optimization constraints (8620), which are again tested at layer 1. Layer 3 models the reorganization of the protein combinations (8630) and the artificial organism interacts with its environment (8640). The artificial organism receives feedback from its environment at layer 1 (8650) and the layer 3 modeling of artificial protein combinations continues. Ultimately, the artificial organism evolves within environmental constraints (8660).

Figure 87:
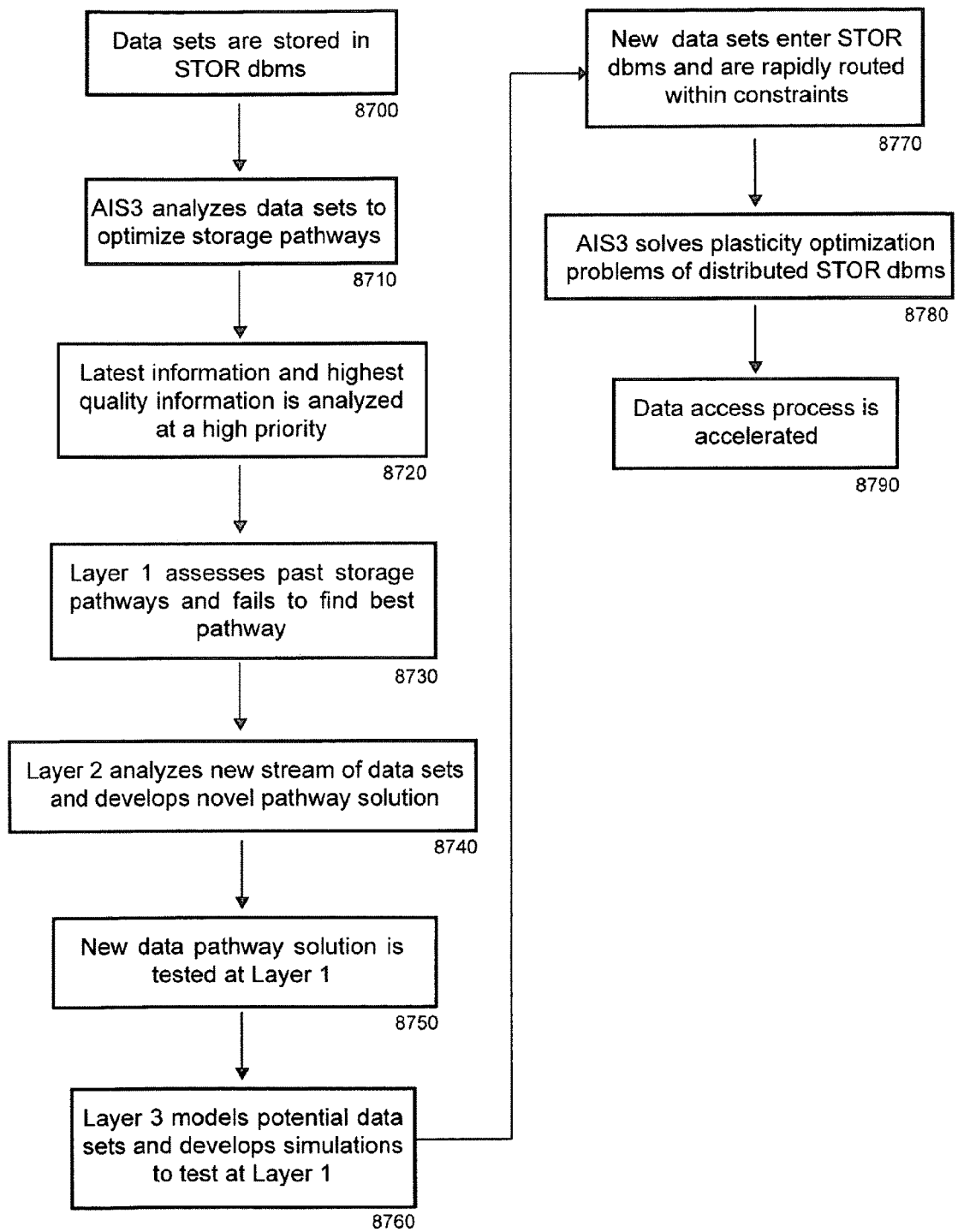

FIG. 87 shows the process of using the AIS3 to optimize storage pathways in a database management system. After data sets are stored in a spatio-temporal object relational (STOR) database management system (dbms) (8700), the AIS3 analyzes the data sets to optimize the storage pathways (8710). The latest information and highest quality information is analyzed and ranked at a high priority (8720). Layer 1 assesses past storage pathways and fails to find a solution for a best pathway (8730). Layer 2 analyzes a new stream of data sets and develops novel pathway solution (8740), which is then tested at layer 1 (8750). Layer 3 models potential data sets and develops potential simulations to test at layer 1 (8760). New data sets enter the STOR dbms and are rapidly routed within constraints (8770). The AIS3 solves plasticity optimization problems of distributed STOR dbms (8780) and the data access process is accelerated (8790). The AIS3 is also applicable to numerous dbms types.

Figure 88:
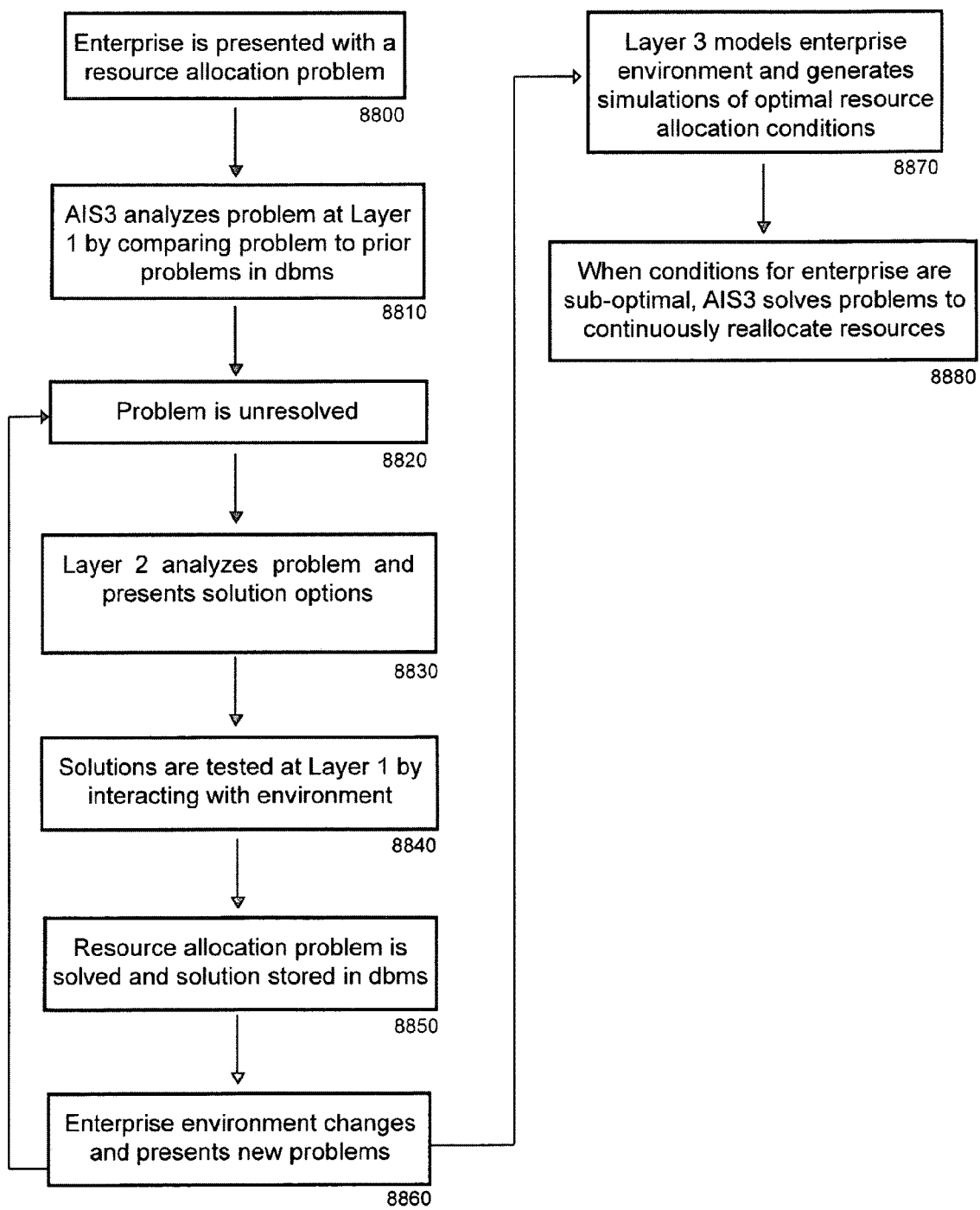

FIG. 88 shows the process of solving an enterprise resource allocation problem using the AIS3. Once the enterprise is presented with a resource allocation problem (8800), the AIS3 analyzes the problem at layer 1 by comparing the problem to prior problems in the dbms (8810). The problem is unresolved (8820) and layer 2 then analyzes the problem and presents solution options (8830), which are tested at layer 1 by interacting with the environment (8840). The resource allocation problem is solved and the solution stored in the dbms (8850). As the enterprise environment changes and presents new problems (8860), the problems are analyzed and solved at layer 2. Those problems that are not solved at layer 2, however, pass on to layer 3. Layer 3 models the enterprise environment and generates simulations of optimal resource allocation conditions (8870). When the conditions for the enterprise are sub-optimal, the AIS3 solves problems to continuously reallocate resources (8880).

Figure 89:
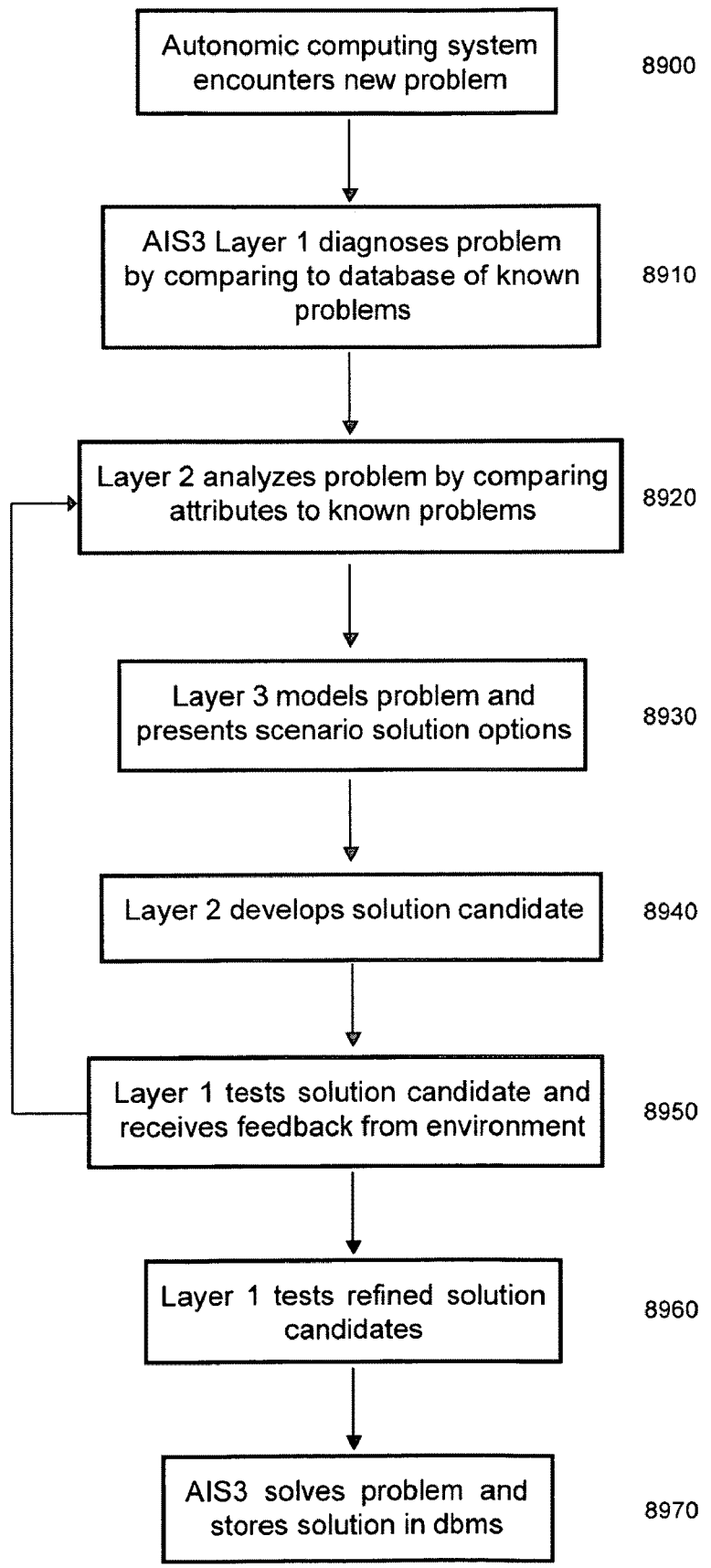

FIG. 89 shows the process of solving an autonomic computing problem using the AIS3. After the autonomic computing system encounters a new problem (8900), the layer 1 of the AIS3 diagnoses the problem by comparing it to a database of known problems (8910). For novel problems, layer 2 analyzes the problem by comparing the attributes to known problems (8920). Layer 3 then models the problem and presents scenario solution options (8930). Layer 2 develops a solution candidate (8940) and layer 1 tests the solution candidate and receives feedback from the environment (8950). If the problem is not solved by the solution candidates, layers 2 and 3 continue to analyze the problem, and the feedback to prior solution attempts, to develop further solution candidates. Layer 1 tests refined solution candidates (8960) and the AIS3 solves the problem and stores the solution in a dbms (8970).

Figure 90:
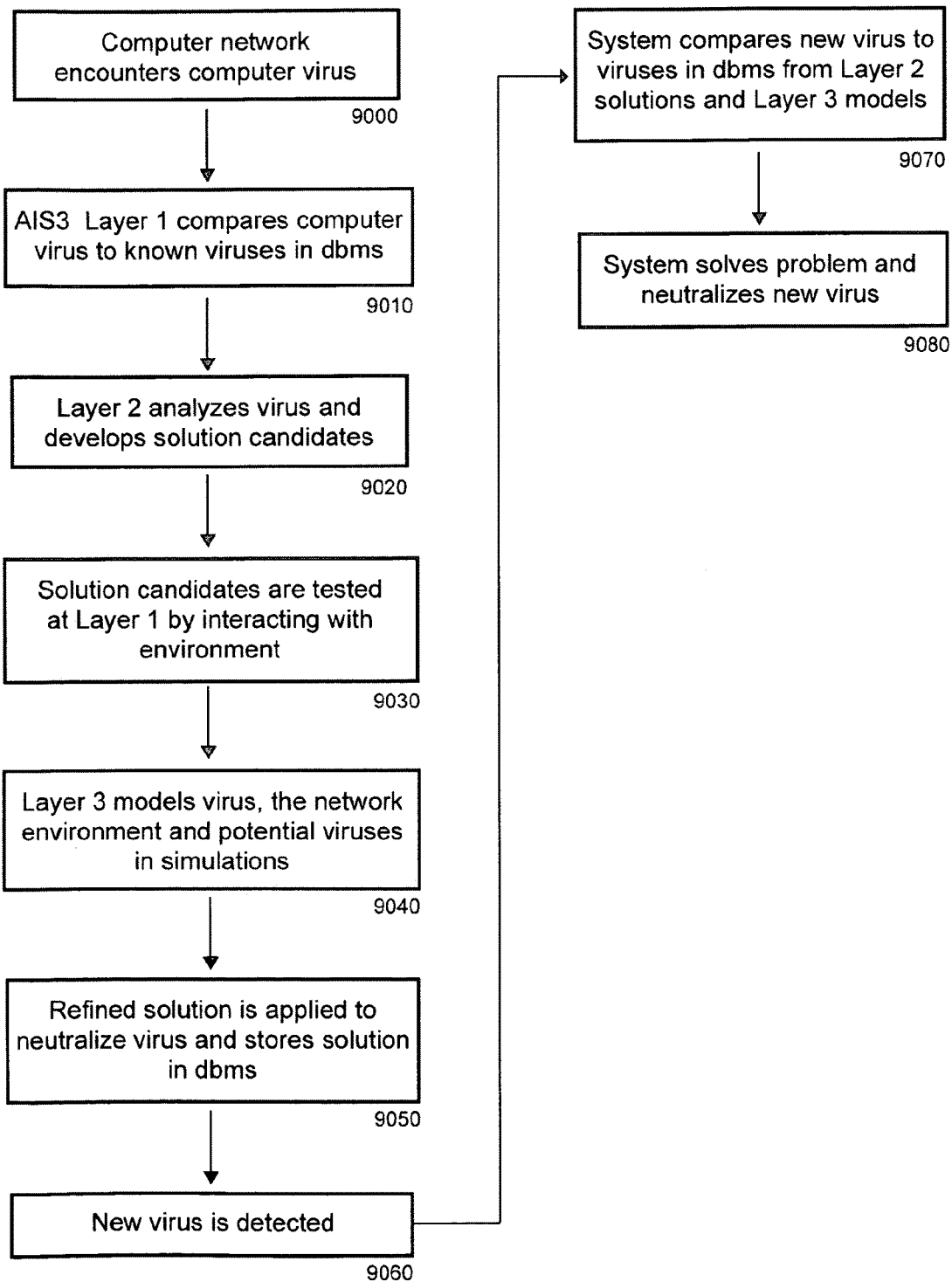

FIG. 90 shows the process of solving a computer network virus problem using the AIS3. After the computer network encounters a computer virus (9000), layer 1 compares the computer virus to known viruses in the dbms (9010). If it is novel, layer 2 analyzes the virus and develops solution candidates (9020), which are tested at layer 1 by interacting with the environment (9030). Layer 3 models the novel virus, the network environment and potential viruses in simulations (9040). A refined solution is generated and applied to neutralize the virus and the solution is stored in a dbms (9050). Once a new virus is detected (9060), the system compares the new virus to viruses in the dbms from layer 2 solutions and layer 3 models (9070). The system solves the problem at layers 2 and 3 by using analytical and modeling tools and neutralizes the new virus (9080) at layer 1.

Figure 91:
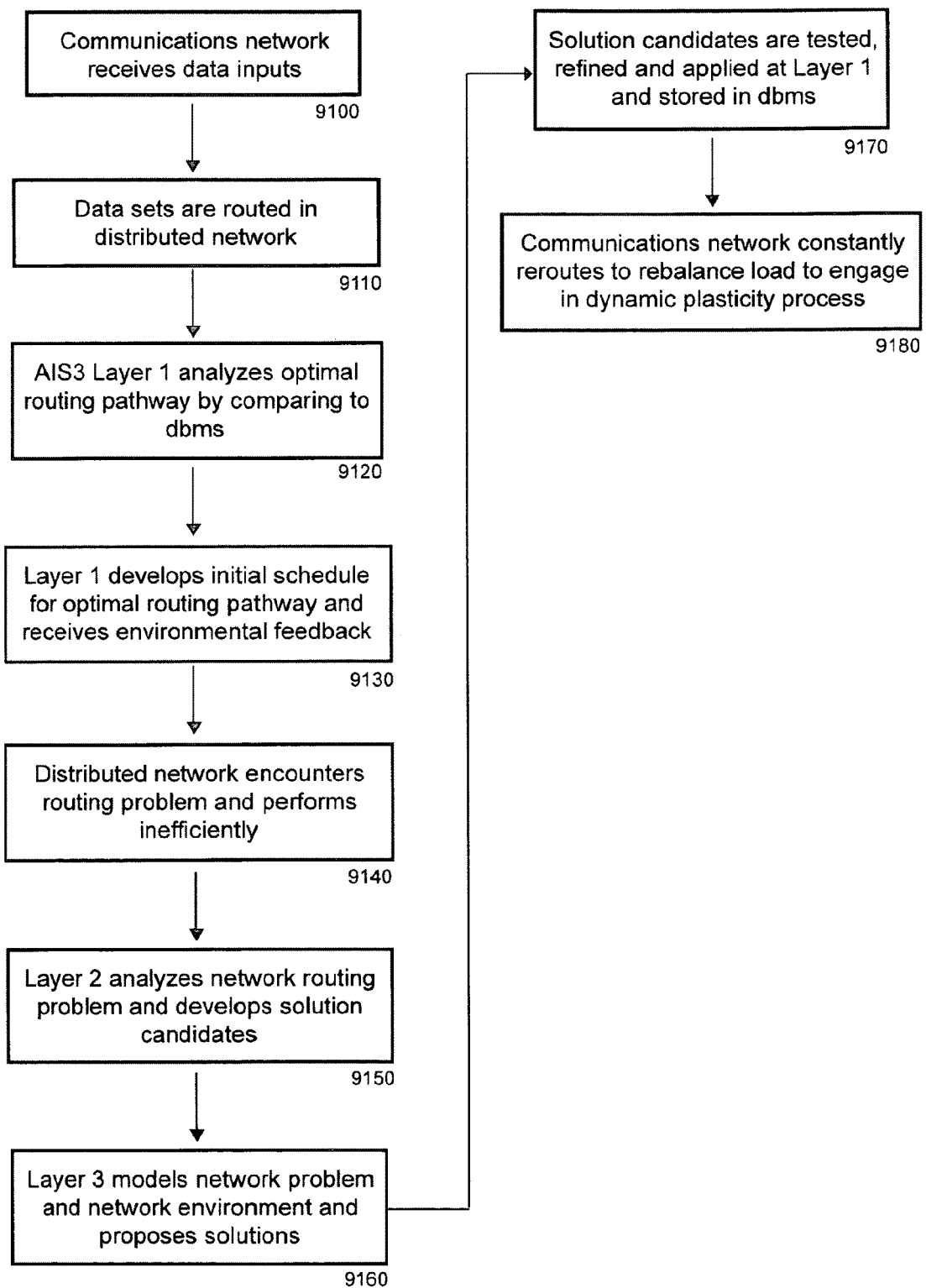

FIG. 91 shows the process of reorganizing a communications network to solve a distributed network problem by using the AIS3. After the communications network receives data inputs (9100), data sets are routed in the distributed network (9110). Layer 1 of the AIS3 analyzes the optimal routing pathway by comparing the problem to past problems and solutions in the dbms (9120). Layer 1 develops and initial schedule for the optimal routing pathway and receives environmental feedback (9130). The distributed network encounters a new routing problem and performs inefficiently until it is solved (9140). Layer 2 analyzes the network routing problem and develops solution candidates (9150). Layer 3 then models the network problem and the network environment and proposes solutions (9160). Solution candidates are tested, refined and applied at layer 1 and stored in the dbms (9170). The communications network constantly reroutes to rebalance the load and engage in a dynamic plasticity process (9180).

Figure 92:
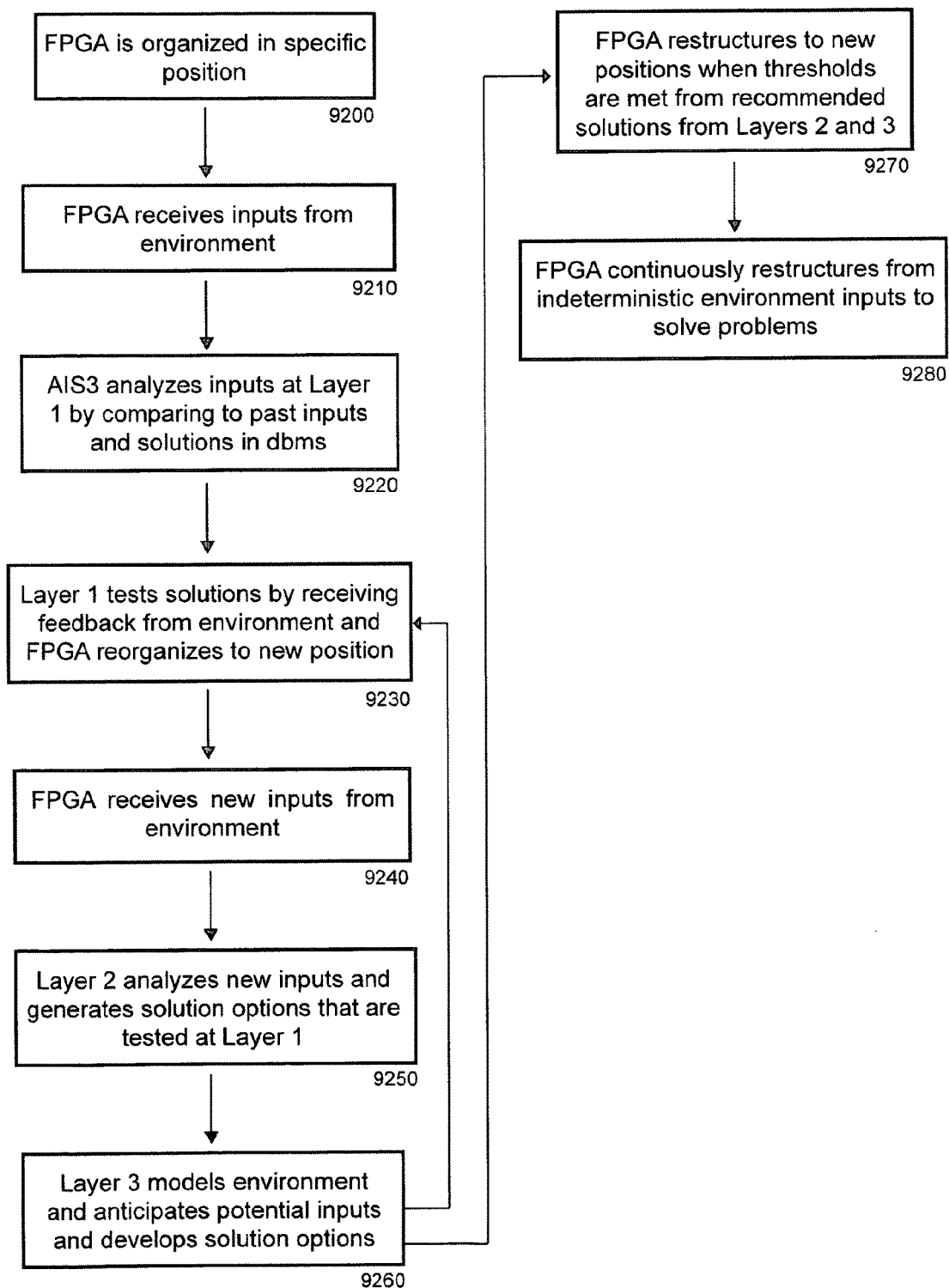

FIG. 92 shows the process of reorganizing the structure of an FPGA using the AIS3. After the FPGA is organized in a specific configuration (9200), the FPGA receives inputs from the environment (9210). The AIS3 analyzes inputs at layer 1 by comparing them to past inputs and solutions in the dbms (9220). Layer 1 generates and tests solutions by receiving feedback from the environment and the FGPA reorganizes to a new position (9230). The FPGA receives new inputs from the environment (9240) and layer 2 analyzes new inputs and generates solution options that are tested at layer 1 (9250). Layer 3 models the environment, anticipates potential inputs and develops solution options (9260). These solution options are tested at layer 1 as the system receives feedback from the environment and layers 2 and 3 continue to analyze and model problems to generate solution options. The FPGA restructures to new positions when thresholds are met from recommended solutions from layers 2 and 3 (9270). The FPGA continuously restructures from indeterministic environment inputs to solve problems as the environment continues to change (9280).

Figure 93:
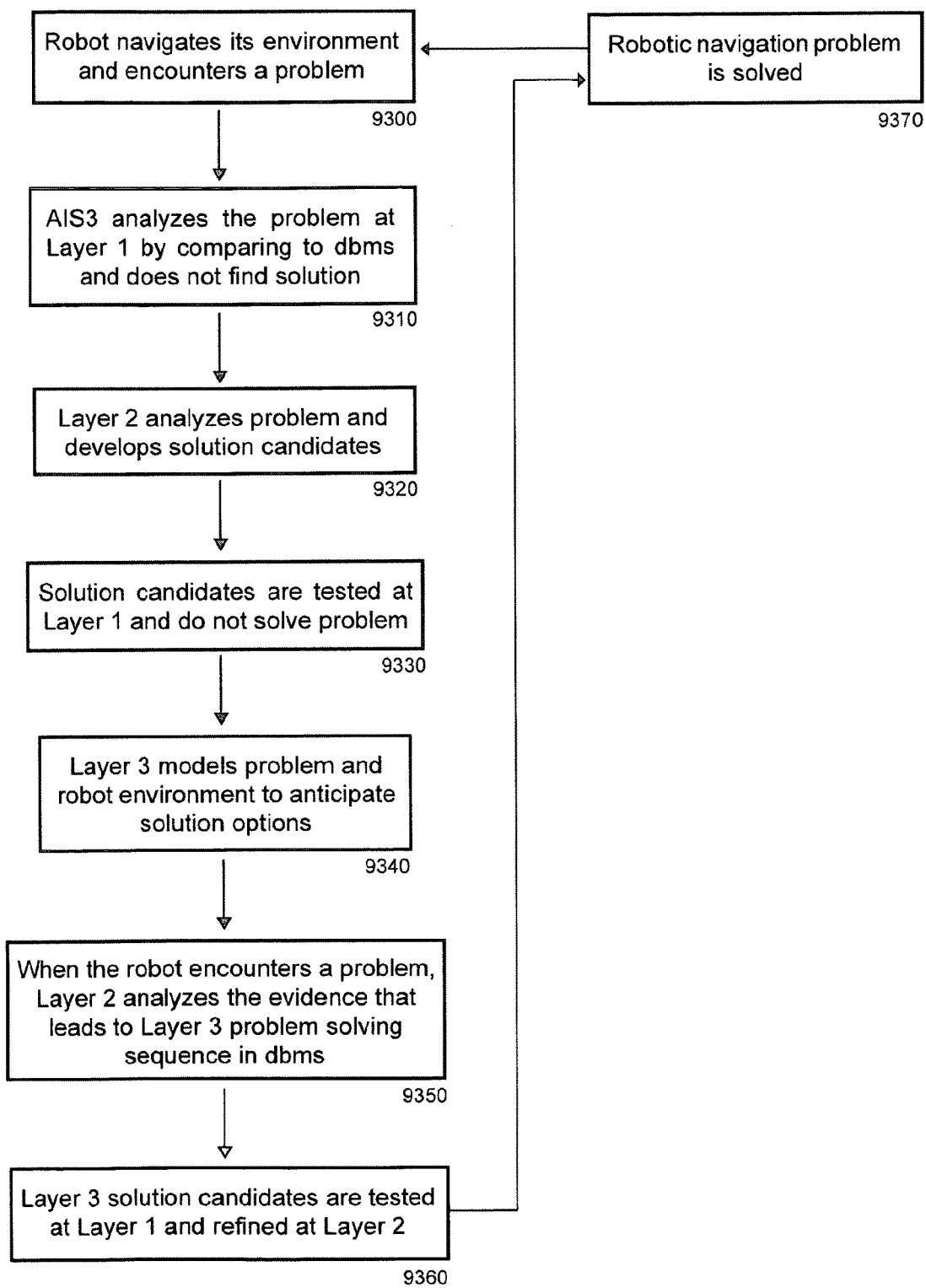

FIG. 93 shows the process of solving a robot navigation problem using the AIS3. After a robot navigates its environment and encounters a problem (9300), the AIS3 analyzes the problem at layer 1 by comparing it to past problems and solutions in the dbms (9310) and does not find a solution. Layer 2 analyzes the problem and develops solution candidates (9320), which are tested at layer 1 and still do not solve the problem (9330). Layer 3 models the problem and the robot environment to anticipate solution options (9340). When the robot encounters a problem, layer 2 analyzes the evidence that leads to a layer 3 problem solving sequence in the dbms (9350). The layer 3 solution candidates are tested at layer 1 and refined at layer 2 (9360). The robotic navigation problem is solved (9370), applied and stored in memory for future reference.

FIG. 94 shows the process of solving a collective robotics problem using the AIS3. After a group of robots encounters a problem in the robotic environment (9400), the robot collective applies the AIS3 to analyze and solve the problem (9410).

Layer 1 accesses the dbms to compare the problem to prior problems and solutions (9420) and layer 2 then analyzes the problem and develops solution candidates (9430), which are tested at layer 1 with environmental feedback (9440). Layer 3 then models the robots' environment and develops potential solutions (9450). The robots divide tasks, perform functions and change spatio-temporal position (9460). As the robot collective encounters new problems (9470), the robots rapidly solve the problems by accessing the AIS3 (9480) and the process of solving problems repeats. This process is useful in a variety of robotic collectives, including micro-robotic collectives and nano-robotic collectives, that are useful for reaggregation of evolvable hardware.

LIST OF ACRONYMS

ACO, ant colony optimization
AIS, artificial immune system
AIS3, hybrid multilayer artificial immune system
A-NN, artificial neural network
ASIC, application specific integrated circuit
BOOP, bi-objective optimization problem
CR, collective robotics
EGA, efficient genetic algorithms
eMOOP, evolving multi-objective optimization problem
FPGA, field programmable gate array
HGA, hybrid genetic algorithms
HIS, human immune system
MOOP, multi-objective optimization problem
PSO, particle swarm optimization
SDS, stochastic diffusion search

I claim:

1. A method for constructing a computational artificial immune system (AIS) to solve optimization problems, where the method is executed on a computer hardware system, using a computer operating system and a computer database management system (dbms);
where the method uses Layer 1 to analyze and solve optimization problems, Layer 2 to analyze and solve novel optimization problems and/or Layer 3 to model, simulate, anticipate, adapt and solve novel optimization problems;
wherein the method comprises
generating the AIS using the computer operating system and the computer hardware system to execute the following steps;
accessing the dbms to retrieve data to Layer 1 to assist in analysis of multi-objective optimization problems (MOOPs) as artificial antigens;
comparing the antigens to prior solutions in the dbms at Layer 1;
analyzing novel MOOPs and artificial antigens at Layer 2 wherein layer 2 is activated only when the MOOPs are not solved at Layer 1;
generating simulations that adapt to the artificial antigens to solve the MOOPs by passing the novel MOOPs to Layer 3 only when the MOOPs are not solved at Layers 1 and 2;
interacting with the artificial antigens generated at Layers 2 and 3 by successively testing solution candidates in order at Layer 1;
generating a unique configuration of a collective of artificial antibodies to destroy the novel artificial antigens at Layer 2;
applying the solutions to solve the novel MOOPs; and
storing the solutions and the steps of the problem-solving processes in the dbms.

2. The method of claim 1, wherein:
the optimization problem is an evolving multi-objective optimization problem (eMOOP), the method further comprising:
representing the eMOOP as an evolving artificial antigen;
analyzing the eMOOP at multiple phases of its development by using Layer 3;
developing solution candidates to the eMOOP at Layer 3;
testing the solution canditates to the eMOOP by interacting with the eMOOP at Layers 1 and 2;
adapting the solution candidates to the eMOOP at Layer 3 until a solution solves the eMOOP;
applying the evolved solution to the eMOOP;
solving the eMOOP; and
storing the solution and the problem-solving process in the dbms.

3. The method of claim 2, further comprising:
applying the AIS to network computing to solve eMOOPs; and
using the AIS to solve eMOOPs involving autonomic computing processes for automated regulation of network computing systems.

4. The method of claim 2, further comprising:
applying the AIS to network computing to solve eMOOPs; and
using the AIS to solve eMOOPs involving computer viruses.

5. The method of claim 2, the method further comprising:
comparing the solutions by using feedback of identifying successful solutions to novel problems at Layer 2;
iteratively refining the solutions to novel eMOOPs at Layer 3 in steps until the problems are successfully solved; and
applying the effective solutions to the novel eMOOPs.

6. The method of claim 1, further comprising:
analyzing novel MOOPs at Layer 2 by assessing specific characteristics of the artificial antigens by accessing the dbms and comparing the categories of variables or multiple past MOOP analyses;
generating layer 2 generates customized solutions at Layer 2 to solve novel MOOPs;
passing the solution generated at Layer 2 to Layer 1;
applying the solutions to the novel MOOPs by initiating a cascade to of a collective of artificial antibodies;
solving the novel MOOPs; and
storing the solutions in the dbms.

7. The method of claim 1, further comprising:
solving novel MOOPs at Layer 3 by generating and adapting models of the artificial antigens;
generating layer 3 generates simulations at Layer 3 of the environment for the artificial antigens;
generating simulations at Layer 3 of multiple interacting artificial antigens;
predicting the antigens' behaviors by analyzing at least one model of artificial antigens at Layer 3;
anticipating the behaviors of evolving artificial antigens at Layer 3;
passing these analyses to Layer 2 for solution candidate generation from Layer 3;
testing the solution candidates to select the best available solution option at Layer 2;
using Layer 2 to pass the best solution option to Layer 1;
updating the solution at Layer 1 by interacting with the antigens;
applying the updated solution to the artificial antigens; and
storing the solutions and the problem-solving process in the dbms.

8. The method of claim 1, further comprising:
using Layer 1 to apply the anticipation process of Layer 3 modeling simulations and to predict the developmental characteristics of known MOOPs;
solving the known MOOPs at Layer 1; and
storing the solution in the dbms.

9. The method of claim 1, further comprising:
using Layer 2 to predict the development characteristics of novel MOOPs by applying the anticipation process of Layer 3 modeling simulations;
solving at least one novel MOOP; and
storing the solutions in the dbms.

10. The method of claim 1, wherein:
the dbms is a central database, the method further comprising; and
storing data from Layers 1, 2, and 3 into the central database.

11. The method of claim 1, wherein:
the dbms is a collection of decentralized databases, the method further comprising:
using database components distributed in multiple locations;
storing and accessing data for Layer 1 by using a specific dbms 1 at location X;
storing and accessing data for Layer 2 by using a specific dbms 2 at location Y; and
storing and accessing data for Layer 3 by using a specific dbms 3 at location Z.

12. The method of claim 1, wherein:
the dbms is a collection of decentralized databases, including each of the three layer databases, that interacts with a central database, the method further comprising:
using a central database to access and store data in the collection of decentralized databases;
using the central database to access the decentralized databases; and
using each of the three decentralized databases to store data in the central database at regular intervals.

13. The method of claim 1, the method further comprising:
generating solution candidates at Layer 3 to novel MOOPs by creating and adapting model simulations;
testing the Layer 3 simulation solutions by successively identifying each solution candidate until the novel MOOPs are successfully solved in order to evolve an effective solution;
using feedback from the comparison of a successful solution to modify the model simulation at Layer 3 until the successful solution is constructed; and
applying the solution to solve the novel MOOPs.

14. The method of claim 1, the method further comprising:
applying the AIS to a communication system;
using the AIS to solve optimization problems involving resource distribution in a communication network; and
rebalancing the communication network.

15. The method of claim 1, the method further comprising:
applying the AIS to network computing to solve MOOPs in distributed databases;
using the AIS to restructure the data sets in the distributed databases to solve the optimization problems; and
reorganizing data in the distributed database network.

16. A computer program product on a non-transitory computer readable medium causing a computer hardware system, a computer operating system, and a computer database management system (dbms) to organize an artificial immune system (AIS) to solve optimization problems by modeling, simulation, anticipating, and adapting, wherein the program comprises:
retrieving data to Layer 1 to assist in analysis of multi-objective optimization problems (MOOPs) as artificial antigens by accessing the dbms;
comparing the antigens to prior solutions in the dbms;
analyzing novel MOOPs and artificial antigens at Layer 2 wherein Layer 2 is activated only when the MOOPs are not solved at Layer 1;
generating solution candidates to the MOOPs by simulating by way of adapting the artificial antigens by passing the novel MOOPs to Layer 3 only when the MOOPs are not solved at Layers 1 and 2;
testing solution candidates in order at Layer 1 by interacting with the artificial antigens generated at Layers 2 and 3;
generating a unique configuration of a collective of artificial antibodies to destroy the novel artificial antigens at Layer 2;
activating Layer 2 analysis when the MOOPs are not solved at Layer 1;
activating Layer 3 modeling when the MOOPs are not solved at Layer 2; and
storing the solutions and the problem-solving process in the dbms.

* * * * *